United States Patent
Piecuch

(10) Patent No.: US 10,009,282 B2
(45) Date of Patent: Jun. 26, 2018

(54) SELF-PROTECTING COMPUTER NETWORK ROUTER WITH QUEUE RESOURCE MANAGER

(71) Applicant: 128 Technology, Inc., Burlington, MA (US)

(72) Inventor: Michael T. Piecuch, Hudson, NH (US)

(73) Assignee: 128 Technology, Inc., Burlington, MA (US)

( * ) Notice: Subject to any disclaimer, the term of this patent is extended or adjusted under 35 U.S.C. 154(b) by 89 days.

(21) Appl. No.: 15/174,610

(22) Filed: Jun. 6, 2016

(65) Prior Publication Data

US 2017/0353391 A1 Dec. 7, 2017

(51) Int. Cl.
*H04L 12/56* (2006.01)
*H04L 12/873* (2013.01)
*H04L 12/24* (2006.01)

(52) U.S. Cl.
CPC ............ *H04L 47/522* (2013.01); *H04L 41/06* (2013.01)

(58) Field of Classification Search
CPC ....... H04L 47/522; H04L 41/06; H04L 12/26; H04L 12/56; H04J 1/16; H04J 3/14
See application file for complete search history.

(56) References Cited

U.S. PATENT DOCUMENTS

| | | | |
|---|---|---|---|
| 6,515,963 B1 | 2/2003 | Bechtolsheim et al. | |
| 6,563,824 B1 | 5/2003 | Bhatia et al. | |
| 6,584,071 B1 | 6/2003 | Kodialam et al. | |
| 6,721,334 B1 | 4/2004 | Ketcham | |
| 6,738,387 B1 | 5/2004 | Lin et al. | |
| 6,778,531 B1 | 8/2004 | Kodialam et al. | |
| 6,798,743 B1 | 9/2004 | Ma et al. | 370/235 |
| 7,020,143 B2 | 3/2006 | Zdan | 370/395.21 |
| 7,035,214 B1 | 4/2006 | Seddigh et al. | |
| 7,106,739 B2 | 9/2006 | Beier | |
| 7,154,902 B1 | 12/2006 | Sikdar | |
| 7,218,632 B1 | 5/2007 | Bechtolsheim et al. | |
| 7,315,541 B1 | 1/2008 | Housel et al. | |
| 7,373,660 B1 | 5/2008 | Guichard et al. | |

(Continued)

FOREIGN PATENT DOCUMENTS

| | | |
|---|---|---|
| CN | 101552703 A | 10/2009 |
| CN | 101646220 A | 2/2010 |

(Continued)

OTHER PUBLICATIONS

Berners-Lee et al., *Uniform Resource Identifier (URI): Generic Syntax*, Network Working Group, Request for Comments 3986, The Internet Society, 61 pages, Jan. 2005.

(Continued)

*Primary Examiner* — Wei Zhao
(74) *Attorney, Agent, or Firm* — Sunstein Kann Murphy & Timbers LLP

(57) ABSTRACT

A self-protecting router limits the extent to which its queues can be filled with potentially malicious or otherwise harmful messages received from outside the router, thereby ensuring the queues have sufficient room to accept messages generated internally within the router and are necessary for management and operation of the router. Such routers are, therefore, immune to attack by floods of messages from malicious or malfunctioning network nodes, such as computers, switches and other routers.

27 Claims, 30 Drawing Sheets

(56) References Cited

U.S. PATENT DOCUMENTS

| | | | |
|---|---|---|---|
| 7,466,703 | B1 | 12/2008 | Arunachalam et al. |
| 7,536,720 | B2 | 5/2009 | Burdett et al. |
| 7,634,805 | B2 | 12/2009 | Aroya |
| 7,706,411 | B2 | 4/2010 | Wakumoto et al. |
| 7,730,301 | B2 | 6/2010 | Correll et al. |
| 7,773,611 | B2 | 8/2010 | Booth, III et al. |
| 7,872,973 | B2 | 1/2011 | Sterne et al. ............... 370/235 |
| 8,068,417 | B1 | 11/2011 | Roberts |
| 8,094,560 | B2 | 1/2012 | Bagepalli et al. |
| 8,139,479 | B1 | 3/2012 | Raszuk |
| RE44,119 | E | 4/2013 | Wang et al. ............... 370/230 |
| 8,437,248 | B2 | 5/2013 | Li et al. |
| 8,527,641 | B2 | 9/2013 | Degaonkar et al. |
| 8,570,893 | B2 | 10/2013 | Guo et al. |
| 8,584,199 | B1 | 11/2013 | Chen et al. |
| 8,634,428 | B2 | 1/2014 | Le Pennec et al. |
| 8,804,489 | B2 | 8/2014 | Lu et al. |
| 8,942,085 | B1 | 1/2015 | Pani et al. |
| 8,989,020 | B2 | 3/2015 | So |
| 9,059,920 | B2 | 6/2015 | Ravindran et al. |
| 9,160,652 | B2 | 10/2015 | Taillon et al. |
| 9,240,953 | B2 | 1/2016 | Carlstrom ......... H04L 47/6295 |
| 9,276,864 | B1 | 3/2016 | Vincent ............... H04L 47/25 |
| 2001/0030649 | A1 | 10/2001 | Mamiya et al. |
| 2002/0044553 | A1 | 4/2002 | Chakravorty |
| 2002/0075883 | A1 | 6/2002 | Dell et al. |
| 2002/0176363 | A1 | 11/2002 | Durinovic-Johri et al. |
| 2003/0198189 | A1 | 10/2003 | Roberts et al. |
| 2003/0214938 | A1 | 11/2003 | Jindal et al. |
| 2004/0088542 | A1 | 5/2004 | Daude et al. |
| 2004/0264481 | A1 | 12/2004 | Darling et al. |
| 2005/0018618 | A1 | 1/2005 | Mualem et al. |
| 2005/0036616 | A1 | 2/2005 | Huang et al. |
| 2005/0063307 | A1 | 3/2005 | Samuels et al. |
| 2005/0182932 | A1 | 8/2005 | Wheeler |
| 2005/0213570 | A1 | 9/2005 | Stacy et al. |
| 2005/0238022 | A1 | 10/2005 | Panigrahy |
| 2006/0176894 | A1 | 8/2006 | Oh et al. |
| 2007/0171825 | A1 | 7/2007 | Roberts et al. |
| 2007/0171826 | A1 | 7/2007 | Roberts et al. |
| 2008/0214175 | A1 | 9/2008 | Papadoglou et al. |
| 2009/0007021 | A1 | 1/2009 | Hayton |
| 2009/0059958 | A1 | 3/2009 | Nakata |
| 2010/0125898 | A1 | 5/2010 | Dubuc et al. |
| 2010/0191968 | A1 | 7/2010 | Patil et al. |
| 2010/0271955 | A1* | 10/2010 | Atsumi ............... H04L 47/58 370/241 |
| 2012/0144061 | A1 | 6/2012 | Song |
| 2012/0236860 | A1 | 9/2012 | Kompella et al. |
| 2013/0091237 | A1* | 4/2013 | Arulambalam ......... H04L 65/60 709/213 |
| 2013/0227166 | A1 | 8/2013 | Ravindran et al. |
| 2013/0297824 | A1 | 11/2013 | Lan et al. |
| 2014/0040488 | A1 | 2/2014 | Small et al. |
| 2014/0115688 | A1 | 4/2014 | Zuk et al. |
| 2015/0188814 | A1 | 7/2015 | Jain et al. |
| 2015/0229618 | A1 | 8/2015 | Wan et al. |
| 2015/0381324 | A1 | 12/2015 | Mirsky et al. |
| 2016/0094444 | A1 | 3/2016 | MeLampy et al. |
| 2016/0219088 | A1* | 7/2016 | Ma ..................... H04L 65/605 |

FOREIGN PATENT DOCUMENTS

| | | |
|---|---|---|
| CN | 101068242 B | 4/2010 |
| CN | 102158371 A | 8/2011 |
| CN | 101640629 B | 8/2012 |
| CN | 102739507 A | 10/2012 |
| CN | 101207604 B | 3/2013 |
| CN | 102769679 B | 6/2015 |
| CN | 103179192 B | 11/2015 |
| CN | 105245469 A | 1/2016 |
| EP | 1 313 267 B1 | 12/2006 |
| KR | 10-2011-0062994 A | 6/2011 |
| WO | WO 2007/084707 A2 | 7/2007 |
| WO | WO 2007/084755 A2 | 7/2007 |
| WO | WO 2008/043230 A1 | 4/2008 |
| WO | WO 2015/131537 A1 | 9/2015 |

OTHER PUBLICATIONS

Bjorklund, *Yang—A Data Modeling Language for the Network Configuration Protocol (NETCONF)*, Internet Engineering Task Force (IETF), Request for Comments 6020, ISSN: 2070-1721, 173 pages, Oct. 2010.

CAIDA, *Observing routing asymmetry in Internet traffic*, (www.caida.org/research/traffic-analysis/asymmetry/1), 7 pages, dated Jul. 17, 2013.

Chiosi, et al, *Network Functions Virtualisation—Introductory White Paper*, Issue 1, at the "SDN and OpenFlow World Congress", Darmstadt-Germany, (http://portal.etsi.org/nfv/nfv_white_paper), 16 pages, dated Oct. 22, 2012.

Cisco Systems, *Parallel Express Forwarding on the Cisco 10000 Series*, (White Paper) Cisco Systems, printed Jun. 17, 2015, 4 pages.

Data Plane Development Kit, *Programmer's Guide, Release 16.04.0*, 216 pages, Apr. 12, 2016.

Davis, *Layer 3 Switches Explained*, Happy Router, 6 pages, dated Aug. 30, 2007.

Filsfils et al., *Segment Routing Architecture*, Network Working Grroup, Draft, 28 pages, Oct. 21, 2013.

Hansson, et al., *A Unified Approach to Constrained Mapping and Routing on Network-on-Chip Architectures*, CODES+ISSS '05 Proceedings of the 3rd IEEE/ACM/IFIP International Conference on Hardware/Software Codesign and System Synthesis, 6 pages, Sep. 19-21, 2005.

Herbert, *xps: Transmit Packet Steering*, Eklektix, Inc., Oct. 26, 2010, 11 pages.

IANA, *Transmission Control Protocol (TCP) Parameters*, (www.iana.org/assignments/tcp-parameters/tcp-parameters.xhtm), 5 pages, dated Sep. 22, 2014.

Katz et al., *Bidirectional Forwarding Detection (BFD)*, Internet Engineering Task Force (IETF), Request for Comments 5880, ISSN: 2070-1721, Juniper Networks, 49 pages, Jun. 2010.

Klement, *1.2 Overview of a TCP communications session*, RPG IV Socket Tutorial (http://www.scottklement.com/rpg/socketut/overview), 2 pages, 2001.

Microsoft, *Introduction to Receive Side Scaling*, Developer Resources, https://msdn.microsoft.com/en-us/library/windows/hardware/ff556942(v=vs.85).aspx, 3 pages, Apr. 2014.

Microsoft, *RSS with a Single Hardware Receive Queue*, Developer Resources, https://msdn.microsoft.com/en-us/library/windows/hardware/ff570727(v=vs.85).aspx, 2 pages, Jan. 2015.

Microsoft, *RSS with Hardware Queuing*, Developer Resources, https://msdn.microsoft.com/en-us/library/windows/hardware/ff570728(v=vs.85).aspx, 2 pages, Jan. 2015.

Microsoft, *Non-RSS Receive Processing*, Developer Resources, https://msdn.microsoft.com/en-us/library/windows/hardware/ff568798(v=vs.85).aspx, 2 pages, Jan. 2015.

PC Magazine Encyclopedia, *Definition of: TCP/IP abc's*, PC Magazine Encyclopedia (www.pcmag.com/encyclopedia/term/52615), 5 pages, 2005.

Previdi, et al., *IPv6 Segment Routing Header (SRH)*, Network working Group, Draft, 24 pages, Jul. 3, 2014.

Roberts, *The Next Generation of IP—Flow Routing*, SSGRR 2003S International Conference, L'Aquila Italy, 11 pages, Jul. 29, 2003.

Rouse, *What is routing table?*, Posted by Margaret Rouse (http://searchnetworking.techtarget.com/definition/routing-table), 5 pages, Apr. 2007.

Shang, et al., *Making Better Use of All Those TCP ACK Packets*, Computer Science Department, Worcester Polytechnic Institute, 10 pages, 2005.

Shaw, *Multi-queue network interfaces with SMP on Linux*, Greenhost, https://greenhost.net/2013/04/10/multi-queue-network-interfaces-with-smp-on-linux/, 5 pages, Apr. 10, 2013.

Sollins et al., *Functional Requirements for Uniform Resource Names*, Network Working Group, Request for Comments 1737, 7 pages, Dec. 1994.

(56) References Cited

OTHER PUBLICATIONS

Srinivasan, et al., *A Technique for Low Energy Mapping and Routing in Network-on-Chip Architectures*, ISLPED '05 Proceedings of the 2005 International Symposium on Low Power Electronics and Design, 6 pages, Aug. 8-10, 2005.
Wikipedia, *LAN switching*, 5 pages, dated Jun. 12, 2013.
Wikipedia, *Management information base*, 6 pages, dated Jul. 15, 2013.
Wikipedia, *Reverse path forwarding*, 3 pages, dated Jul. 31, 2013.
Wikipedia, *Equal-cost multi-path routing*, 1 page, dated Sep. 12, 2013.
Wikipedia, *Transmission Control Protocol*, 18 pages, dated Sep. 16, 2013.
Wikipedia, *Software-defined networking*, 6 pages, dated Sep. 16, 2013.
Wikipedia, *Network socket*, 4 pages, dated Sep. 19, 2013.
Wikipedia, *Router (computing)*, 8 pages, dated Sep. 23, 2013.
Wikipedia, *Network address translation*, 11 pages, dated Sep. 24, 2013.
Wikipedia, *Open vSwitch*, 2 pages, dated Nov. 24, 2013.
Wikipedia, *Network interface controller*, https://en.wikipedia.org/wiki/Network_interface_controller,5 pages, May 19, 2015.
International Searching Authority, International Search Report—International Application No. PCT/2015/044815, dated Dec. 6, 2015, together with the Written Opinion of the International Searching Authority, 8 pages.
International Searching Authority, International Search Report—International Application No. PCT/2015/060840, dated Mar. 8, 2016, together with the Written Opinion of the International Searching Authority, 13 pages.
International Searching Authority, International Search Report—International Application No. PCT/US2016/013416, dated Jun. 8, 2016, together with the Written Opinion of the International Searching Authority, 12 pages.
International Searching Authority, International Search Report—International Application No. PCT/US2016/026938, dated Jul. 28, 2016, together with the Written Opinion of the International Searching Authority, 9 pages.
Jamjoom, et al., "Persistent Dropping: An Efficient Control of Traffic Aggregates," https://cs.uwaterloo.ca/~brecht/servers/readings-new/jamjoon-sigcomm-2003.pdf, SIGCOMM'03, 12 pages, 2003.
Kumar, et al., "Comparison of Queuing Algorithms against DDoS Attack," https://pdfs.semanticscholar.org/d3d6/15bf0094e7564a57267c34683aa5e590e4ed.pdf, International Journal of Computer Science and Information Technologies, vol. 2 (4), pp. 1574-1580, 2011.
Israel Patent Office, International Search Report, International Application No. PCT/US2017/027169, together with the Written Opinion of the International Searching Authority, 13 pages, dated Jul. 13, 2017.
Wikipedia, "Active queue management," https://en.wikipedia.org/wiki/Active_queue_management, 2 pages, Apr. 22, 2015.

\* cited by examiner

AIPR 1 708

Session X

Return Association (RA)

SSA   1.1.1.1

SSP   10

SDA   5.5.5.5

SDP   20

SPR   100

Forward Association (FA)

SSA   2.2.2.2      (implicit)

SSP   30          (session source port assigned by AIPR 1 708)

SDA   3.3.3.3      (next node address – AIPR 2 714)

SDP   40          (session destination port assigned by AIPR 1 708)

SPR   100

Flag = First Waypoint AIPR

Session Y

RA

FA

Flag

Session Z

RA

FA

Flag

*Figure 9*

AIPR 2 714

Session X

Return Association (RA)

SSA    2.2.2.2

SSP    30

SDA    3.3.3.3      (implicit)

SDP    40

SPR    100

Forward Association (FA)

SSA    3.3.3.3      (implicit)

SSP    50            (session source port assigned by AIPR 2 714)

SDA    4.4.4.4      (next node address – AIPR 4 722})

SDP    60            (session destination port assigned by AIPR 2 714)

SPR    100

Flag = Intermediate Waypoint AIPR

Session Y

RA

FA

Flag

Session Z

RA

FA

Flag

*Figure 10*

AIPR 4 722

Session X

Return Association (RA)

SSA   3.3.3.3

SSP   50

SDA   4.4.4.4      (implicit)

SDP   60

SPR   100

Forward Association (FA)

SSA   1.1.1.1      (original source address from metadata)

SSP   10          (original source port from metadata)

SDA   5.5.5.5      (original destination address from metadata)

SDP   20          (original destination port from metadata)

SPR   100

Flag = Final Waypoint AIPR

Session Y

RA

FA

Flag

Session Z

RA

FA

Flag

*Figure 11*

SELF-PROTECTING COMPUTER NETWORK ROUTER WITH QUEUE RESOURCE MANAGER

FIELD OF THE INVENTION

The invention generally relates to computer network routers and, more particularly, the invention relates to managing queue resources within routers to prevent the queues being flooded by router-external traffic to the detriment of router-internal management traffic.

BACKGROUND OF THE INVENTION

Computer network routers include network interfaces, to which links from computers, switches and other routers may be connected. The network interfaces are typically handled by device drivers (software) executed by processors. The network interfaces and/or the device drivers enqueue packets received by the network interfaces onto queues for subsequent processing within the routers. The subsequent processing may involve simply moving a packet to another queue for transmission by an outgoing network interface, or the processing may be more complex.

Most packets handled by routers are data packets which, for the most part, are simply forwarded toward their respective destinations. However, some data packets, such as the first data packet of a stream of data packets, may require address resolution. That is, the router may need to ascertain how to direct the packet toward its destination, which takes time and consumes hardware resources, such as processor time, in the router. Once the router resolves the destination address of the first packet in the stream and places the address information in a table, the router can rapidly forward subsequent packets of the stream by simply accessing the table.

In addition to data packets, routers and other network nodes exchange various types of network management packets according to various network management protocols. For example, the address resolution protocol (ARP) is a protocol used by the Internet Protocol (IP), specifically IPv4, to map IP network addresses to hardware addresses used by a data link protocol. For another example, bidirectional forwarding detection (BFD) is a network protocol used to detect faults between two forwarding engines connected by a link.

Most of these network management packets are processed within a router without being forwarded, i.e., the packets are "consumed" by the router. Nevertheless, some network management packets require considerable computation and may be handled by processor resources that are in limited supply in the router. Thus, routers typically maintain queues of network management packets awaiting processing.

A flood of network management packets, such as from a malicious actor or a malfunctioning router, can fill up these queues, thereby forcing the receiving router to drop subsequent (legitimate) network management packets, which may cause loss of valuable network management information, such as address resolutions or information about changes in network topology.

SUMMARY OF VARIOUS EMBODIMENTS

An embodiment of the present invention provides a self-protecting network router. The router includes a memory. The memory stores data representing a plurality of receive queues. The memory also stores data representing a plurality of transmit queues. The memory also stores data representing a plurality of traffic engineering queues. The memory also stores data representing a plurality of service queues . . . .

An embodiment of the present invention provides a self-protecting network router. The self-protecting router includes a memory. The memory stores data representing several types of queues. The memory stores data representing a plurality of receive queues. The memory stores data representing a plurality of transmit queues. The memory stores data representing a plurality of traffic engineering queues. The memory stores data representing at least one service queue.

The router also includes a plurality of network interfaces. Each network interface is associated with at least one receive queue of the plurality of receive queues. Each network interface is associated with at least one transmit queue of the plurality of transmit queues. Each network interface is configured to automatically enqueue messages received by the network interface from outside the router to the at least one receive queue associated with the network interface.

Each network interface is configured to dequeue messages from the at least one transmit queue associated with the network interface for transmission by the network interface to outside the router.

The router also includes a path controller. The path controller is configured to dequeue forwardable messages from the plurality of receive queues and enqueue the forwardable messages to the plurality of transmit queues. The path controller is configured to dequeue unforwardable messages from the plurality of receive queues and enqueue the unforwardable messages to the plurality of traffic engineering queues. Each traffic engineering queue of the plurality of traffic engineering queues is configured to drop, rather than accept, messages being enqueued to the traffic engineering queue when the traffic engineering queue is full.

The router also includes a service controller. The service controller is configured to dequeue the unforwardable messages from the plurality of traffic engineering queues and enqueue the unforwardable messages to the at least one service queue. The messages are enqueued to the at least one service queue, such that each service queue of the at least one service queue is at most a predetermined fraction, less than 100%, full.

The router includes at least one process configured to generate internally-generated messages and enqueue the internally-generated messages to the at least one service queue, without regard to fullness of the at least one service queue.

The router also includes at least one service process configured to dequeue and process the unforwardable messages and the internally-generated messages from the at least one service queue.

The predetermined fraction may be less than 50%.

The path controller may include a message classifier. The message classifier may be configured to analyze protocol portions of the messages received by the plurality of network interfaces. As a result of the analysis, for messages in which the protocol portions indicate bidirectional forwarding detection (BFD), the message classifier may be configured to enqueue the messages to the plurality of traffic engineering queues.

As a result of the analysis, for messages in which the protocol portions indicate address resolution protocol (ARP), bidirectional forwarding detection (BFD) or routing, the message classifier may be configured to enqueue the messages to the plurality of traffic engineering queues.

As a result of the analysis, for messages in which the protocol portions indicate address resolution protocol (ARP), the message classifier may be configured to enqueue the messages to the plurality of traffic engineering queues.

The router may also include a flow table stored in the memory. The path controller may be configured to compare address portions of the messages received by the plurality of network interfaces to address data stored in the flow table. As a result of the comparison, for messages in which the address portions match the address data, the message classifier may be configured to enqueue the messages to the plurality of transmit queues. For messages in which the address portions do not match the address data, the message classifier may be configured to enqueue the messages to the plurality of traffic engineering queues.

The plurality of traffic engineering queues may include at least one ARP traffic engineering queue. The at least one service queue may include an ARP service queue. The at least one service process may include an ARP service process.

The plurality of traffic engineering queues may further include at least one BFD traffic engineering queue, at least one flow setup traffic engineering queue and at least one routing traffic engineering queue. The at least one service queue may further include a BFD service queue, a flow setup service queue and a routing service queue. The at least one service process may further include a BFD service process, a flow setup service process and a routing service process.

The path controller may include a message classifier. The message classifier may be configured to analyze protocol portions of the messages received by the plurality of network interfaces. As a result of the analysis, for messages in which the protocol portions indicate resolution protocol (ARP), the message classifier may be configured to enqueue the messages to the at least one ARP traffic engineering queue.

As a result of the analysis, for messages in which the protocol portions indicate bidirectional forwarding detection (BFD), the message classifier may be configured to enqueue the messages to the at least one BFD traffic engineering queue.

As a result of the analysis, for messages in which the protocol portions indicate flow setup, the message classifier may be configured to enqueue the messages to the at least one flow setup traffic engineering queue.

As a result of the analysis, for messages in which the protocol portions indicate routing, the message classifier may be configured to enqueue the messages to the at least one routing traffic engineering queue.

The router may also include a plurality of P processors. The P processors may be coupled to the memory. The at least one ARP traffic engineering queue may include a number (P) of ARP traffic engineering queues. Each ARP traffic engineering queue of the P ARP traffic engineering queues may be associated with a different one of the P processors.

For each traffic engineering queue of the plurality of traffic engineering queues, only the one processor that is associated with the traffic engineering queue may enqueue the unforwardable messages on the traffic engineering queue.

The plurality of traffic engineering queues may include a number (P) of BFD traffic engineering queues. Each BFD traffic engineering queue of the P BFD traffic engineering queues may be associated with a different one of the P processors. The plurality of traffic engineering queues may include a number (P) of flow setup traffic engineering queues. Each flow setup traffic engineering queue of the P flow setup traffic engineering queues may be associated with a different one of the P processors. The plurality of traffic engineering queues may include a number (P) of routing traffic engineering queues. Each routing traffic engineering queue of the P routing traffic engineering queues may be associated with a different one of the P processors.

For each traffic engineering queue of the plurality of traffic engineering queues, only the one processor that is associated with the traffic engineering queue may enqueue the unforwardable messages on the traffic engineering queue.

The path controller may include a message classifier. The message classifier may be configured to analyze protocol portions of the messages received by the plurality of network interfaces. As a result of the analysis, for messages in which the protocol portions indicate resolution protocol (ARP), the message classifier may be configured to enqueue the messages to the P ARP traffic engineering queues.

As a result of the analysis, for messages in which the protocol portions indicate bidirectional forwarding detection (BFD), the message classifier may be configured to enqueue the messages to the P BFD traffic engineering queues.

As a result of the analysis, for messages in which the protocol portions indicate flow setup, the message classifier may be configured to enqueue the messages to the P flow setup traffic engineering queues.

As a result of the analysis, for messages in which the protocol portions indicate routing, the message classifier may be configured to enqueue the messages to the P routing traffic engineering queues.

The at least one service queue may further include a BFD service queue, a flow setup service queue and a routing service queue. The at least one service process may further include a BFD service process, a flow setup service process and a routing service process.

Another embodiment of the present invention provides a method for automatically protecting resources within a network router from flooding by a large number of messages. The network router includes a plurality of network interfaces. The method includes automatically storing data in a memory of the router. The data represents several queues. The queues include a plurality of receive queues, a plurality of transmit queues, a plurality of traffic engineering queues and a plurality of service queues.

Each network interface of the plurality of network interfaces is automatically associated with at least one receive queue of the plurality of receive queues and at least one transmit queue of the plurality of transmit queues.

Each network interface of the plurality of network interfaces is configured to automatically enqueue messages received by the network interface from outside the router to the at least one receive queue associated with the network interface. Each network interface of the plurality of network interfaces is also configured to automatically dequeue messages from the at least one transmit queue associated with the network interface for transmission by the network interface to outside the router.

Forwardable messages are dequeued from the plurality of receive queues. The forwardable messages are enqueued to the plurality of transmit queues.

Unforwardable messages are dequeued from the plurality of receive queues. The unforwardable messages are enqueued to the plurality of traffic engineering queues. Unforwardable messages are dropped when ones of the traffic engineering queues are full.

The unforwardable messages are dequeued from the plurality of traffic engineering queues. The unforwardable messages are enqueued to the plurality of service queues. Each service queue of the plurality of service queues is at most a predetermined fraction, less than 100%, full.

Internally-generated messages are generate within the router. The internally-generated messages are enqueued to the plurality of service queues, without regard to fullness of the service queues.

The unforwardable messages and the internally-generated messages are dequeued from the plurality of service queues. The unforwardable messages and the internally-generated messages are processed by a plurality of service processes.

The predetermined fraction may be less than 50%.

Dequeuing the unforwardable messages from the plurality of receive queues and enqueuing the unforwardable messages to the plurality of traffic engineering queues may include analyzing protocol portions of the messages received by the plurality of network interfaces. As a result of the analyzing, for messages in which the protocol portions indicate bidirectional forwarding detection (BFD), the messages may be enqueued to the plurality of traffic engineering queues.

Dequeuing the unforwardable messages from the plurality of receive queues and enqueuing the unforwardable messages to the plurality of traffic engineering queues may include analyzing protocol portions of the messages received by the plurality of network interfaces. As a result of the analyzing, for messages in which the protocol portions indicate address resolution protocol (ARP), bidirectional forwarding detection (BFD) or routing, the messages may be enqueued to the plurality of traffic engineering queues.

Dequeuing the unforwardable messages from the plurality of receive queues and enqueuing the unforwardable messages to the plurality of traffic engineering queues may include analyzing protocol portions of the messages received by the plurality of network interfaces. As a result of the analyzing, for messages in which the protocol portions indicate address resolution protocol (ARP), the messages may be enqueued to the plurality of traffic engineering queues.

Dequeuing the forwardable and unforwardable messages from the plurality of receive queues, enqueuing the forwardable messages to the plurality of transmit queues and enqueuing the unforwardable messages to the plurality of traffic engineering queues may include comparing address portions of the messages received by the plurality of network interfaces to address data stored in a flow table. As a result of the comparing, for messages in which the address portions match the address data, the messages may be enqueued to the plurality of transmit queues. For messages in which the address portions do not match the address data, the messages may be enqueued to the plurality of traffic engineering queues.

Storing the data in the memory may include storing the data in the memory such that the plurality of traffic engineering queues includes at least one address resolution protocol (ARP) traffic engineering queue. Storing the data in the memory may include storing the data in the memory such that the plurality of service queues includes an ARP service queue.

Processing the unforwardable messages and the internally-generated messages by the plurality of service processes may include processing unforwardable messages dequeued from the ARP service queue by an ARP service process.

Storing the data in the memory may include storing the data in the memory such that the plurality of traffic engineering queues includes at least one bidirectional forwarding detection (BFD) traffic engineering queue, at least one flow setup traffic engineering queue and at least one routing traffic engineering queue. Storing the data in the memory may include storing the data in the memory such that the plurality of service queues further includes a BFD service queue, a flow setup service queue and a routing service queue.

Processing the unforwardable messages and the internally-generated messages by the plurality of service processes may further include processing unforwardable messages dequeued from the BFD service queue by a BFD service process, processing unforwardable messages dequeued from the flow setup service queue by a flow setup service process and processing unforwardable messages dequeued from the routing service queue by a routing service process.

The router may include a plurality of P processors coupled to the memory. Storing the data in the memory may include storing the data in the memory such that the plurality of traffic engineering queues includes a number (P) of ARP traffic engineering queues The method may further include associating each ARP traffic engineering queue of the P ARP traffic engineering queues with a different one of the P processors.

For each traffic engineering queue of the plurality of traffic engineering queues, dequeuing the unforwardable messages from the plurality of receive queues and enqueuing the unforwardable messages to the traffic engineering queue may include dequeuing the unforwardable messages and enqueuing the unforwardable messages by only the one processor associated with the traffic engineering queue.

The router may include a plurality of P processors coupled to the memory. Storing the data in the memory may include storing the data in the memory such that the plurality of traffic engineering queues includes a number (P) of ARP traffic engineering queues, a number (P) of BFD traffic engineering queues, a number (P) of flow setup traffic engineering queues and a number (P) of routing traffic engineering queues.

The method may further include associating each ARP traffic engineering queue of the P ARP traffic engineering queues with a different one of the P processors. The method may further include associating each BFD traffic engineering queue of the P ARP traffic engineering queues with a different one of the P processors. The method may further include associating each flow setup traffic engineering queue of the P ARP traffic engineering queues with a different one of the P processors. The method may further include associating each routing traffic engineering queue of the P ARP traffic engineering queues with a different one of the P processors.

For each traffic engineering queue of the plurality of traffic engineering queues, dequeuing the unforwardable messages from the plurality of receive queues and enqueuing the unforwardable messages to the traffic engineering queue may include dequeuing the unforwardable messages and enqueuing the unforwardable messages by only the one processor associated with the traffic engineering queue.

Yet another embodiment of the present invention provides a non-transitory computer-readable medium. The medium is encoded with instructions. When executed by a processor, the instructions establish processes for performing a computer-implemented method. The method automatically protects resources within a network router from flooding by large number of messages. The router includes a plurality of network interfaces.

The processes include a process storing data in a memory of the router. The data represents a plurality of receive queues, a plurality of transmit queues, a plurality of traffic engineering queues and a plurality of service queues.

The processes also include a process associating each network interface of the plurality of network interfaces with at least one receive queue of the plurality of receive queues and at least one transmit queue of the plurality of transmit queues.

The processes also include a process configuring each network interface of the plurality of network interfaces to automatically enqueue messages received by the network interface from outside the router to the at least one receive queue associated with the network interface. The process also configures each network interface to dequeue messages from the at least one transmit queue associated with the network interface for transmission by the network interface to outside the router The processes also include a process dequeuing forwardable messages from the plurality of receive queues and enqueuing the forwardable messages to the plurality of transmit queues.

The processes also include a process dequeuing unforwardable messages from the plurality of receive queues and enqueuing the unforwardable messages to the plurality of traffic engineering queues. Unforwardable messages are dropped when ones of the traffic engineering queues are full.

The processes also include a process dequeuing the unforwardable messages from the plurality of traffic engineering queues and enqueuing the unforwardable messages to the plurality of service queues. Each service queue of the plurality of service queues is at most a predetermined fraction, less than 100%, full.

The processes also include a process generating, within the router, internally-generated messages. The internally-generated messages are to the plurality of service queues, without regard to fullness of the service queues.

The processes also include a process dequeuing the unforwardable messages and the internally-generated messages from the plurality of service queues. The process processes the unforwardable messages and the internally-generated messages by a plurality of service processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 9 is a schematic diagram showing session-related data associated with an AIPR 1 based on the lead packet processing of FIG. 8.

FIG. 10 is a schematic diagram showing session-related data associated with another AIPR based on the lead packet processing of FIG. 8.

FIG. 11 is a schematic diagram showing session-related data associated with yet another AIPR based on the lead packet processing of FIG. 8.

DESCRIPTION OF ILLUSTRATIVE EMBODIMENTS

Embodiments of the present invention improve performance and reliability of network routers. According to the present invention, a self-protecting router manages its queue resources so as to limit an extent to which the queues can be filled with potentially malicious or otherwise harmful messages received from outside the router, thereby ensuring the queues have sufficient room to accept messages generated internally within the router and are necessary for management and operation of the router. Such routers are, therefore, immune to attack by floods of messages from malicious or malfunctioning network nodes, such as computers, switches and other routers.

The queue resources are controlled in a way that maintains a relatively constant rate of message processing, without resort to artificial rate-limiting mechanisms. Optionally, an active queue management (AQM) system may be included to shape message dropping behavior during a flood, i.e., control the types of messages that are dropped, and thereby provide better service to preferred message types.

Networks

Illustrative embodiments preferably are implemented on a conventional computer network. Among other things, a network includes at least two nodes and at least one link between the nodes. Nodes can include computing devices (sometimes referred to as hosts or devices) and routers. Computers include personal computers, smart phones, automatic teller machines (ATMs) and many other types of equipment that include processors and network interfaces. Links include wired and wireless connections between pairs of nodes. In addition, nodes and/or links may be implemented completely in software, such as in a virtual machine, a software defined network, and using network function virtualization. For example, nodes in a network may be within a single device, such as instances of a router inside a hardware router, and/or nodes in the Internet (e.g., routers) as discussed below. Many networks also include switches, which are largely transparent for purposes of this discussion. However, some switches also perform routing functions. For the present discussion, such routing switches are considered routers. Routers are described below.

Figure 1:
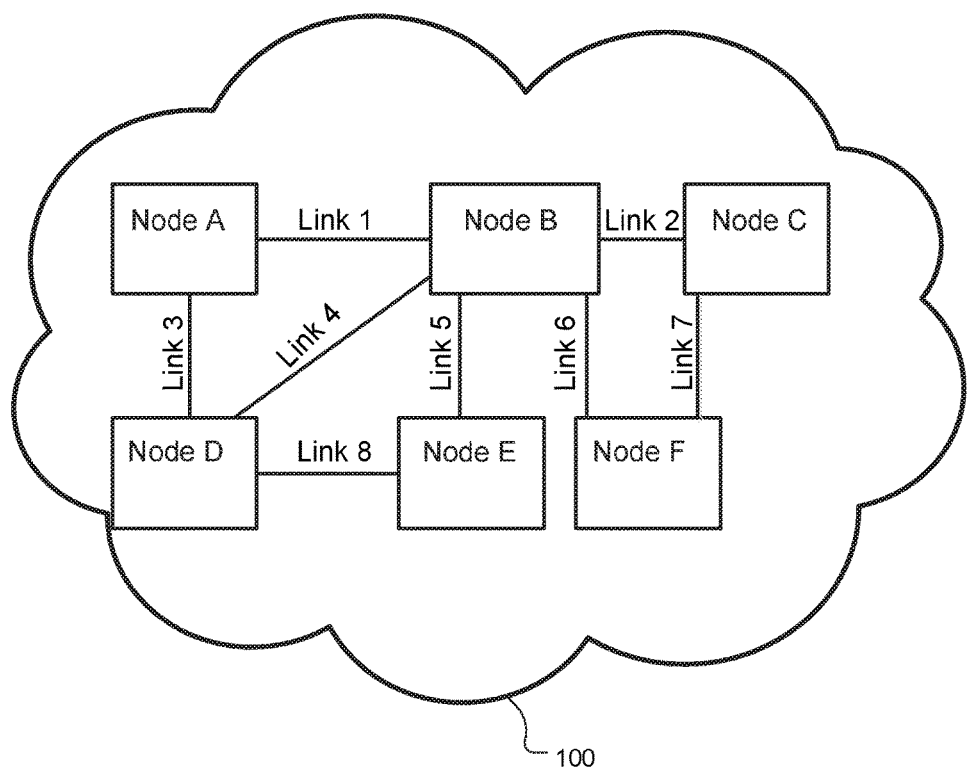
FIG. 1 schematically shows a hypothetical prior art network that may implement illustrative embodiments of the invention.

A node can be directly connected to one or more other nodes, each via a distinct link. For example, FIG. 1 schematically shows a Node A directly connected to Node B via Link 1. In a given network (e.g., within a local area network), each node has a unique network address to facilitate sending and receiving data. A network includes all the nodes addressable within the network according to the network's addressing scheme and all the links that interconnect the nodes for communication according to the network's addressing scheme. For example, in FIG. 1, Node A, Node B, Node C . . . Node F and all the links 1-8 together make up a network 100. For simplicity, a network is depicted as a cloud or as being enclosed within a cloud.

Nodes initiate communications with other nodes via the network, and nodes receive communications initiated by other nodes via the network. For example, a node may transmit/forward/send data (a message) to a directly connected (adjacent) node by sending the message via the link that interconnects the adjacent nodes. The message includes the network address of the sending node (the "source address") and the network address of the intended receiving node (the "destination address"). A sending node can send a message to a non-adjacent node via one or more other nodes. For example, Node D may send a message to Node F via Node B. Using well known networking protocols, the node(s) between the source and the destination forward the message until the message reaches its destination. Accordingly, to operate properly, network protocols enable nodes to learn or discover network addresses of non-adjacent nodes in their network.

Nodes communicate via networks according to protocols, such as the well-known Internet Protocol (IP) and Transmission Control Protocol (TCP). The protocols are typically implemented by layered software and/or hardware components, such as according to the well-known seven-layer Open System Interconnect (OSI) model. As an example, IP operates at OSI Layer 3 (Network Layer), while the TCP operates largely at OSI Layer 4 (Transport Layer). Each layer performs a logical function and abstracts the layer below it, therefore hiding details of the lower layer.

Figure 2:
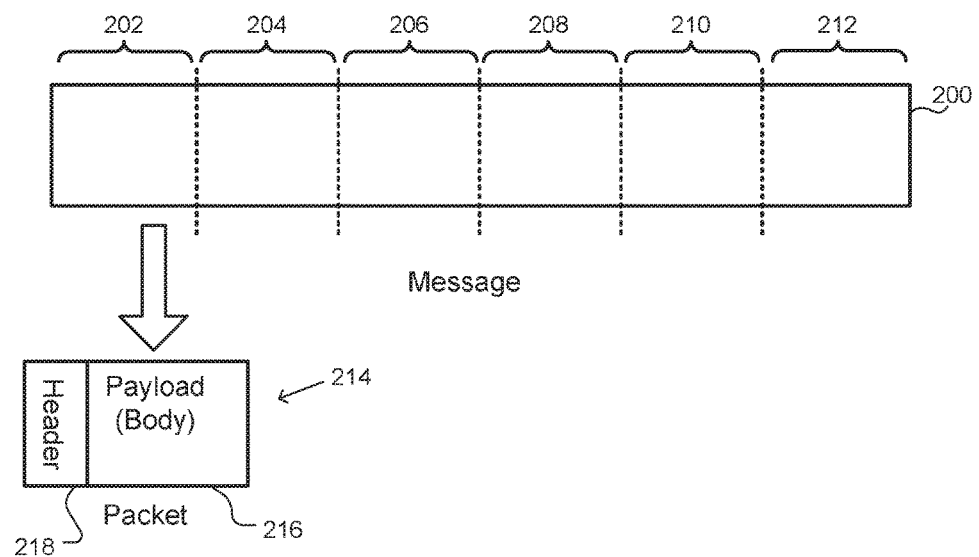
FIG. 2 schematically illustrates a prior art technique for fragmenting a message.

For example, Layer 3 may fragment a large message into smaller packets if Layer 2 (Data Link Layer) cannot handle the message as one transmission. FIG. 2 schematically illustrates a large message 200 divided into several pieces 202, 204, 206, 208, 210 and 212. Each piece 202-212 may then be sent in a separate packet, exemplified by packet 214. Each packet includes a payload (body) portion, exemplified by payload 216, and a header portion, exemplified at 218. The header portion 218 contains information, such as the packet's source address, destination address and packet sequence number, necessary or desirable for: 1) routing the packet to its destination, 2) reassembling the packets of a message, and 3) other functions provided according to the protocol. In some cases, a trailer portion is also appended to the payload, such as to carry a checksum of the payload or of the entire packet. All packets of a message need not be sent along the same path, i.e., through the same nodes, on their way to their common destination. It should be noted that although IP packets are officially called IP datagrams, they are commonly referred to simply as packets.

Some other protocols also fragment data into packets. For example, the well-known TCP protocol fragments data into segments, officially referred to as TCP protocol data units (PDUs). Nevertheless, in common usage, the term packet is used to refer to PDUs and datagrams, as well as Ethernet frames.

Most protocols encapsulate packets of higher level protocols. For example, IP encapsulates a TCP packet by adding an IP header to the TCP packet to produce an IP packet. Thus, packets sent at a lower layer can be thought of as being made up of packets within packets. Conventionally, a component operating according to a protocol examines or modifies only information within a header and/or trailer that was created by another component, typically within another node, operating according to the same protocol. That is, conventionally, components operating according to a protocol do not examine or modify portions of packets created by other protocols.

In another example of abstraction provided by layered protocols, some layers translate addresses. Some layers include layer-specific addressing schemes. For example, each end of a link is connected to a node via a real (e.g., electronic) or virtual interface, such as an Ethernet interface. At Layer 2 (Data Link Layer), each interface has an address, such as a media access control (MAC) address. On the other hand, at Layer 3 using IP, each interface, or at least each node, has an IP address. Layer 3 converts IP addresses to MAC addresses.

Figure 3:
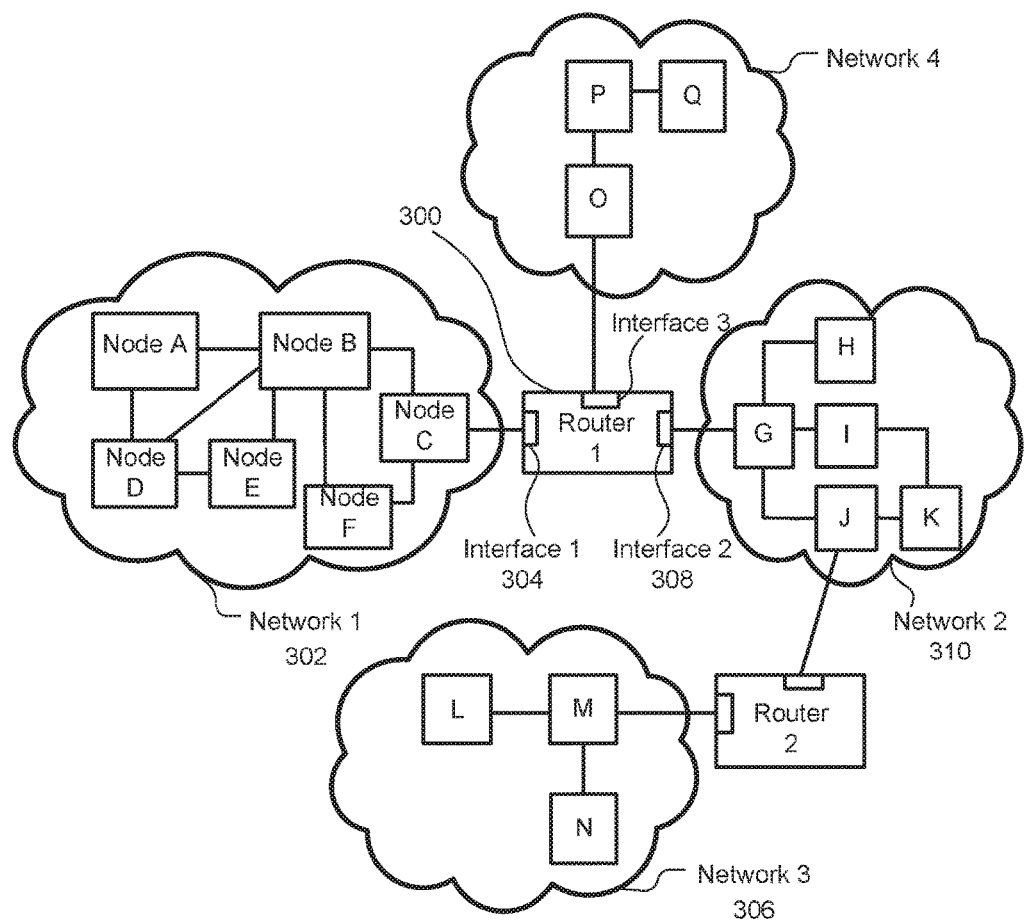
FIG. 3 schematically shows a hypothetical internet that may implement illustrative embodiments of the invention.

A router typically acts as a node that interconnects two or more distinct networks or two or more sub-networks (subnets) of a single network, thereby creating a "network of networks" (i.e., an internet). Thus, a router has at least two interfaces; i.e., one where each interface connects the router to a different network, as exemplified in FIG. 3. When a router receives a packet via one interface from one network, it uses information stored in its routing table to direct the packet to another network via another interface. The routing table thus contains network/next hop associations. These associations tell the router that a particular destination can optimally be reached by sending the packet to a specific router that represents a next hop on the way to the final destination. For example, if Router 1 (300) receives a packet, via its Interface 1 (304), from Network 1 (302), and the packet is destined to a node in Network 3 (306), the Router 1 (300) consults its router table and then forwards the packet via its Interface 2 (308) to Network 2 (310). Network 2 (310) will then forward the packet to Network 3 (306). The next hop association can also be indicated in the routing table as an outgoing (exit) interface to the final destination.

Indeed, the next hop router or node for a given session can be determined in a variety of different manners. The below discussion about FIGS. 4-7 addresses improved techniques for determining next hop routers in accordance with illustrative embodiments of the invention.

Large organizations, such as large corporations, commercial data centers and telecommunications providers, often employ sets of routers in hierarchies to carry internal traffic. For example, one or more gateway routers may interconnect each organization's network to one or more Internet service providers (ISPs). ISPs also employ routers in hierarchies to carry traffic between their customers' gateways, to interconnect with other ISPs, and to interconnect with core routers in the Internet backbone.

A router is considered a Layer 3 device because its primary forwarding decision is based on the information in the Layer 3 IP packet—specifically the destination IP address. A conventional router does not look into the actual data contents (i.e., the encapsulated payload) that the packet carries. Instead, the router only looks at the Layer 3 addresses to make a forwarding decision, plus optionally other information in the header for hints, such as quality of service (QoS) requirements. Once a packet is forwarded, a conventional router does not retain any historical information about the packet, although the forwarding action may be collected to generate statistical data if the router is so configured.

As noted, when a router receives a packet via one interface from one network, the router uses its routing table to direct the packet to another network. Table 1 lists information typically found in a basic IP routing table (stored in memory).

TABLE 1

| | |
|---|---|
| Destination | Partial IP address (Expressed as a bit-mask) or Complete IP address of a packet's final destination |
| Next hop | IP address to which the packet should be forwarded on its way to the final destination |
| Interface | Outgoing network interface to use to forward the packet |
| Cost/Metric | Cost of this path, relative to costs of other possible paths |
| Routes | Information about subnets, including how to reach subnets that are not directly attached to the router, via one or more hops; default routes to use for certain types of traffic or when information is lacking |

Routing tables may be filled in manually, such as by a system administrator, or dynamically by the router. The router uses routing protocols to exchange information with other routers and, thereby, dynamically learn about surrounding network or internet topology. For example, routers announce their presence in the network(s), more specifically, the range of IP addresses to which the routers can forward packets. Neighboring routers update their routing tables with this information and broadcast their ability to forward packets to the network(s) of the first router. This information eventually spreads to more distant routers in a network. Dynamic routing allows a router to respond to changes in a network or internet, such as increased network congestion, new routers joining an internet and router or link failures.

A routing table therefore provides a set of rules for routing packets to their respective destinations. When a packet arrives, a router examines the packet's contents, such as its destination address, and finds the best matching rule in the routing table. The rule essentially tells the router which interface to use to forward the packet and the IP address of a node to which the packet is forwarded on its way to its final destination IP address.

With hop-by-hop routing, each routing table lists, for all reachable destinations, the address of the next node along a path to that destination, i.e., the next hop. Assuming that the routing tables are consistent, a simple algorithm of each router relaying packets to their destinations' respective next hop suffices to deliver packets anywhere in a network. Hop-by-hop is a fundamental characteristic of the IP Internetwork Layer and the OSI Network Layer. As noted above and discussed below, however, there may be a number of possible next hop node options. Accordingly, in some embodiments, the next hop node selected for a given session can be determined based on a number of factors, such as the traffic and load on a number of potential next hop nodes.

Thus, each router's routing table typically merely contains information sufficient to forward a packet to another router that is "closer" to the packet's destination, without a guarantee of the packet ever being delivered to its destination. In a sense, a packet finds its way to its destination by visiting a series of routers and, at each router, using then-current rules to decide which router to visit next, with the hope that at least most packets ultimately reach their destinations.

Note that the rules may change between two successive hops of a packet, or between two successive packets of a message, such as if a router becomes congested or a link fails. Two packets of a message may, therefore, in some cases, follow different paths and even arrive out of order. In other words, when a packet is sent by a source node, there is no predetermined path the packet will take between the source node and the packet's destination. Instead, the path typically is dynamically determined as the packet traverses the various routers. This may be referred to as "natural routing," i.e., a path is determined dynamically as the packet traverses the internet.

It should be noted that conventionally, packets sent by the destination node back to the source node may follow different paths than the packets from the source node to the destination node.

In many situations, as suggested above, a client computer node establishes a session with a server computer node, and the client and server exchange packets within the session. For example, a client computer executing a browser may establish a session with a web server. The client may send one or more packets to request a web page, and the web server may respond with one or more packets containing contents of the web page. In some types of sessions, this back-and-forth exchange of packets may continue for several cycles. In some types of sessions, packets may be sent asynchronously between the two nodes.

A session has its conventional meaning; namely, it is a plurality of packets sent by one node to another node, where all the packets are related, according to a protocol. A session may be thought of as including a lead (or initial) packet that begins the session, and one or more subsequent packets of the session. A session has a definite beginning and a definite end. For example, a TCP session is initiated by a SYN packet. In some cases, the end may be defined by a prescribed packet or series of packets. For example, a TCP session may be ended with a FIN exchange or an RST. In other cases, the end may be defined by lack of communication between the nodes for at least a predetermined amount of time (a timeout time). For example, a TCP session may be ended after a defined timeout period. Some sessions include only packets sent from one node to the other node. Other sessions include response packets, as in the web client/server interaction example. A session may include any number of cycles of back-and-forth communication, or asynchronous communication, according to the protocol, but all packets of a session are exchanged between the same client/server pair of nodes. A session is also referred to herein as a series of packets.

A computer having a single IP address may provide several services, such as web services, e-mail services, and file transfer (FTP) services. Each service is typically assigned a port number in the range 0-65,535 that is unique on the computer. A service is, therefore, defined by a combination of the node's IP address and the service's port number. Note that this combination is unique within the network the computer is connected to, and it is often unique within an internet. Similarly, a single node may execute many clients. Therefore, a client that makes a request to a service is assigned a unique port number on the client's node, so return packets from the service can be uniquely addressed to the client that made the request.

The term socket means an IP address-port number combination. Thus, each service has a network-unique, and often internet-unique, service socket, and a client making a request of a service is assigned a network-unique, and sometimes internet-unique, client socket. In places, the terms source client and destination service are used when referring to a client that sends packets to make requests of a service and the service being requested, respectively.

Self-Protecting Router

Figure 4:
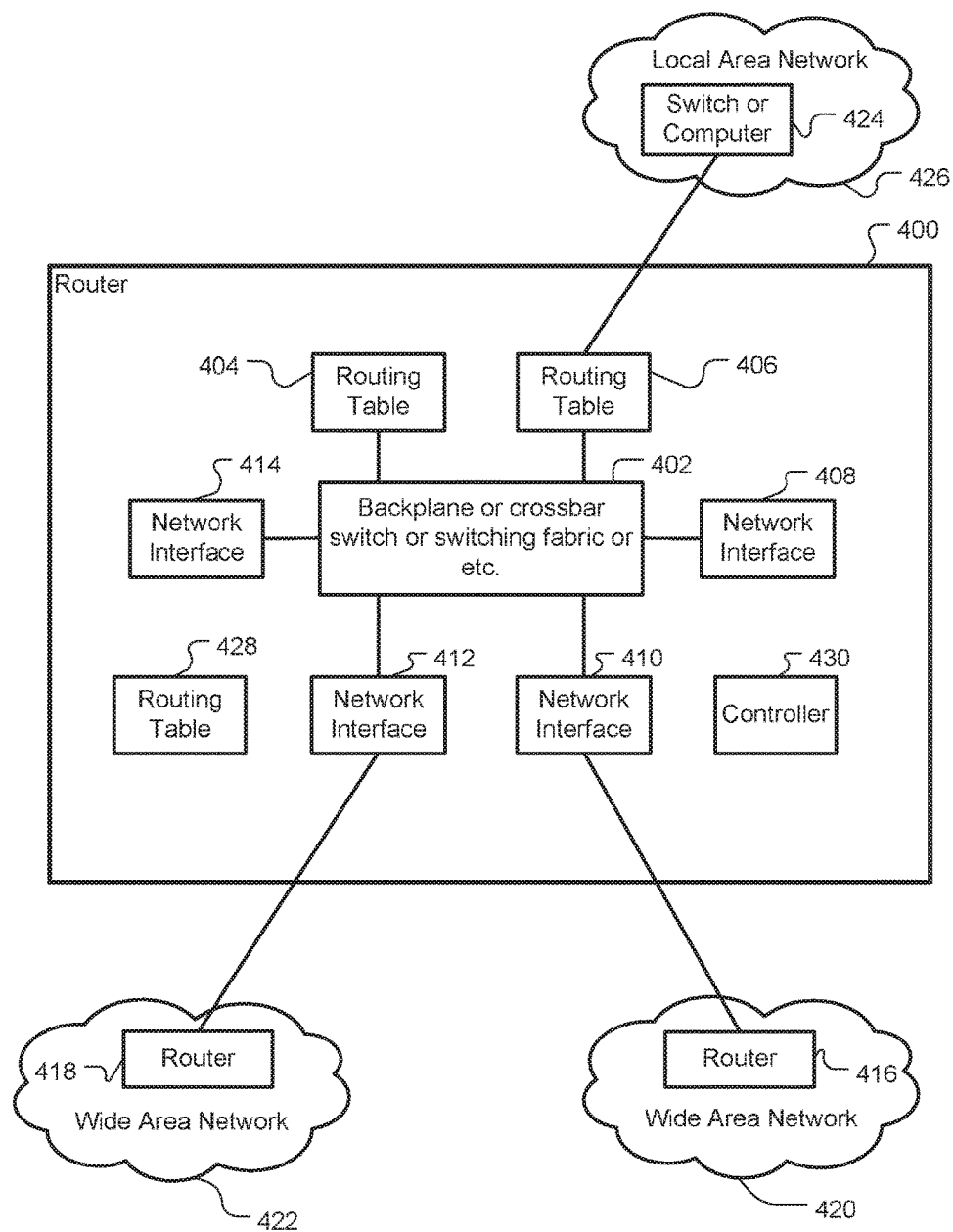
FIG. 4 is a schematic block diagram of a computer network router, according to the prior art.

As noted, a router typically acts as a network node that interconnects two or more distinct networks or two or more sub-networks (subnets) of a single network. FIG. 4 is a schematic block diagram of an exemplary conventional dedicated-function hardware-based computer network router 400. The router 400 includes a backplane, crossbar switch, switching fabric or other fast interconnect component 402. The router 400 also includes a plurality of network interfaces 404, 406, 408, 410, 412 and 414, each connected to the fast interconnect component 402.

Each network interface 404-414 may be electrically coupled to another network interface in another router or some other network node, such as a switch or computer, to establish a network connection between the router 400 and the other component. For example, network interfaces 410 and 412 are shown connected to respective routers 416 and 418 in respective wide area networks (WANs) 420 and 422.

Similarly, network interface 408 is shown connected to a switch or computer 424 in a local area network (LAN) 426.

The router 400 includes a routing table 428 and a controller 430. The controller 430 uses information in the routing table 428 to route packets received by the network interfaces 404-414 toward their respective destinations. For example, the controller 430 can use the destination address in a packet to index into the routing table 428 and thereby ascertain an outgoing network interface 404-414 that should be used to forward the packet. The controller 430 then commands the fast interconnect component 402 to establish a link between the network interface 404-414 on which the packet was received and the network interface 404-414 on which the packet should be sent.

Instead of using dedicated-function routers, router functions have been virtualized by performing some or all of the functions described with respect to FIG. 4 by one or more processors in so-called "software routers." However, regardless of whether a router is implemented in dedicated-function hardware or in a virtual machine, each network interface 404-414 is typically handled by a device driver that enqueues incoming packets onto one or more queues for subsequent processing. The subsequent processing may involve simply enqueuing the packet for transmission by an outgoing network interface, or the processing may be more complex, such as resolving the packet's destination address or processing a network management packet.

Figure 5:
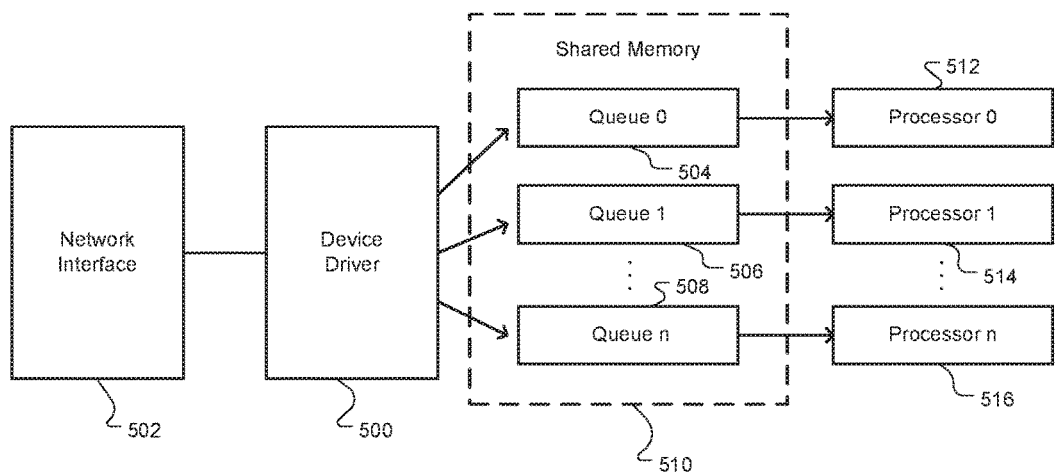
FIG. 5 is a schematic block diagram of queues, on which incoming data is enqueued by a network interface of the router of FIG. 4, as well as an assignment to processors to the queues, according to the prior art.

FIG. 5 is a block diagram schematically illustrating how an exemplary device driver 500 enqueues packets received by an exemplary network interface 502 onto a set of queues, represented by exemplary queues 504, 506 and 508. The queues 504-508 may be stored in shared memory 510 that is accessible by a plurality of processors, represented by exemplary processors 512, 514 and 516. Each queue 504-510 is assigned to one of the processors 512-516 for processing. Distributing the incoming packets across a plurality of queues 504-508, and therefore a plurality of processors 512-516, enables the incoming packets to be processed more quickly than if a single processor handled all the packets received by the network interface 502. Such a scheme is used in the well-known receive side scaling (RSS) network driver technology.

With one network interface 502, the number of queues 504-508 is typically determined by the number of available processors 512-516, and the assignment of queues to processors is straight forward. However, as schematically illustrated in FIG. 6, with more than one network interface, the queue-to-processor assignment task becomes complex.

Figure 6:
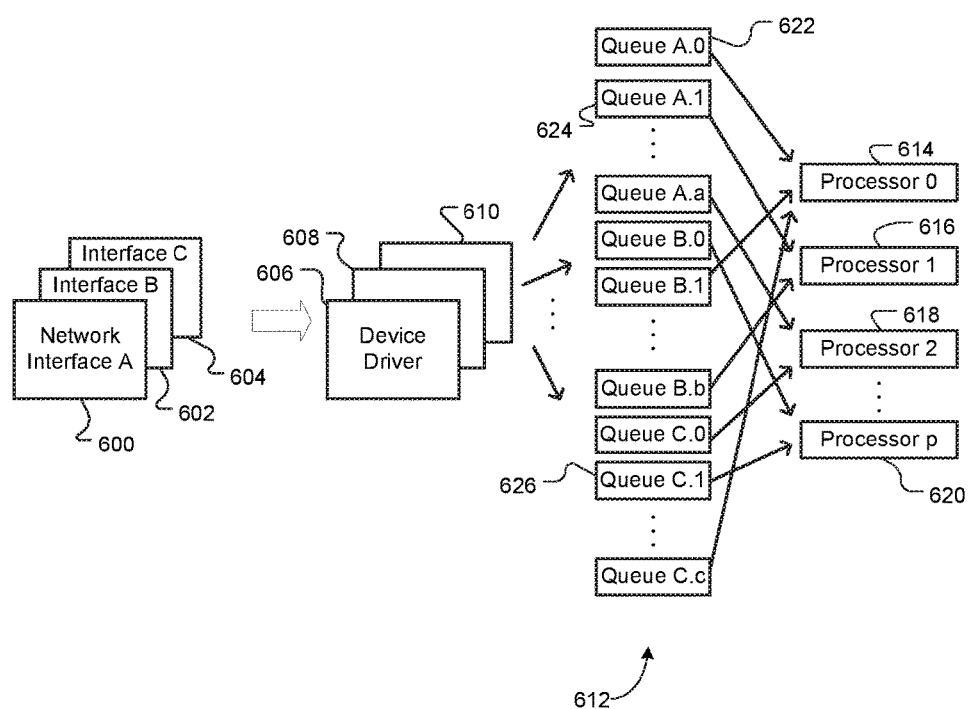
FIG. 6 is a schematic block diagram of queues, such as the queues of FIG. 5, for several network interfaces of the router of FIG. 4, as well as assignments of processors to the queues, according to the prior art.

In the example shown in FIG. 6, three network interfaces 600, 602 and 604 are handled by respective device drivers 606, 608 and 610, and the device drivers 606-610 enqueue packets received by the network interfaces 600-604 on queues, generally indicated at 612. The number of queues 612 per network interface 600-604 need not be equal for all the network interfaces 600-604. For example, some of the network interfaces 600-604 may have only one queue 612 each, whereas other of the network interfaces 600-604 may have multiple queues 612. A number (P) of processors, represented by processors 614, 616, 618 and 620, is available for processing received packets.

The queues 612 are not thread safe. That is, each queue 612 should be accessed by only one processor 614-620. Although spinlocks or other locking mechanisms could be used to make the queues 612 thread safe, i.e., provide one-processor-at-a-time shared access by multiple processors 614-620 to each queue 612, the performance penalty of such locking mechanisms typically precludes their use.

Therefore, by convention, each queue 612 is assigned to exactly one processor 614-620.

In FIG. 6, each network interface 600-604 is given a letter designation (A, B or C), and each queue 612 is numbered (0, 1, 2, 3, . . . ) and given a designation (A, B or C) that identifies the network interface 600-604 from which data packets are enqueued. The letter and number designations are combined. For example, queue 622 is designated "A.0" to indicate the queue 622 handles packets enqueued from network interface 600 (A), and the queue 622 is the 0th queue that handles packets from the network interface 600 (A). Similarly, queue 624 is designated "A.1" to indicate the queue 624 handles packets enqueued from network interface 600 (A), and the queue 624 is the 1st queue that handles packets from the network interface 600 (A). Likewise, queue 626 is designated "C.1" to indicate the queue 626 handles packets enqueued from network interface 604 (C), and the queue 624 is the 1st queue that handles packets from the network interface 604 (C).

Unlike the simple case of a single network interface discussed with respect to FIG. 5, assigning processors 614-620 to queues 612 of multiple network interfaces 600-604 poses problems. Typically, fewer processors 614-620 are available than queues 612. Therefore, most or all of the processors 614-620 handle multiple queues. However, assigning a given processor 614-620 to handle two or more queues associated with one network interface 600-604 provides no advantage and can decrease performance. Unequally distributing the processors 600-604 to the queues 612 can cause delays of packets, or dropping of packets, received by network interfaces 600-604 that are underserved by the processors 614-620. Assigning excessive numbers of processors 600-604 to some of the queues 612, at the expense of other queues 612, wastes valuable processor resources.

Figure 24:
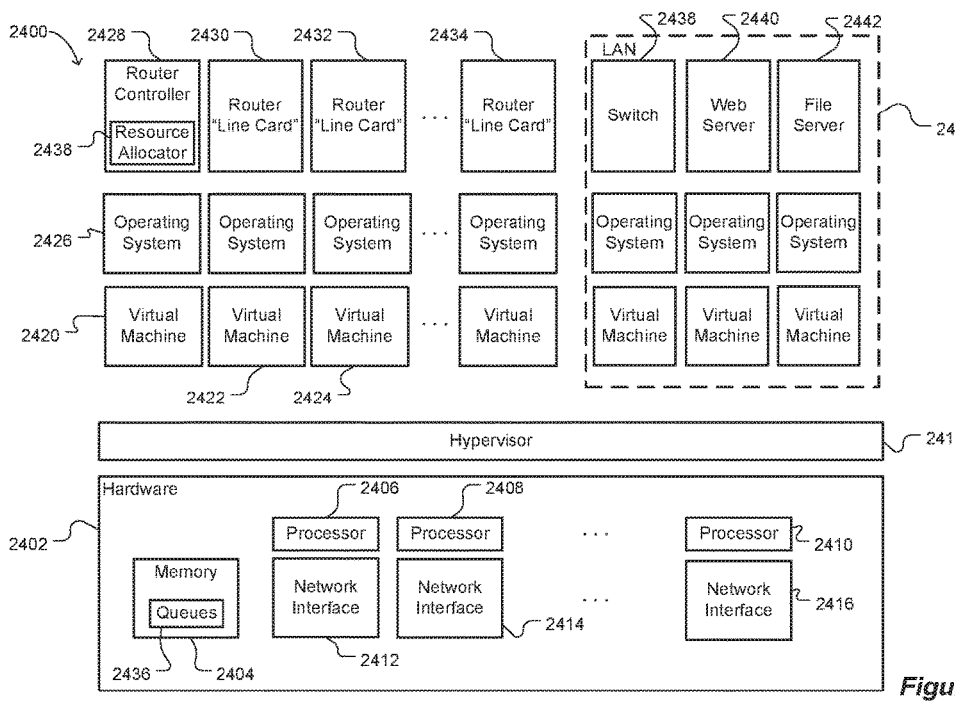
FIG. 24 is a schematic block diagram of a router, according to an embodiment of the present invention.

FIG. 24 is a schematic block diagram of a router 2400, according to an embodiment of the present invention. The router 2400 is implemented as a combination of hardware components 2402 and software modules. The hardware components 2402 include a memory 2404 and a plurality of processors, exemplified by processors 2406, 2408 and 2410. The hardware components 2402 may also include one or more network interfaces, exemplified by network interfaces 2412, 2414 and 2416, by which the router 2400 may be connected via one or more physical links to other network routers, etc.

Using well-known techniques, a hypervisor 2418 makes one or more of the processors 2406-2410, and at least a portion of the memory 2404, available to each of a plurality of virtual machines, exemplified by virtual machines 2420, 2422 and 2424. Also by well-known techniques, the hypervisor 2418 may make available ones of the network interfaces 2412-2416 to ones of the virtual machines 2420-2424. Optionally, a respective operating system, exemplified by operating system 2426, is executed by each virtual machine 2420-2424 in a conventional manner.

One virtual machine 2420 executes a router controller module 2428, and other virtual machines 2422, 2424, etc. execute respective router "line card" modules, exemplified by router line card modules 2430, 2432 and 2434. The router line card modules perform at least some of the functions that are performed by conventional hardware-based router line cards. It should be noted that the configuration of the hardware components 2402, i.e., the number of processors 2406-2410 and the number of network interfaces 2412-2416, as well as the number of router line card modules 2430-2434, is exemplary for a hypothetical router, and other embodiments may include other numbers of these components.

Referring momentarily back to FIG. 4, in some conventional routers, each network interface 404-414 is constructed on a separate plug-in circuit board often referred to as a "line card." A hardware line card includes circuitry to send and receive electrical or optical signals over network links, modulate and demodulate these signals, accumulate received data into packets, serialize data in packets that are to be transmitted, in some cases buffer received data, transfer received data to memory, such as via direct memory access (DMA), generate interrupt signals to indicate to a processor when a DMA transfer has been completed, in some cases perform protocol analysis, such as on headers of packets, and the like. Essentially, each hardware line card provides send and receive capability over a single network link.

Returning to FIG. 24, the router line card modules 2430-2434 provide capabilities analogous to at least some of the capabilities of the hardware line cards in a conventional router. That is, each router line card module 2430-2434 provides send and receive capability over a single network link. The link may extend via one of the network interfaces 2412-2416 to a node external to the router 2400 or, via a bus (not shown) that interconnects the hardware components 2402, between pairs of the router line card modules 2430-2434. The well-known Data Plane Development Kit (DPDK) may be used to implement portions of the line card modules 2430-2434.

Device drivers being executed by the virtual machines 2420-2424 manipulate data in the memory 2404 that represent a plurality of queues 2436. These device drivers and queues 2436 are analogous to the device drivers 606-610 and queues 612 described with reference to FIG. 6. Thus, packets received by the network interfaces 2412-2416 are represented by entries in the queues 2436, also referred to herein as "receive queues." Similarly, packets enqueued by the router line card modules 2430-2434 for transmission by the network interfaces 2412-2416 are represented by entries in the queues 2436, also referred to herein as "transmit queues." The queues 2436 may also be used for packets that are transmitted between pairs of the router line card modules 2430-2434.

Commonly-owned, co-pending U.S. patent application Ser. No. 15/168,495, filed May 31, 2016, titled "Self-Configuring Computer Network Router," the entire contents of which are hereby incorporated herein by reference, discloses a resource allocator 2438 that automatically assigns processors to queues, such that queue workload is distributed as evenly as possible among the processors and the processors are as fully utilized as possible. Consequently, packets do not remain on queues longer than necessary, thereby decreasing latency of packets traversing a router, fewer packets are dropped and available and expensive resources, namely the processors, are kept busy.

Figure 25A:
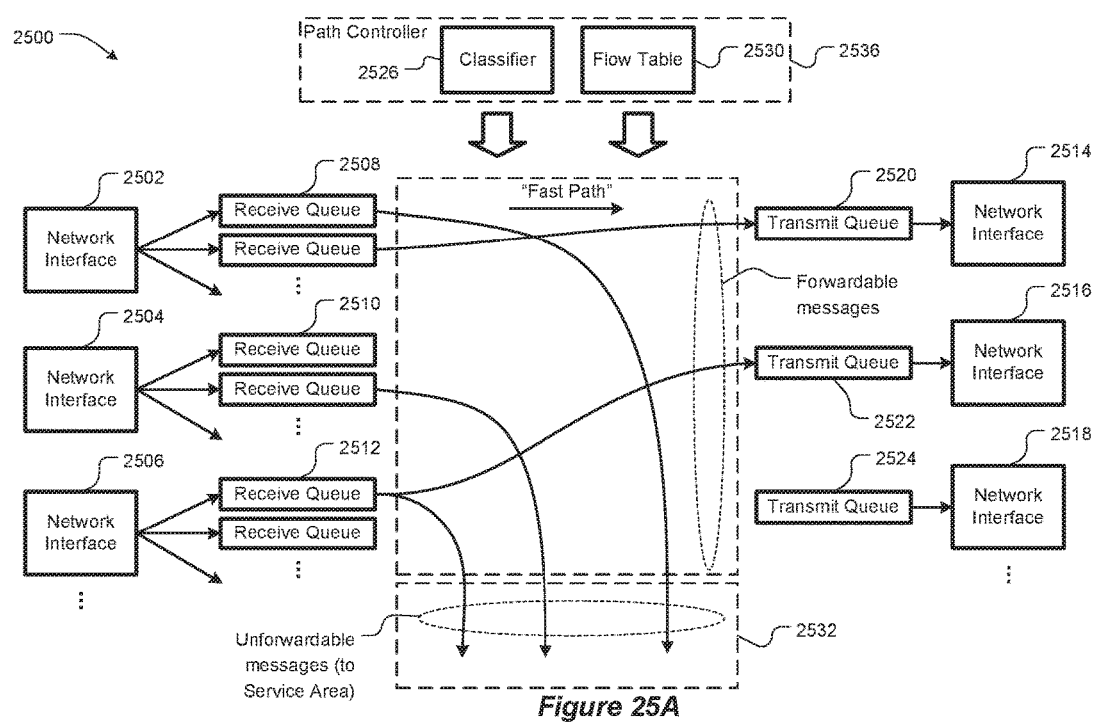
FIGS. 25A and 25B (collectively FIG. 25) is a schematic block diagram of a self-protecting computer network router, according to an embodiment of the present invention.
Figure 25B:
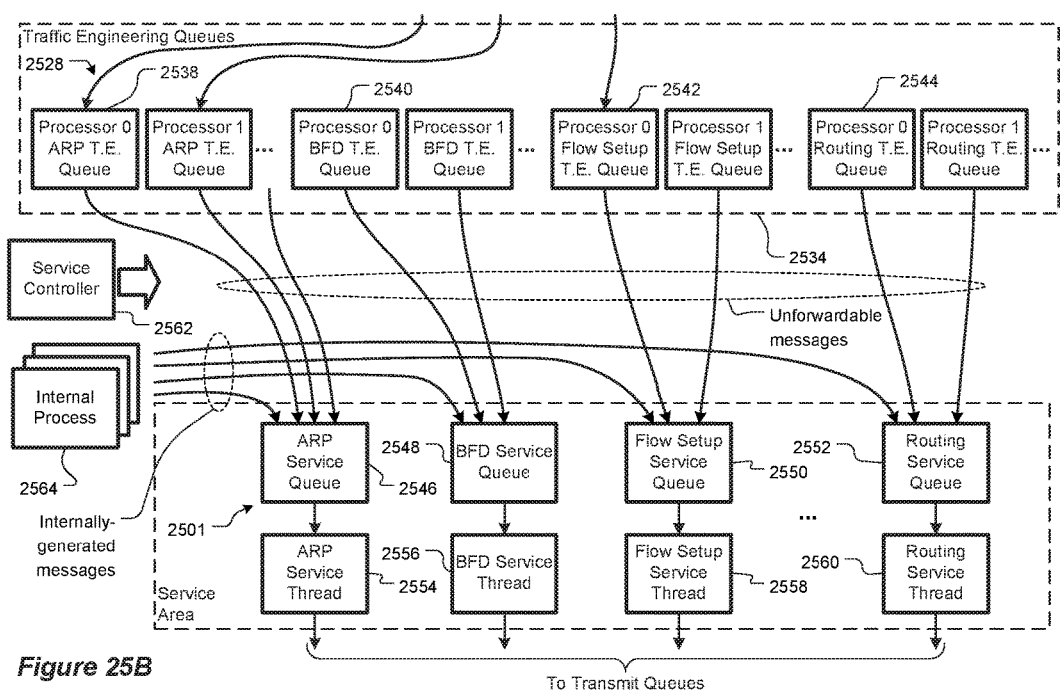

Nevertheless, a flood of network management packets, malformed packets or packets that cannot be forwarded without first processing them can overwhelm a router and prevent the router performing management functions, such as resolving addresses. FIG. 25 is a schematic block diagram of a self-protecting computer network router 2500 that prevents floods of network management packets overwhelming the router. The router 2500 includes service queues, indicated generally at 2501, that are managed so they are never filled more than a predetermined fraction, such as one-half, full with packets received from outside the router 2500. Limiting the extent to which the service queues 2501 are filled with packets received from outside the router ensures the service queues 2501 have room for packets that are generated internally by the router 2500, such as internally-generated ARP packets.

The router 2500 may be implemented in the context described with respect to FIG. 25. An embodiment of a self-protecting network router that manages its queue resources and protects the route from network management packet floods is described in the context of a software router. However, principles described herein are equally applicable to dedicated-function hardware-based routers.

The router 2500 includes a plurality of incoming network interfaces, exemplified by network interfaces 2502, 2504 and 2506, by which the router 2500 receives messages (packets) from outside the router, such as from computers, switches and other routers. Each incoming network interface 2502-2506 is associated with at least one receive queue, exemplified by receive queues 2508, 2510 and 2512. Device drivers (not shown in FIG. 6) enqueue the messages received by the network interfaces 2502-2506 on the receive queues 2508-2512.

The router 2500 may include a number (P) of processors available to handle messages. As used herein, a "processor" is an independent processing unit, sometimes commonly referred to as a "core," that reads and executes program instructions. A single processor may be housed in a single integrated circuit (IC) die or chip package. However, manufacturers typically integrate multiple cores onto a single integrated circuit die, known as a chip multiprocessor or CMP, exemplified by the well-known 18-core Intel Xeon E5 2699v3 multiprocessor IC, or onto multiple dies in a single chip package.

In some embodiments, each incoming network interface 2502-2506 has as many receive queues 2508-2512 as there are processors (P) available in the router 2500, to the extent that individual network interfaces 2502-2506 support multiple receive queues. The processors may be assigned to handle the messages by the resource allocator described in the above-referenced U.S. patent application Ser. No. 15/168,495.

The router 2500 also includes a plurality of outgoing network interfaces, exemplified by network interfaces 2514, 2516 and 2518, by which the router 2500 transmits messages to outside the router. Each outgoing network interface 2514-2518 has an associated transmit queue, exemplified by transmit queues 2520, 2522 and 2522. Messages enqueued on the transmit queues 2520-2522 are automatically transmitted by the network interfaces 2514-2518. As used herein, the term network interface includes a device driver that enqueues and/or dequeues packets to and from the receive queues 2508-2512 and/or the transmit queues 2520-2524.

The router 2500 includes a classifier 2526. The classifier 2526 may be implemented as a software process, i.e., by a processor executing instructions stored in a memory. Alternatively, part or all of the classifier 2526 may be implemented in firmware or in hardware, such as combinatorial logic, a field-programmable gate array (FPGA), an application-specific integrated circuit (ASIC) or another suitable electronic or photonic circuit.

The classifier 2526 dequeues messages from the receive queues 2508-2512 and analyzes portions of the messages to automatically ascertain whether the messages are data messages or network management messages. In some embodiments, the classifier 2526 analyzes header portions of the messages, such as portions of the headers that identify protocols, flags, etc., according to which the messages were constructed and/or sent. An exemplary message header, including a protocol field and flags, is described herein with reference to FIG. 17.

Messages the classifier 2526 identifies as being network management messages are enqueued to appropriate traffic engineering queues, generally indicated at 2528, as discussed in more detail herein.

On the other hand, most data messages are forwarded toward their respective destinations. The classifier 2526 identifies data messages by their protocols, flags, etc. For example, TCP messages are generally data messages. The router 2500 also maintains a flow table 2530. Optionally, in addition to information about sessions (flows), the flow table 2530 may include information similar to information stored in a routing table described herein. As described herein, a session is signaled by a lead message (lead packet). After a lead message has been forwarded, the flow table 2530 stores information about a path along which, or a next Augmented IP Router (AIPR) toward which, subsequent messages of the session should be forwarded. Data messages dequeued from the receive queues 2508-2512, and for which adequate routing information exists in the flow table 2530 to ascertain over which network interface 2514-2518 the messages should be forwarded, are deemed to be "forwardable messages," and the classifier enqueues these forwardable messages to the transmit queues 2520-2524.

The router 2500 may automatically ascertain whether a data message is forwardable by analyzing portions of the data message and referencing the flow table 2530. For example, all or a part of the destination address field of a data message may be compared to address data stored in the flow table 2530. If an appropriate amount of the destination address matches an appropriate amount of the address data in the flow table 2530, the data message may be enqueued to one of the transmit queues 2520-2524 that corresponds to the network interface 2514-2518 identified by the flow table 2530 as the network interface over which the message should be transmitted.

On the other hand, if no matching flow table 2530 entry is found, the data message is enqueued to an appropriate one of the traffic engineering queues 2528, specifically to perform address translation and possibly to store data in the flow table 2530 for a new session (flow), as described herein. Data messages dequeued from the receive queues 2508-2512, and for which no or insufficient routing information exists in the flow table 2530, are deemed to be "unforwardable message."

Network management messages are also deemed to be unforwardable messages and, as noted, are dequeued from the receive queues 2508-2512 and enqueued to the traffic engineering queues 2528.

Thus, forwardable messages may be thought of as traversing a "fast path" 2532 between the receive queues 2508-2512 and the transmit queues 2520-2524. The forwardable messages do not require processing, as that term is used herein, to be analyzed or moved from the receive queues 2508-2512 to the transmit queues 2520-2524. On the other hand, unforwardable messages may be thought of as being detoured to a "service path" 2532 for processing, as that term is used herein. The classifier 2526 and any additional logic necessary to dequeue forwardable and unforwardable messages from the receive queues 2508-2512 and enqueue the messages on the transmit queues 2520-2524 or the traffic engineering queues 2528, as the case may be, are collectively referred to herein as a path controller 2536.

The traffic engineering queues 2528 help protect the router 2500 from floods of incoming messages. Each of the traffic engineering queues 2528 has a finite size. The traffic engineering queues 2528 are configured such that, if a message is attempted to be enqueued to a full queue, the message is dropped. Thus, during a flood, excess unforwardable messages are simply dropped.

Optionally or alternatively, an active queue management (AQM) system, such as random early detection (RED), explicit congestion notification (ECN) or controlled delay (CoDel), may be used to "shape" the types of messages that are dropped during a flood or to implement a desired "fairness" doctrine.

The traffic engineering queues 2528 may include one or more traffic engineering queues for each type of processing that may be performed on a message. Types of processing may include, but are not limited to, processing ARP messages, processing BFD messages, setting up flows (sessions) and routing. In other embodiments, different or additional types of processing may be performed on unforwardable messages, and those embodiments include corresponding traffic engineering queues.

Some embodiments include as many traffic engineering queues for each type of processing as the router 2500 has available processors. For example, assume the router 2500 has P processors available to process the queues. In such an exemplary embodiment, the router 2500 has P ARP traffic engineering queues 2538, P BFD traffic engineering queues 2540, P flow (session) setup queues 2542 and P routing queues 2544. Each traffic engineering queue within each group of processing-type-specific traffic engineering queues, i.e., groups 2538, 2540, 2542 and 2544, may be associated with a unique one of the P available processors, and the associated processor may dequeue and process messages in that traffic engineering queue.

As noted, each receive queue 2508-2510 is handled by a specific one of the P processors. Each message dequeued from one of the receive queues 2508-2512 and enqueued to one of the traffic engineering queues 2528 is enqueued to the traffic engineering queue that is handled by the same processor as handles the receive queue 2508-2510 from which the message was dequeued.

The router 2500 includes one service queue 2501 for each type of processing the router 2500 may perform on unforwardable messages. For example, the embodiment shown in FIG. 25 includes one ARP service queue 2546, one BFD service queue 2548, one session (flow) setup service queue 2550 and one routing service queue 2552.

For each type of processing the router 2500 may perform on unforwardable messages, the router 2500 also includes a component that performs the processing. Each of these components may be implemented as a process, thread or other form of execution, or as a hardware component or a combination thereof. For example, each of these components may be implemented as a software process, i.e., by a processor executing instructions stored in a memory. Alternatively, part or all of each component may be implemented in firmware or in hardware, such as combinatorial logic, a field-programmable gate array (FPGA), an application-specific integrated circuit (ASIC) or another suitable electronic or photonic circuit.

For example, the embodiment shown in FIG. 25 includes one ARP service process 2554, one BFD service process 2556, one session (flow) setup service process 2558 and one routing service process 2560. Each service process 2554-2560 dequeues messages from its respective service queue 2546-2552 and processes the dequeued messages. As noted, each service process may be implemented as a thread. As used in the claims, the term "service process" includes process, thread, hardware implementation and a combination thereof.

A service processes 2554-2560 may generate one or more messages and enqueue the message(s) on one or more transmit queue(s) 2520-2524 for transmission outside the router 2500. For example, the ARP service process 2554 may broadcast an ARP request for the hardware address (target hardware address or THA) that corresponds to an IP address in a destination address of an unforwardable message.

Similarly, a service process 2554-2560 may process and then enqueue an unforwardable message on a transmit queue 2520-2524. For example, once a hardware address of a previously unknown IP address is learned, the routing service process 2552 may modify, if necessary, a previously unforwardable message, making the message now forwardable, and then enqueue the now-forwardable message to an appropriate one of the transmit queues 2520-2524.

As noted, the service queues 2546-2552 are managed so they are never filled more than a predetermined fraction, such as one-half, full with packets received from outside the router 2500. Limiting the extent to which the service queues 2546-2552 are filled with packets received from outside the router 2500 ensures the service queues 2546-2552 have room for packets that are generated internally by the router 2500. A service controller 2562 dequeues the unforwardable messages from the traffic engineering queues 2538-2544 and enqueues the unforwardable messages on the service queues 2546-2552, such that each service queue 2546-2552 is at most the predetermined fraction full.

The predetermined fraction may be defined when the router 2500 is built, via a parameter file, via an administration interface or otherwise. Regardless of the value of the predetermined fraction, no unforwardable message is enqueued to a service queue 2546-2552 if the service queue has room for fewer than one message.

The router 2500 includes one or more internal processes 2564 that generate messages, such as ARP messages and/or BFD messages, in support of management and/or operation of the router 2500. These internal processes 2562 are trusted not to flood the router 2500, as opposed to external computers, switches, routers, etc., which may malfunction or be operated by malicious users and, consequently, flood the router 2500 with messages. Messages generated by the internal processes 2564 are enqueued to the service queues 2546-2552 without regard to fullness of the service queues 2546-2552. Thus, even if a service queue 2546-2552 is more than the predetermined fraction full, the service queue accepts and enqueues messages from the internal processes 2564.

As noted, the router 2500 may be implemented as described with respect to FIG. 24. For example, the receive queues 2508-2512, the transmit queues 2520-2524, the traffic engineering queues 2538-2544 and the service queues 2546-2552 may be stored in the memory 2404 shown in FIG. 24. The classifier 2526, the internal processes 2564 and the service processes 2554-2560 may be executed by the virtual machines 2420-2424, such as by the router controller 2428 and/or the router line card modules 2430-2434.

Figure 26:
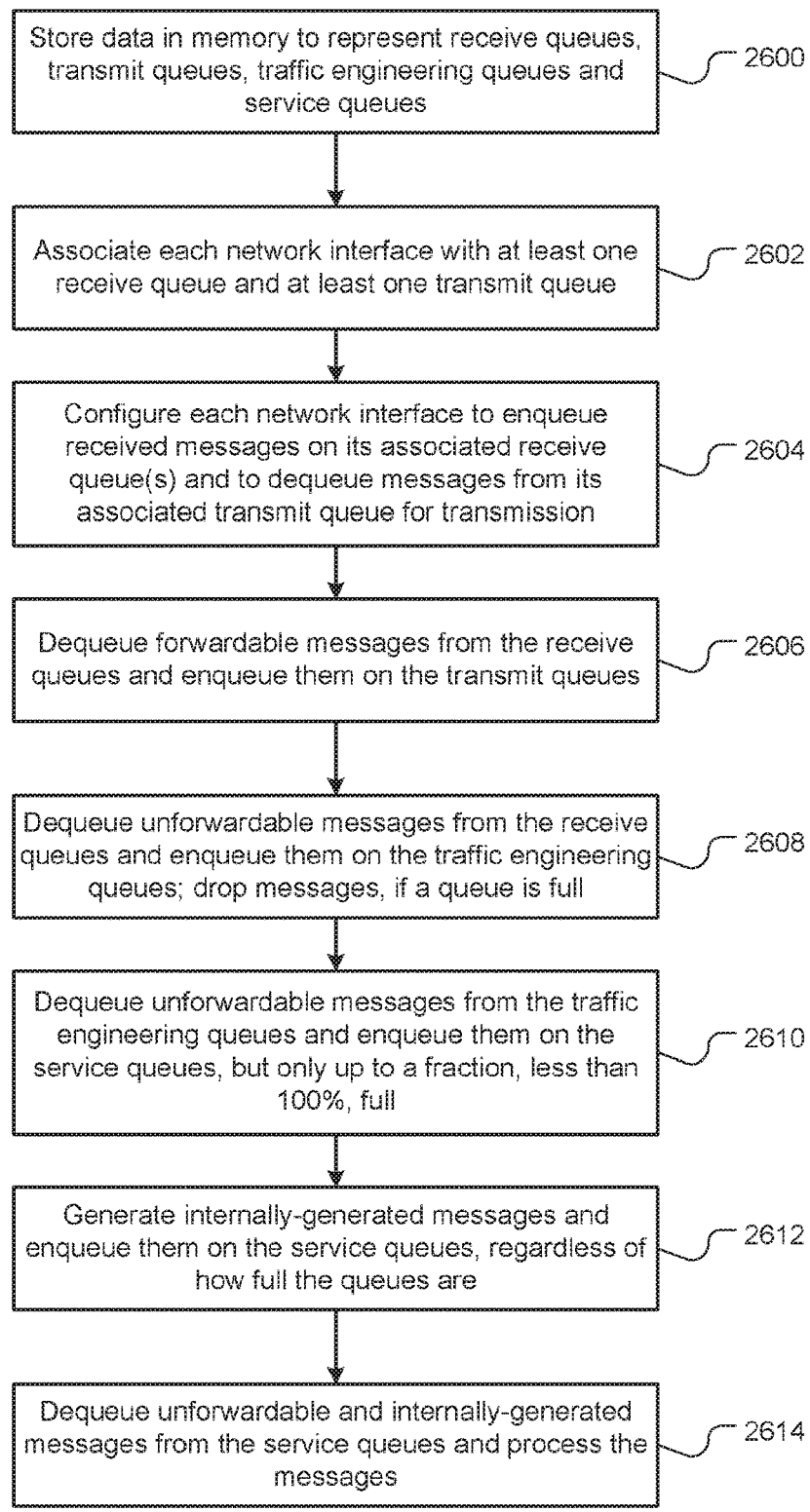
FIG. 26 is a flowchart schematically illustrating operations performed by the router of FIG. 25, according to an embodiment of the present invention.

FIG. 26 is a flowchart schematically illustrating operation of a method for automatically protecting resources within the router 2400 from flooding by a large number of messages. At 2600, data is stored in a memory of the router 2500. The data represents: a plurality of receive queues 2508-2512, a plurality of transmit queues 2520-2524, a plurality of traffic engineering queues 2538-2544 and a plurality of service queues 2546-2552. At 2602, each incoming network interface 2502-2506 is associated with at least one of the receive queues 2508-2512, and each outgoing network interface 2514-2518 is associated with at least one of the transmit queues 2520-2524.

At 2604, each incoming network interface 2502-2506 is configured to enqueue message received over the network interface on one of the receive queues 2508-2512 associated with the network interface. In addition, each outgoing network interface 2514-2518 is configured to dequeue message from its associated transmit queue 2520-2524 for transmission by the network interface.

At 2606, forwardable messages are dequeued from the receive queues 2508-2512 and enqueued to the transmit queues 2520-2524. At 2608, unforwardable messages are dequeued from the receive queues 2508-2512 and enqueued to the traffic engineering queues 2538-2544. If a traffic engineering queue 2538-2544, to which a message is attempted to be enqueued, is full, the message is dropped.

At 2610, unforwardable messages are dequeued from the traffic engineering queues 2538-2544 and enqueued to the service queues 2546-2552, to the extent possible, such that each service queue 2546-2552 is at most a predetermined fraction, less than 100%, full. "Less than 100% full" means a queue can accommodate at least one additional message. In some embodiments, the predetermined fraction is one-half (50%).

At 2612, internally-generated messages are generated by one or more internal processes 2564. The internally-generated messages are enqueued to the service queues 2546-2552, regardless of the fullness of the service queues.

At 2614, unforwardable messages and internally-generated messages are dequeued from the service queues 2546-2552 and processed by respective service processes 2554-2560. As messages are dequeued from the service queues 2546-2552, if a service queue becomes less than the predetermined fraction full, the service controller 2562 dequeues an additional one or more messages from the corresponding traffic engineering queue 2538-2544 to "top up" the service queue, up to the predetermined fraction of full.

The service processes 2554-2560 operate at rates determined by available processing power and number of available processors. Thus, the service queues 2546-2552 are "topped up" at a rate naturally determined by the rate at which the service processes 2554-2560 operate, without requiring any rate-limiting mechanism, which might be set too strictly or too loosely. Consequently, the service processes 2554-2560 are provided a steady flow of messages, assuming there is work to do, without being starved or overflowed.

Figure 27:
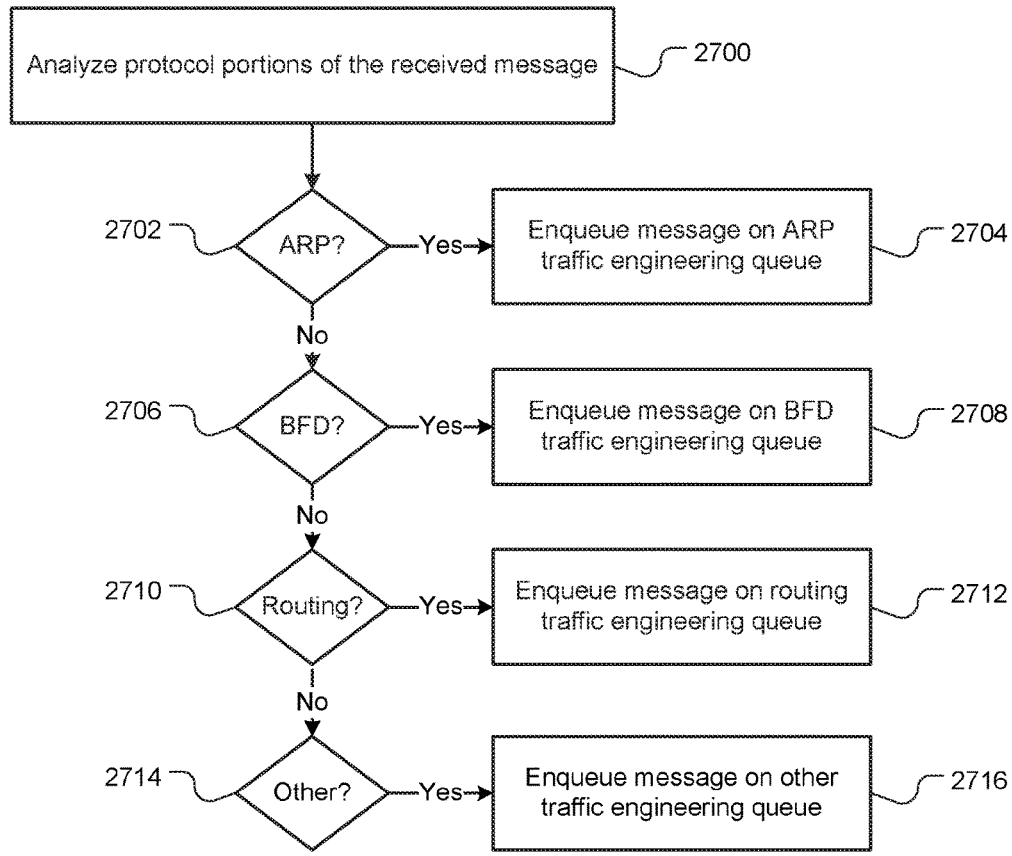
FIGS. 27-32 are flowcharts schematically illustrating the operations of FIG. 26 in more detail, according to embodiments of the present invention.

FIG. 27 is a flowchart schematically illustrating operations performed as part of operation 2608 (FIG. 26), where unforwardable messages are dequeued from the receive queues 2508-2512 and enqueued to the traffic engineering queues 2538-2544. At 2700, protocol portions of the message are analyzed. At 2702, if, as a result of the analysis, the message is found to be an ARP message, control passes to 2704, where the message is enqueued to one of the ARP traffic engineering queues 2538. The particular ARP traffic engineering queue 2538 to which the ARP message is enqueued may be selected based the processor associated with the receive queue 2508-2512, from which the message was dequeued.

At 2706, if, as a result of the analysis, the message is found to be a BFD message, control passes to 2708, where the message is enqueued to one of the BFD traffic engineering queues 2540. The particular BFD traffic engineering queue 2540 to which the BFD message is enqueued may be selected based the processor associated with the receive queue 2508-2512, from which the message was dequeued.

At 2710, if, as a result of the analysis, the message is found to be a routing message, control passes to 2712, where the message is enqueued to one of the routing traffic engineering queues 2552. The particular routing traffic engineering queue 2552 to which the routing message is enqueued may be selected based the processor associated with the receive queue 2508-2512, from which the message was dequeued.

As noted, other protocols may be similarly processes, as exemplified at 2714 where, as a result of the analysis, the message is found to be a of another protocol, and control passes to 2712, where the message is enqueued to another traffic engineering queue. The particular routing traffic engineering queue to which the message is enqueued may be selected based the processor associated with the receive queue 2508-2512, from which the message was dequeued.

Figure 28:
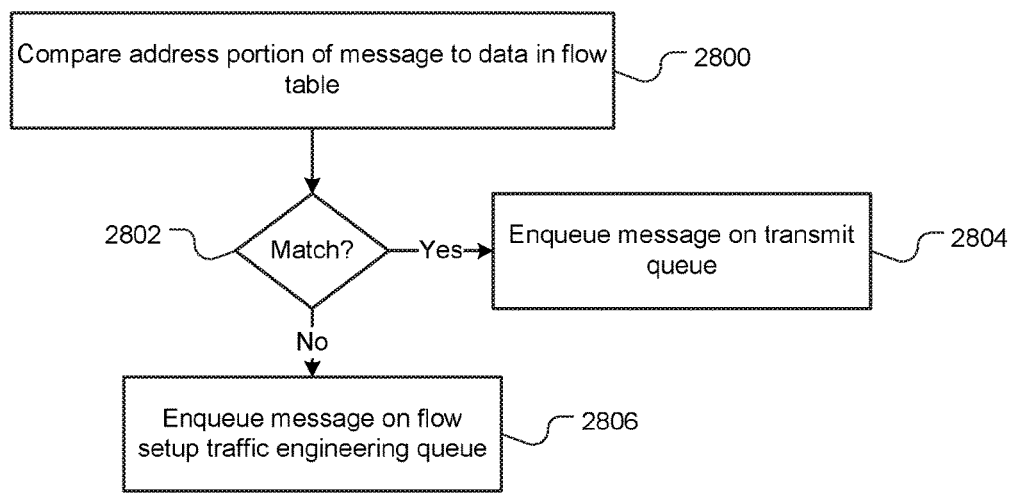
Figure 29:
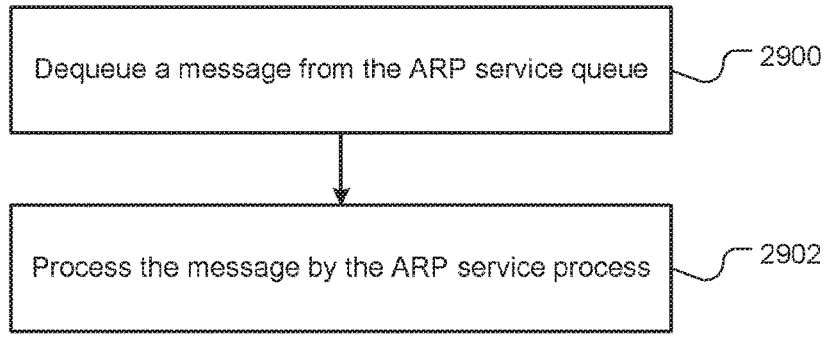
Figure 30:
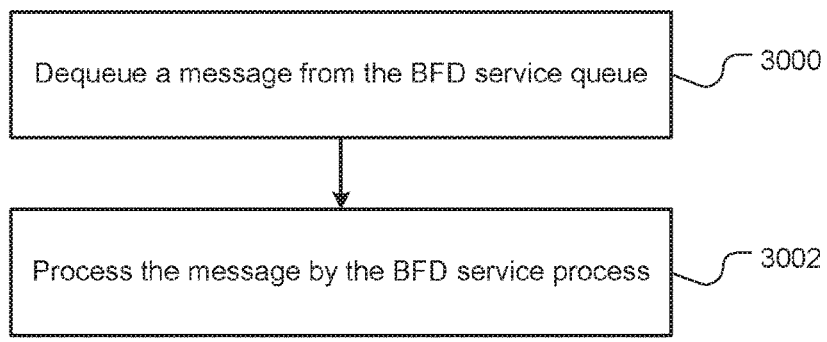
Figure 31:
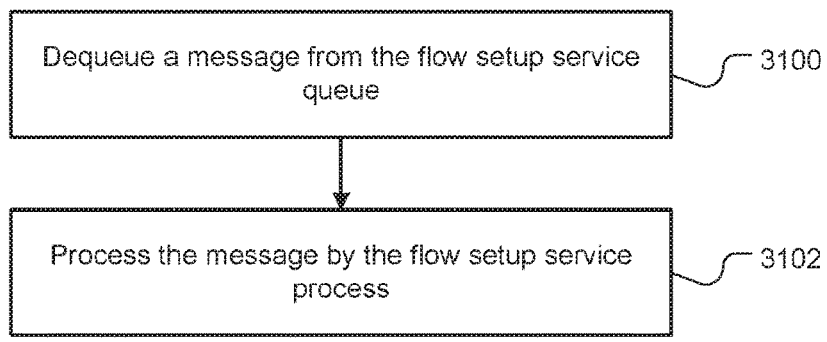

FIG. 28 is a flowchart schematically illustrating operations performed as part of operation 2606 (FIG. 26), where forwardable messages are dequeued from the receive queues 2508-2512 and enqueued to the transmit queues 2520-2524. At 2800, an address portion of a received message is compared to data stored in the flow table 2530. At 2802, if the compared portion matches an entry in the flow table 2530, control passes to 2804, where the message is deemed to be forwardable and is enqueued to one of the transmit queues 2520-2524. Otherwise, control passes to 2806, where the message is deemed to be unforwardable, at least without processing, and the message is enqueued to a flow setup traffic engineering queue 2542.

FIGS. 29, 30, 31 and 32 are flowcharts schematically illustrating operations performed as part of operation 2614 (FIG. 26), where unforwardable messages and internally-generated messages are dequeued from the service queues 2546-2552 and processed by respective service processes 2554-2560. At 2900, 3000, 3100 and 3200, a message is dequeued from a respective service queue, i.e., the ARP service queue 2546, the BFD service queue 2548, the flow setup service queue 2550 or the routing service queue 2552. At 2902, 3002, 3102 and 3202, the message is processed by the respective service process, i.e., the ARP service process 2554, the BFD service process 2556, the flow setup service process 2558 or the routing service process 2560.

Figure 32:
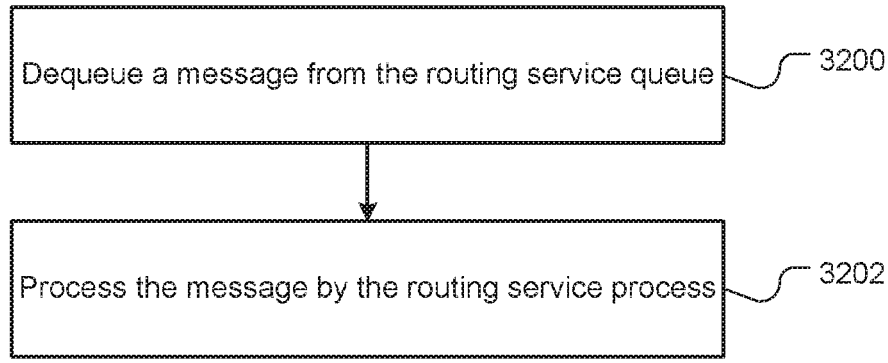
Figure 33:
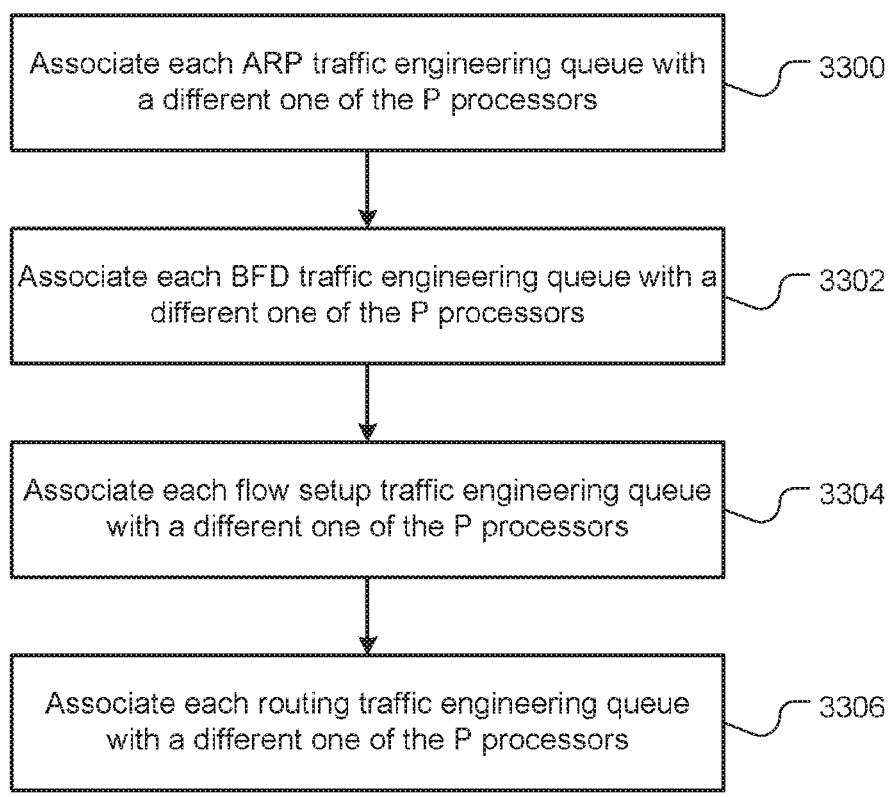
FIG. 33 is a flowchart schematically illustrating optional operations performed by the router of FIG. 25.

FIG. 32 is a flowchart schematically illustrating optional operations performed by the router 2500. At 3300, each ARP traffic engineering queue may be associated with a different one of the P processors. At 3302, each BFD traffic engineering queue may be associated with a different one of the P processors. At 3304, each flow setup traffic engineering queue may be associated with a different one of the P processors. At 3306, each routing traffic engineering queue may be associated with a different one of the P processors.

The self-protecting router described herein may be stored on a suitable computer storage medium, such as a disk drive, as a complete operating system and application program image and executed by a virtual machine, as described with respect to FIG. 24, or natively on "bare metal" commercial off-the-shelf (COTS) hardware. Similarly, the self-protecting router may be implemented on dedicated-function hardware.

Embodiments of the present invention may be deployed in a stateful router, which is described herein.

Stateful Routing

In certain exemplary embodiments, at least some of the routers in the communication system are specially configured to perform "stateful" routing on packets associated with a given session between a source node and destination node, as discussed herein. For convenience, such routers are referred to above and below as Augmented IP Routers (AIPRs) or waypoint routers. AIPRs and stateful routing also are discussed in related incorporated patent applications, which are incorporated by reference above. For convenience, packets being routed from the source node toward the destination node may be referred to herein as "forward" packets or the "forward" direction or path, and packets being routed from the destination node toward the source node may be referred to herein as "reverse" packets or the "reverse" direction or path.

Generally speaking, stateful routing is a way to ensure that subsequent packets of a session follow the same path as the lead packet of the session through a particular set of AIPRs in the forward and/or reverse direction. The lead packet of the session may pass through one or more AIPRs, either due to traditional routing, or by having each successive AIPR through which the lead packet passes expressly select a next hop AIPR if possible. For example, illustrative embodiments permit an AIPR or similarly enabled router to use the noted lead session balancer 550 to select an appropriate next hop router/AIPR.

The AIPRs through which the lead packet passes insert special metadata into the lead packet and optionally also into return packets as needed to allow each AIPR on the path to determine whether there is a prior node or AIPR on the path and whether there is a next hop node or AIPR on the path. To force session packets to traverse the same set of AIPRs, each successive AIPR typically changes the destination address field in each session packet to be the address of the next hop AIPR, and changes the source address field in each session packet to be its own network address. The last AIPR prior to the destination node then will change the source and destination address fields back to the original source and destination addresses used by the source node. In this way, session packets can be forwarded, hop by hop, from the source node through the set of AIPRs to the destination node, and vice versa.

It should be noted that discussion of an AIPR is but one embodiment. Other embodiments may perform the process of FIG. 5 using routers without all the described functionality of an AIPR.

Figure 7:
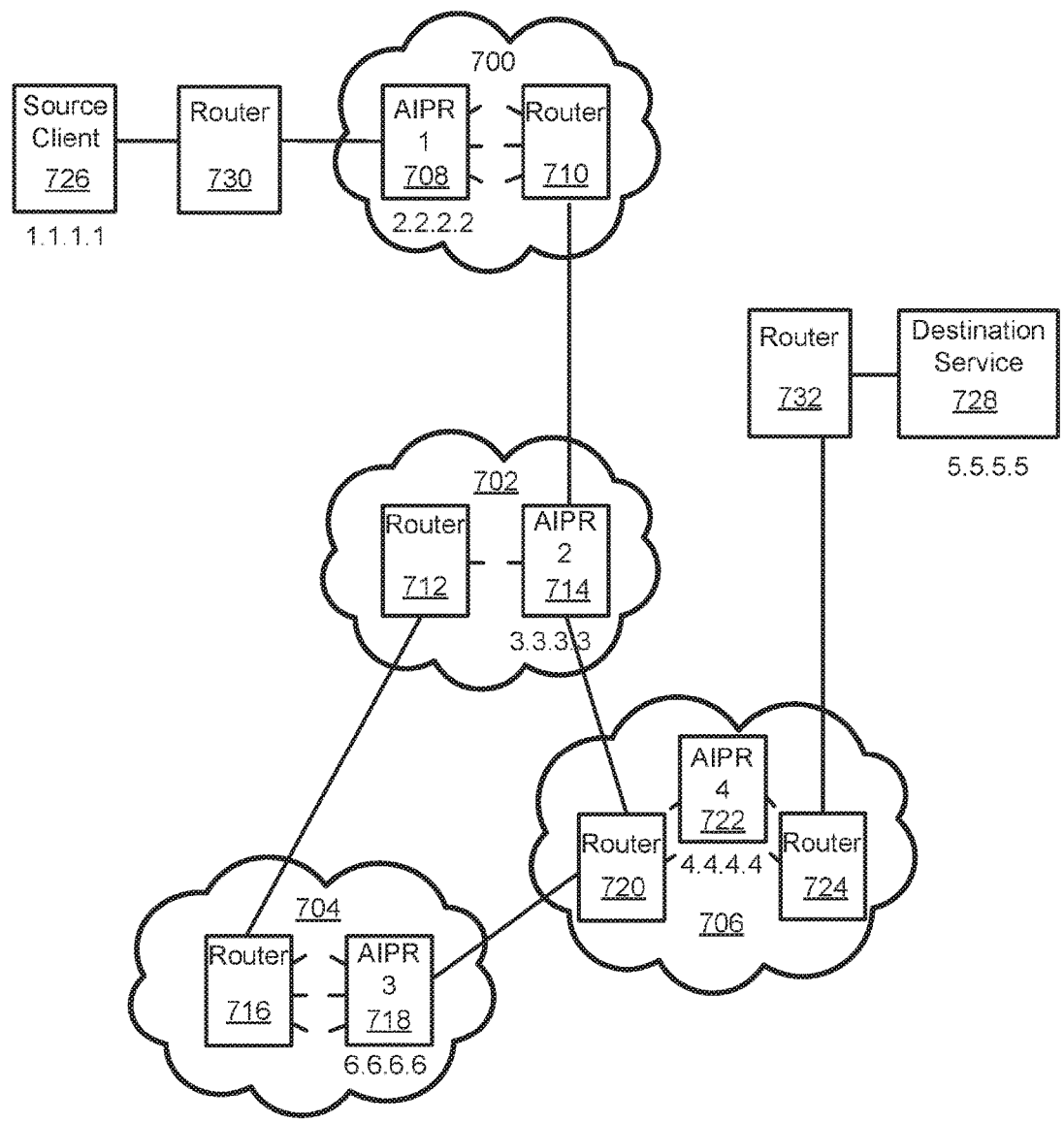
FIG. 7 schematically shows a hypothetical internet that includes conventional routers and augmented IP routers (AIPRs), in accordance with one exemplary embodiment.

Certain aspects of one exemplary stateful routing embodiment are now described with reference to FIGS. 7-15. FIG. 7 schematically shows a hypothetical internet that includes conventional routers and AIPRs, according to one exemplary embodiment of the present invention. Among other things, FIG. 7 illustrates a hypothetical set of interconnected networks 700, 702, 704 and 706, i.e., an internet. Each network 700-706 includes a number of routers and AIPRs, not all of which are necessarily shown. Network 700 includes AIPR 1 708 and router 710. Network 700 may be, for example, a network of a telecommunications carrier. Network 702 includes a router 712 and AIPR 2 714. Network 702 may be, for example, a network of a first ISP. Network 704 includes a router 716 and AIPR 3 718. Network 704 may be, for example, the Internet backbone or a portion thereof. Network 706 includes a router 720, AIPR 4 722 and another router 724. Network 706 may be, for example, a network of a second ISP. For the sake of this discussion, the source client node 726 is associated with fictitious network address 1.1.1.1; AIPR 1 708 is associated with fictitious network address 2.2.2.2; AIPR 2 714 is associated with fictitious network address 3.3.3.3; APIR 3 718 is associated with fictitious network address 6.6.6.6; AIPR 4 722 is associated with fictitious network address 4.4.4.4; and destination service node 728 is associated with fictitious network address 5.5.5.5. It should be noted that the present invention is not limited to the network shown in FIG. 7 or to any particular network.

Figure 8:
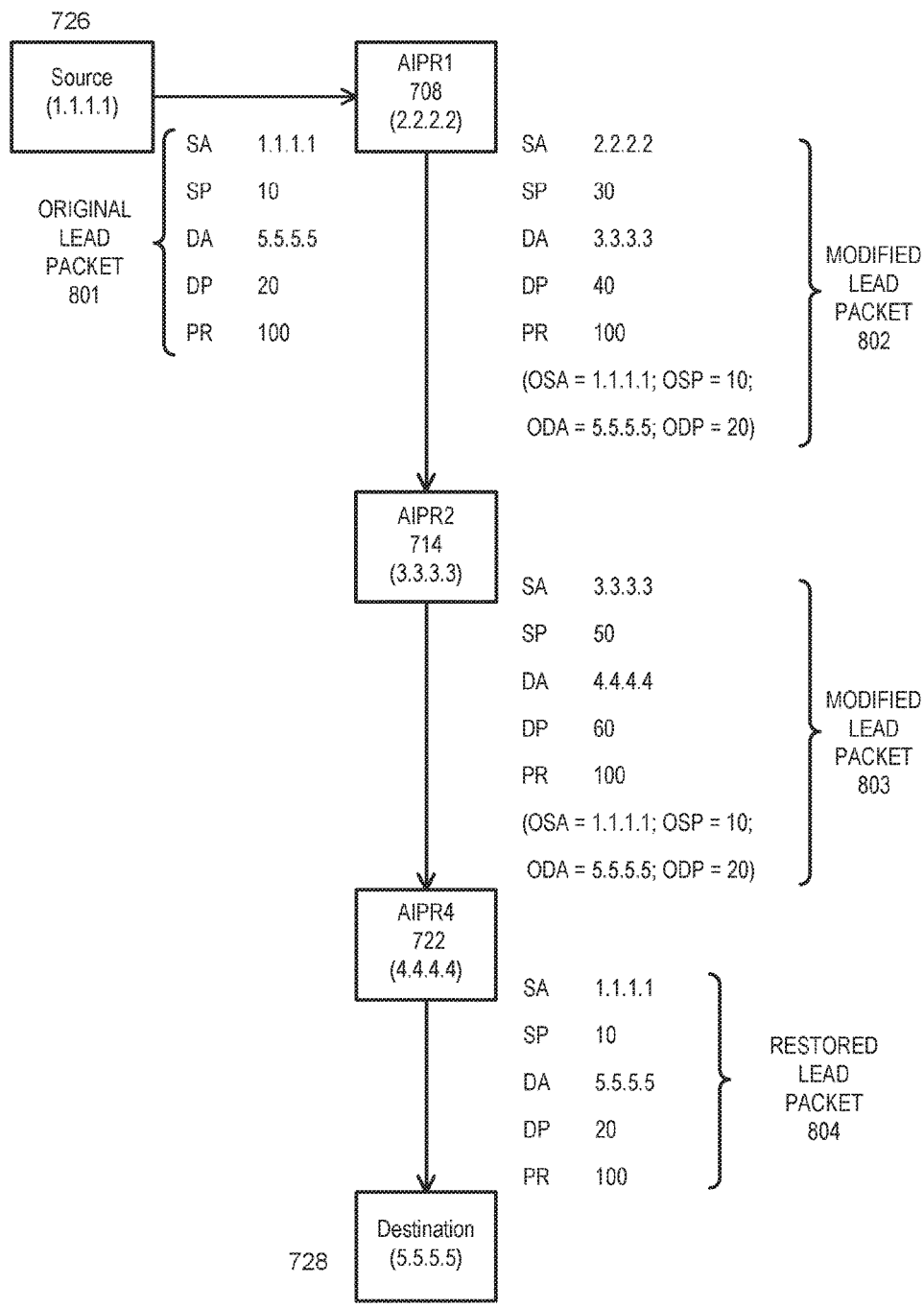
FIG. 8 schematically shows an example of lead packet processing from a source node to a destination node for stateful routing, in accordance with one exemplary embodiment.
Figure 12:
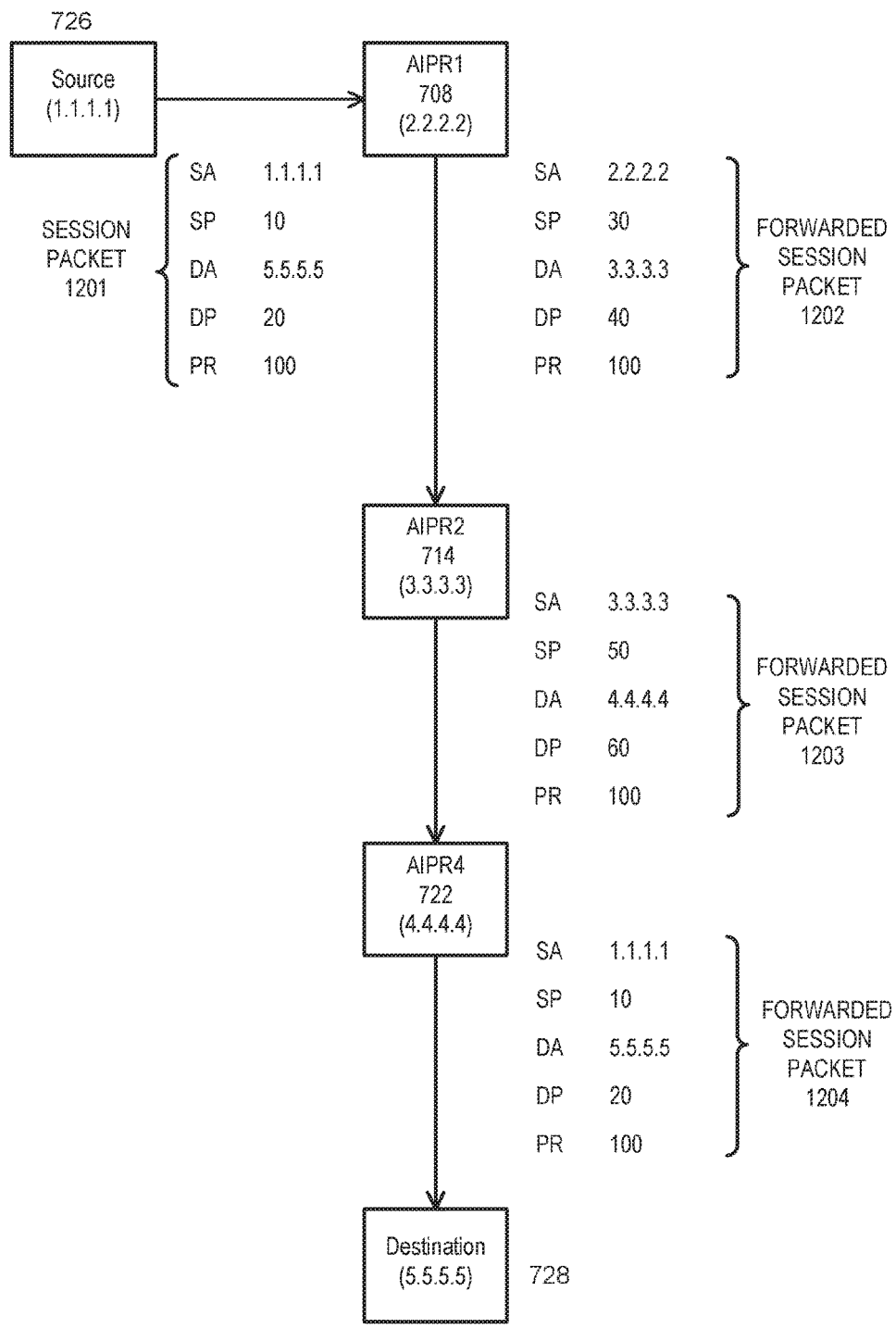
FIG. 12 is a schematic diagram providing an example of session packet processing for an example packet sent from the source device to the destination device through the AIPR devices for the session established in FIG. 8, in accordance with one exemplary embodiment.
Figure 13:
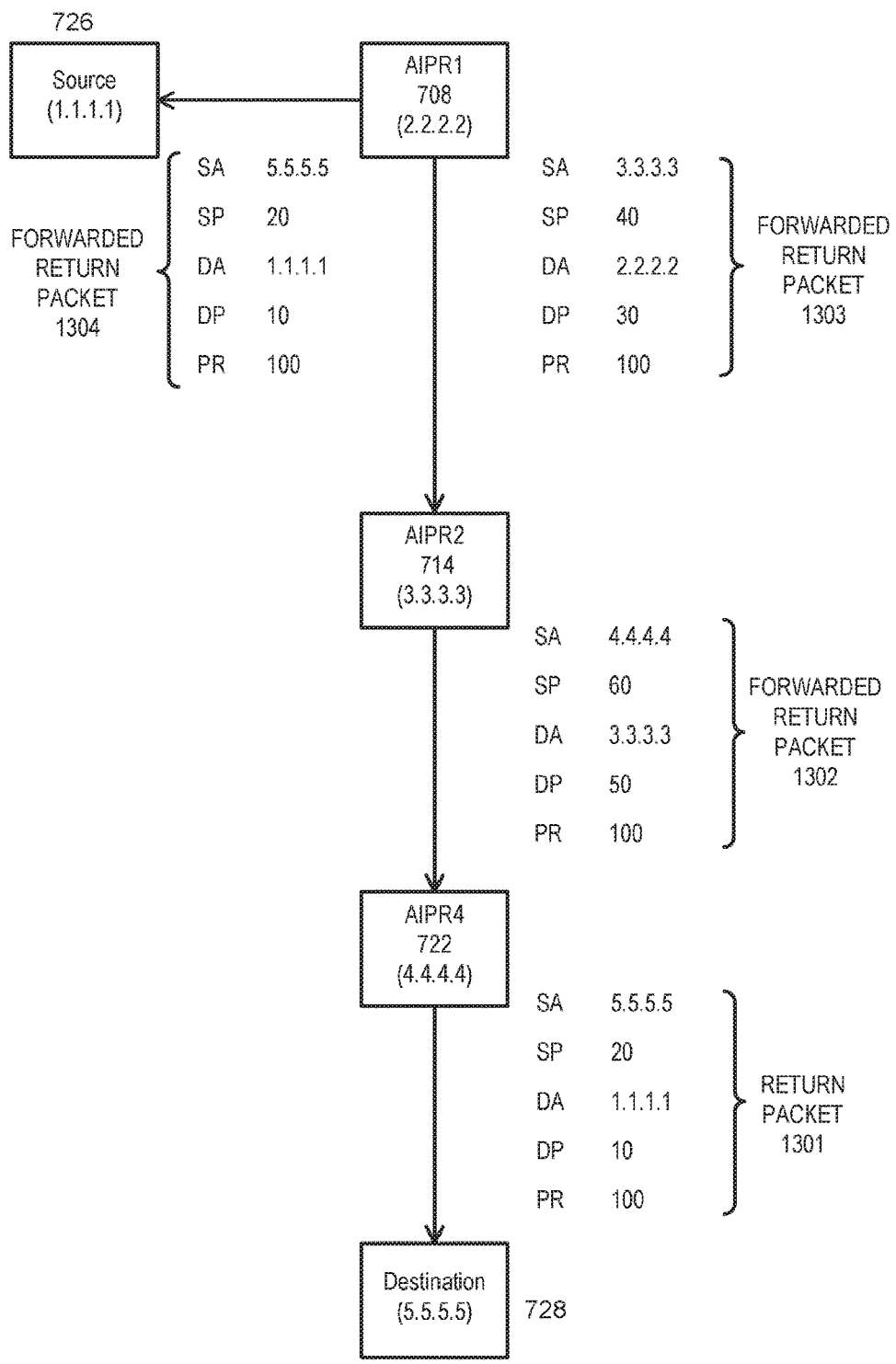
FIG. 13 is a schematic diagram providing an example of session packet processing for a return packet sent by the destination device to the source device through the AIPR devices for the session established in FIG. 8, in accordance with one exemplary embodiment.

FIG. 8 schematically shows an example of lead packet processing from a source node to a destination node for stateful routing, in accordance with illustrative embodiments of the invention. FIG. 9 is a schematic diagram showing session-related data associated with AIPR 1 708 based on the lead packet processing of FIG. 8. FIG. 10 is a schematic diagram showing session-related data associated with AIPR 2 714 based on the lead packet processing of FIG. 8. FIG. 11 is a schematic diagram showing session-related data associated with AIPR 4 722 based on the lead packet processing of FIG. 8. FIG. 12 is a schematic diagram providing an example of session packet processing for an example packet sent from the source device to the destination device through the AIPR devices for the session established in FIG. 8. FIG. 13 is a schematic diagram providing an example of session packet processing for a return packet sent by the destination device to the source device through the AIPR devices for the session established in FIG. 8.

In this example, each AIPR is presumed to have a priori knowledge of the other AIPRs in the network in relation to the network/next hop associations contained in its routing information base, such that, for example, a particular AIPR knows not only the outgoing port for a particular destination network address, but also the next waypoint AIPR (if any) to use for that destination network address.

As noted above, in stateful routing, all forward packets associated with a particular session are made to follow the same path through a given set of AIPRs on their way from the source client node 726 to the destination service node 728. In a similar manner, all return packets associated with the session typically (but not necessarily, are made to traverse the same set of AIPRs in reverse order on their way from the destination service node 728 to the source client node 726.

Assume the source client node 726 initiates a session with the destination service node 728. For example, the source client node 726 may request a web page, and the destination service node 728 may include a web server. The source client node 726 may, for example, be part of a first local area network (LAN) (not shown) within a first corporation, and the LAN may be connected to the telecommunications carrier network 700 via a gateway router 730 operated by the corporation. Similarly, the destination service node 728 may be operated by a second corporation, and it may be part of a second LAN (not shown) coupled to the network 706 of the second ISP via a gateway router 732 operated by the second corporation.

To establish a communication session between the source client node 726 and the destination service node 728, the source client node 726 typically transmits a lead packet for the session, which generally initiates a communication exchange between the source client node 726 and the destination service node 728. This allows subsequent session-related packets to be exchanged by the two nodes. The type of lead packet will depend on the protocol(s) being used by the source and destination nodes. For the example used herein, TCP/IP-based communications are assumed, in which case the lead packet may include a TCP SYN message carried in an IP datagram. This lead packet typically will include a source address equal to the IP address of the source client node 726 (i.e., 1.1.1.1), a destination address equal to the IP address of the destination service node 728 (i.e., 5.5.5.5), and various types of Transport Layer information including a source port number, a destination port number, and a protocol identifier. For convenience, the combination of source address, source port number, destination address, destination port number, and protocol identifier in a packet is referred to hereinafter collectively as a "5-tuple" and is used in various exemplary embodiments as a session identifier for "stateful" routing, as discussed below.

FIG. 8 shows an exemplary lead packet 801 transmitted by the source client node 726. In this example, the lead packet 801 includes a source address (SA) of 1.1.1.1; a source port number (SP) of 10; a destination address (DA) of 5.5.5.5; a destination port number (DP) of 20; and a protocol identifier (PR) of 100.

The lead packet 801 may be routed naturally and therefore, depending on various factors, the lead packet may or may not reach an AIPR on its way from the source node to the destination node. Thus, waypoints are not necessarily predetermined before the lead packet is transmitted by the source node. However, in some exemplary embodiments, a particular AIPR (e.g., AIPR 1 708 in FIG. 7) may be configured as the default router/gateway for the source node, in which case the lead packet is virtually assured to reach an AIPR.

Assume the lead packet 801 reaches AIPR 1 708 before it reaches network 702, 704 or 706. AIPR 1 708 automatically identifies the lead packet as being an initial packet of a new session (in this example, referred to as "Session X"). AIPR 1 708 may use various techniques to identify the beginning of a session, as discussed in more detail below. For example AIPR 1 708 may identify the beginning of the session based on the 5-tuple of information in the lead packet. AIPR 1 708 also determines that the lead packet 801 is not a modified lead packet containing session metadata. Therefore, AIPR 1 708 determines that it is the first waypoint AIPR for Session X and stores an indicator so that it will process subsequent packets associated with the session as the first waypoint AIPR. This is represented in FIG. 9 as "Flag=First Waypoint AIPR."

AIPR 1 708 stores 5-tuple information from the received lead packet 801 as the Return Association (RA) for Session X. This is represented in FIG. 9 as "Return Association" information. For convenience, the source address, source port number, destination address, destination port number, and protocol identifier information associated with a particular session is referred to in FIGS. 9-11 as session source address (SSA), session source port number (SSP), session destination address (SDA), session destination port number (SDP), and session protocol identifier (SPR), respectively.

To forward a modified lead packet (i.e., Modified Lead Packet 802) over an outgoing interface, AIPR 1 708 accesses its routing information base to look up routing information based on the original destination address of 5.5.5.5 (e.g., outgoing interface and next node information). In this example, AIPR 1 708 identifies AIPR 2 714 as the next waypoint AIPR based on the original destination address of 5.5.5.5. In certain exemplary embodiments, AIPR 1 708 then assigns a source port number and a destination port number for outgoing packets associated with the session to permit more than 65,535 sessions to be supported concurrently (in this example, source port number 30 and destination port number 40) and stores the resulting 5-tuple as the Forward Association (FA) for outgoing packets associated with the session. This is shown in FIG. 9 as "Forward Association" information. Implicitly, the network address of AIPR 1 708 (i.e., 2.2.2.2) will be the source address for session-related packets forwarded over an outgoing interface.

Illustrative embodiments may identify the next AIPR in any of a variety of manners. For example, the AIPR may have a local session balancer 550 that identifies a plurality of next nodes (i.e., potential next hop node), which may include all AIPRs, both AIPRs and routers, or in some cases just routers without AIPR functionality. The session balancer 550 then may select the next hop node, whether it is an AIPR or a router without AIPR functionality (preferably leading to an AIPR though), in accordance with the process of FIG. 5.

To force the lead packet to reach next waypoint AIPR 2 714 (as opposed to being randomly routed by the routers in the network), AIPR 1 708 modifies the destination address in the lead packet to the IP address of AIPR 2 714 (i.e., 3.3.3.3). In this example, AIPR 1 708 also modifies the source address in the lead packet to its own IP address (i.e., 2.2.2.2) so that AIPR 2 714 can route return packets back to AIPR 1 708. Also in this example, AIPR 1 708 modifies the source port and destination port fields to the assigned values. Importantly, AIPR 1 708 also modifies the lead packet to include a section of metadata including the original source address, destination address, source port, destination port, and protocol identifier from the original lead packet 801. As discussed below, this metadata is propagated to each successive AIPR on the path to allow each AIPR to maintain session information and also to allow the final AIPR on the path to restore the lead packet to its original form. AIPR 1 708 establishes and maintains various session parameters so that it can identify subsequent session packets and forward such session packets to AIPR 2 714 for stateful routing. AIPR 1 708 then transmits the modified lead packet 802 into the network toward AIPR 2 714 via the selected outgoing interface. In certain exemplary embodiments, AIPR 1 708 may establish a flow that associates the session with the incoming interface over which the lead packet 801 was received and the outgoing interface over which the modified lead packet 802 is forwarded.

FIG. 8 shows an exemplary modified lead packet 802 transmitted by AIPR 1 708. The modified lead packet 802 includes the network address of AIPR 1 708 (i.e., 2.2.2.2) as the source address (SA), the assigned session source port number (SSP) of 30 as the source port number (SP), the network address of AIPR 2 714 (i.e., 3.3.3.3) as the destination address (DA), the assigned session destination port number (SDP) of 40 as the destination port number (DP), and the received protocol identifier of 100 as the protocol identifier (PR). AIPR 1 708 also includes the original source address (OSA) of 1.1.1.1, the original source port number (OSP) of 10, the original destination address (ODA) of 5.5.5.5, and the original destination port number (ODP) of 20 from the original lead packet 801 as metadata in the modified lead packet 802. This information is shown in parentheses to represent that it is metadata that has been added to the lead packet.

In this example, AIPR 1 708 forwards the modified lead packet 802 to AIPR 2 714 via router 710. The modified lead packet 802 packet may traverse other routers between AIPR 1 708 and AIPR 2 714. Because the destination address in the modified lead packet 802 is set to the IP address of AIPR 2 714 (i.e., 3.3.3.3), the modified lead packet should eventually reach AIPR 2 714.

AIPR 2 714 automatically identifies the modified lead packet 802 as being an initial packet of the session, but also identifies that AIPR 2 714 is not the first waypoint for the session because the modified lead packet already contains metadata inserted by AIPR 1 708. AIPR 2 714 therefore becomes the second waypoint along the path the lead packet eventually follows.

AIPR 2 714 stores 5-tuple information from the received modified lead packet 802 as the Return Association (RA) for Session X. This is represented in FIG. 10 as "Return Association" information.

To forward a modified lead packet (i.e., Modified Lead Packet 803) over an outgoing interface, AIPR 2 714 accesses its routing information base to look up routing information based on the original destination address of 5.5.5.5 (e.g., outgoing interface and next node information). In this example, AIPR 2 714 identifies two possible next hop AIPRs for the lead packet to reach destination service node 728, namely AIPR 3 718 and AIPR 4 722. Assume AIPR 2 714 selects AIPR 4 722 as the next hop AIPR for the path (e.g., using the process of FIG. 5). AIPR 2 714 therefore determines that it is an intermediate waypoint AIPR for the session, i.e., it is neither the first waypoint AIPR nor the last waypoint AIPR. AIPR 2 714 stores an indicator so that it will process subsequent packets associated with the session as an intermediate waypoint AIPR. This is represented in FIG. 10 as "Flag=Intermediate Waypoint AIPR." In this example, AIPR 2 714 then assigns a source port number and a destination port number for outgoing packets associated with the session (in this example, source port number 50 and destination port number 60) and stores the resulting 5-tuple as the Forward Association (FA) for outgoing packets associated with the session. This is shown in FIG. 10 as "Forward Association" information. Implicitly, the network address of AIPR 2 714 (i.e., 3.3.3.3) will be the source address for session-related packets forwarded over an outgoing interface.

To force the modified lead packet 803 to reach AIPR 4 722 (as opposed to being randomly routed by the routers in the network), AIPR 2 714 modifies the destination address in the lead packet to the IP address of AIPR 4 722 (i.e., 4.4.4.4). In this example, AIPR 2 714 also modifies the source address in the lead packet to its own IP address (i.e., 3.3.3.3) so that AIPR 4 722 can route return packets back to AIPR 2 714. Also in this example, AIPR 2 714 modifies the source port and destination port fields to the assigned values. Importantly, AIPR 2 714 leaves the section of metadata including the original source address, destination address, source port, destination port, and protocol identifier. AIPR 2 714 establishes and maintains various session parameters so that it can identify subsequent session packets and forward such session packets to AIPR 4 722 for stateful routing. AIPR 2 714 then transmits the modified lead packet 803 into the network toward AIPR 4 722 via the selected outgoing interface. In certain exemplary embodiments, AIPR 2 714 may establish a flow that associates the session with the incoming interface over which the modified lead packet 802 was received and the outgoing interface over which the modified lead packet 803 is forwarded.

FIG. 8 shows an exemplary modified lead packet 803 transmitted by AIPR 2 714. The modified lead packet 803 includes the network address of AIPR 2 714 (i.e., 3.3.3.3) as the source address (SA), the assigned session source port number (SSP) of 50 as the source port number (SP), the network address of AIPR 4 722 (i.e., 4.4.4.4) as the destination address (DA), the assigned session destination port number (SDP) of 60 as the destination port number (DP), and the received protocol identifier of 100 as the protocol identifier (PR). AIPR 2 714 also includes the original source address (OSA) of 1.1.1.1, the original source port number (OSP) of 10, the original destination address (ODA) of 5.5.5.5, and the original destination port number (ODP) of 20 from the modified lead packet 802 as metadata in the modified lead packet 803. This information is shown in parentheses to represent that it is metadata that has been added to the lead packet.

In this example, AIPR 2 714 forwards the modified lead packet 803 to AIPR 4 722 via router 720. The modified lead packet 803 may traverse other routers between AIPR 2 714 and AIPR 4 722. Because the destination address in the modified lead packet 803 is set to the IP address of AIPR 4 722 (i.e., 4.4.4.4), the modified lead packet should eventually reach AIPR 4 722.

AIPR 4 722 automatically identifies the modified lead packet as being an initial packet of the session, but also identifies that AIPR 4 722 is not the first waypoint for the session because the modified lead packet already contains metadata inserted by AIPR 2 714. AIPR 4 722 therefore becomes the third waypoint along the path the lead packet eventually follows.

AIPR 4 722 stores 5-tuple information from the received modified lead packet 803 as the Return Association (RA) for Session X. This is represented in FIG. 11 as "Return Association" information.

To forward a modified lead packet (i.e., Modified Lead Packet 804) over an outgoing interface, AIPR 4 722 accesses its routing information base to look up routing information based on the original destination address of 5.5.5.5 (e.g., outgoing interface and next node information). AIPR 4 722 determines that there is no next hop AIPR for the lead packet to reach destination service node 728. AIPR 4 722 therefore determines that it is the last waypoint AIPR on the path. AIPR 4 722 stores an indicator so that it will process subsequent packets associated with the session as a final waypoint AIPR. This is represented in FIG. 11 as "Flag=Final Waypoint AIPR." AIPR 4 722 then stores the original 5-tuple information as the Forward Association (FA) for outgoing packets associated with the session. This is shown in FIG. 11 as "Forward Association" information.

As the last waypoint AIPR, AIPR 4 722 performs special processing on the lead packet. Specifically, AIPR 4 722 removes the metadata section from the lead packet and restores the source address, destination address, source port, destination port, and protocol identifier fields in the lead packet back to the original values transmitted by source client node 726, which it obtains from the metadata in modified lead packet 803. AIPR 4 722 establishes and maintains various session parameters so that it can identify subsequent session packets and forward such session packets to destination service node 728 for stateful routing. AIPR 4 722 then transmits the restored lead packet 804 into the network toward destination service node 728 via the selected outgoing interface. In certain exemplary embodiments, AIPR 4 722 may establish a flow that associates the session with the incoming interface over which the lead packet 803 was received and the outgoing interface over which the restored lead packet 804 is forwarded.

FIG. 8 shows an exemplary restored lead packet 804 transmitted by AIPR 4 722. The restored lead packet 804 includes the original source address of 1.1.1.1 as the source address (SA), the original source port number (SSP) of 10 as the source port number (SP), the original destination device address of 5.5.5.5 as the destination address (DA), the original destination port number of 20 as the destination port number (DP), and the received/original protocol identifier of 100 as the protocol identifier (PR).

In this example, AIPR 4 722 forwards the restored lead packet 804 to destination service node 728 via routers 724 and 732. The restored lead packet 804 may traverse other routers between AIPR 4 722 and destination service node 728. Because the destination address in the restored lead packet 804 is set to the IP address of destination service node 728 (i.e., 5.5.5.5), the restored lead packet should eventually reach destination service node 728.

Thus, as a lead packet of the session traverses the internet when the session is established, each AIPR (waypoint) that the packet traverses records information that eventually enables the waypoint to be able to identify its immediately previous waypoint and its immediately next waypoint, with respect to the session.

While all AIPRs in this example establish the session using the process of FIG. 5, some embodiments may have AIPRs that do not use that process. For example, some AIPRs may use the process of FIG. 5, while others may use other techniques to determine the next hop node (e.g., natural routing or a round robin technique).

It should be noted that each node can store information for multiple sessions. For example, FIGS. 9-11 schematically show information stored for additional Sessions Y and Z. As for Session X, the information stored for Sessions Y and Z includes Return Association (RA) information, Forward Association (FA) information, and a Flag. It should be noted that the AIPRs may have different roles in different sessions, e.g., whereas AIPR 1 708 is the first waypoint AIPR and AIPR 4 722 is the final waypoint AIPR in the example of FIG. 8, AIPR 1 708 could be the final waypoint AIPR for Session Y and could be an intermediate waypoint AIPR for Session Z.

After the lead packet has been processed and the session-related information has been established by the waypoint AIPRs hop-by-hop from the source client node 726 to the destination service node 728, additional session packets may be exchanged between the source client node 726 and the destination service node 728 to establish an end-to-end communication session between the source client node 726 and the destination service node 728.

FIG. 12 is a schematic diagram providing an example of session packet processing for an example session packet sent from the source client node 726 to the destination service node 728 through the AIPR devices for the session established in FIG. 8. Here, the source client node 726 sends a session packet 1201 having a source address (SA) of 1.1.1.1; a source port number of 10 (i.e., the original SP); a destination address of 5.5.5.5; a destination port number of 20 (i.e., the original DP); and a protocol identifier of 100. Because AIPR 1 708 is the default router/gateway for source 1.1.1.1, the session packet 1201 is routed by the network to AIPR 1 708.

Based on the 5-tuple information contained in the received session packet 1201 and the Return Association stored in memory by AIPR 1 708, AIPR 1 708 is able to determine that the received session packet 1201 is associated with Session X. AIPR 1 708 forwards the packet according to the Forward Association information associated with Session X as shown in FIG. 9. Specifically, the forwarded session packet 1202 transmitted by AIPR 1 708 has a source address (SA) of 2.2.2.2; a source port number of 30 (i.e., the SSP assigned by AIPR 1 708); a destination address of 3.3.3.3; a destination port number of 40 (i.e., the SDP assigned by AIPR 1 708); and a protocol identifier of 100.

Since the forwarded session packet 1202 has a destination address of 3.3.3.3 (i.e., the network address of AIPR 2 714), the session packet 1202 is routed to AIPR 2 714. Based on the 5-tuple information contained in the received session packet 1202 and the Return Association stored in memory by AIPR 2 714, AIPR 2 714 is able to determine that the received session packet 1202 is associated with Session X. AIPR 2 714 forwards the packet according to the Forward Association information associated with Session X as shown in FIG. 10. Specifically, the forwarded session packet 1203 transmitted by AIPR 2 714 has a source address (SA) of 3.3.3.3; a source port number of 50 (i.e., the SSP assigned by AIPR 2 714); a destination address of 4.4.4.4; a destination port number of 60 (i.e., the SDP assigned by AIPR 2 714); and a protocol identifier of 100.

Since the forwarded session packet 1203 has a destination address of 4.4.4.4 (i.e., the network address of AIPR 4 722), the session packet 1203 is routed to AIPR 4 722. Based on the 5-tuple information contained in the received session packet 1203 and the Return Association stored in memory by AIPR 4 722, AIPR 4 722 is able to determine that the received session packet 1203 is associated with Session X. AIPR 4 722 forwards the packet according to the Forward Association information associated with Session X as shown in FIG. 11.

Specifically, the forwarded session packet 1204 transmitted by AIPR 4 722 has a source address (SA) of 1.1.1.1 (i.e., the original source address); a source port number of 10 (i.e., the original SP); a destination address of 5.5.5.5 (i.e., the original destination address); a destination port number of 20 (i.e., the original DP); and a protocol identifier of 100.

Since the forwarded session packet 1204 has a destination address of 5.5.5.5 (i.e., the network address of destination service node 728), the forwarded session packet 1204 is routed to the destination service node 728, which processes the packet.

FIG. 13 is a schematic diagram providing an example of session packet processing for a return packet sent by the destination device to the source device through the AIPR devices for the session established in FIG. 8.

Here, the destination service node 728 sends a return packet 1301 having a source address (SA) of 5.5.5.5; a source port number of 20 (i.e., the original DP); a destination address of 1.1.1.1 (i.e., the original source address); a destination port number of 10 (i.e., the original SP); and a protocol identifier of 100. In this example, AIPR 4 722 is the default router/gateway for destination 5.5.5.5, so the return packet 1301 is routed by the network to AIPR 4 722.

Based on the 5-tuple information contained in the received return packet 1301 and the Forward Association stored in memory by AIPR 4 722, AIPR 4 722 is able to determine that the received return packet 1301 is associated with Session X. AIPR 4 722 forwards the packet according to the Return Association information associated with Session X as shown in FIG. 11. Specifically, the to forwarded return packet 1302 transmitted by AIPR 4 722 has a source address (SA) of 4.4.4.4; a source port number of 60 (i.e., the SDP assigned by AIPR 2 714); a destination address of 3.3.3.3; a destination port number of 50 (i.e., the SSP assigned by AIPR 2 714); and a protocol identifier of 100.

Since the forwarded return packet 1302 has a destination address of 3.3.3.3 (i.e., the network address of AIPR 2 714), the return packet 1302 is routed to AIPR 2 714. Based on the 5-tuple information contained in the received return packet 1302 and the Forward Association stored in memory by AIPR 2 714, AIPR 2 714 is able to determine that the received return packet 1302 is associated with Session X. AIPR 2 714 forwards the packet according to the Return Association information associated with Session X as shown in FIG. 10. Specifically, the forwarded return packet 1303 transmitted by AIPR 2 714 has a source address (SA) of 3.3.3.3; a source port number of 40 (i.e., the SDP assigned by AIPR 1 708); a destination address of 2.2.2.2; a destination port number of 30 (i.e., the SSP assigned by AIPR 1 708); and a protocol identifier of 100.

Since the forwarded return packet 1303 has a destination address of 2.2.2.2 (i.e., the network address of AIPR 1 708), the return packet 1303 is routed to AIPR 1 708. Based on the 5-tuple information contained in the received return packet 1303 and the Forward Association stored in memory by AIPR 1 708, AIPR 1 708 is able to determine that the received return packet 1303 is associated with Session X. AIPR 1 708 forwards the packet according to the Return Association information associated with Session X as shown in FIG. 9. Specifically, the forwarded return packet 1304 transmitted by AIPR 1 708 has a source address (SA) of 5.5.5.5; a source port number of 20 (i.e., the original DP); a destination address of 1.1.1.1; a destination port number of 10 (i.e., the original SP); and a protocol identifier of 100.

Since the forwarded return packet 1304 has a destination address of 1.1.1.1 (i.e., the network address of source client node 726), the forwarded return packet 1304 is routed to the source client node 726, which processes the packet.

It should be noted that an AIPR can assign source and destination port numbers in any of a variety of ways (e.g., sequentially, non-sequentially, and randomly).

Figure 14:
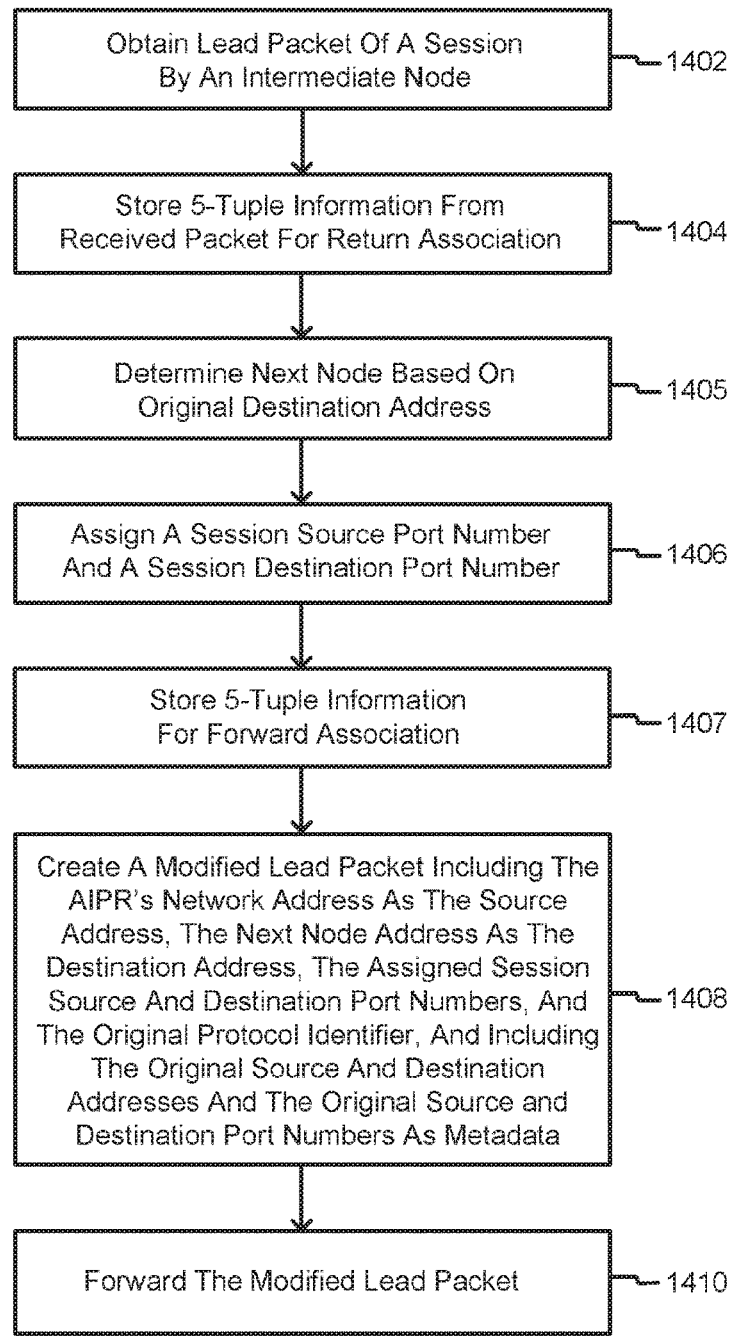
FIG. 14 is a flowchart schematically illustrating some lead packet processing operations performed by an AIPR, in accordance with one exemplary embodiment.

FIG. 14 is a flowchart schematically illustrating some lead packet processing operations performed by an intermediate AIPR, in accordance with one exemplary embodiment.

In block 1402, an intermediate AIPR obtains the lead packet of a session. In block 1404, the AIPR stores 5-tuple information from the received packet as Return Association information for the session.

In block 1405, the AIPR determines the next node/waypoint AIPR based on the original destination address. This typically involves accessing the AIPR's routing information base from which the AIPR can determine the outgoing port and next waypoint AIPR (if any) for the original destination address. As noted above, this preferably involves use of the session balancer 550 and the process of FIG. 5.

In block 1406, the AIPR assigns a session source port number and a session destination port number.

In block 1407, the AIPR stores 5-tuple information for a Forward Association. The Forward Association includes the AIPR's network address as the source address, the next node address as the destination address, the assigned session source and destination port numbers, and the original protocol identifier.

In block 1408, the AIPR creates a modified lead packet including the AIPR network address as the source address, the next node address as the destination address, the assigned session source and destination port numbers, and the original protocol identifier, and also including the original source and destination addresses and the original source and destination port numbers as metadata. In block 1410, the AIPR forwards the modified lead packet.

It should be noted that the flowchart of FIG. 14 applies to intermediate AIPRs other than the final waypoint AIPR, which performs slightly different processing as discussed above (e.g., the final waypoint AIPR uses the original source address, original source port number, original destination address, and original destination port number contained in the metadata of the received packet for its Forward Association information).

Figure 15:
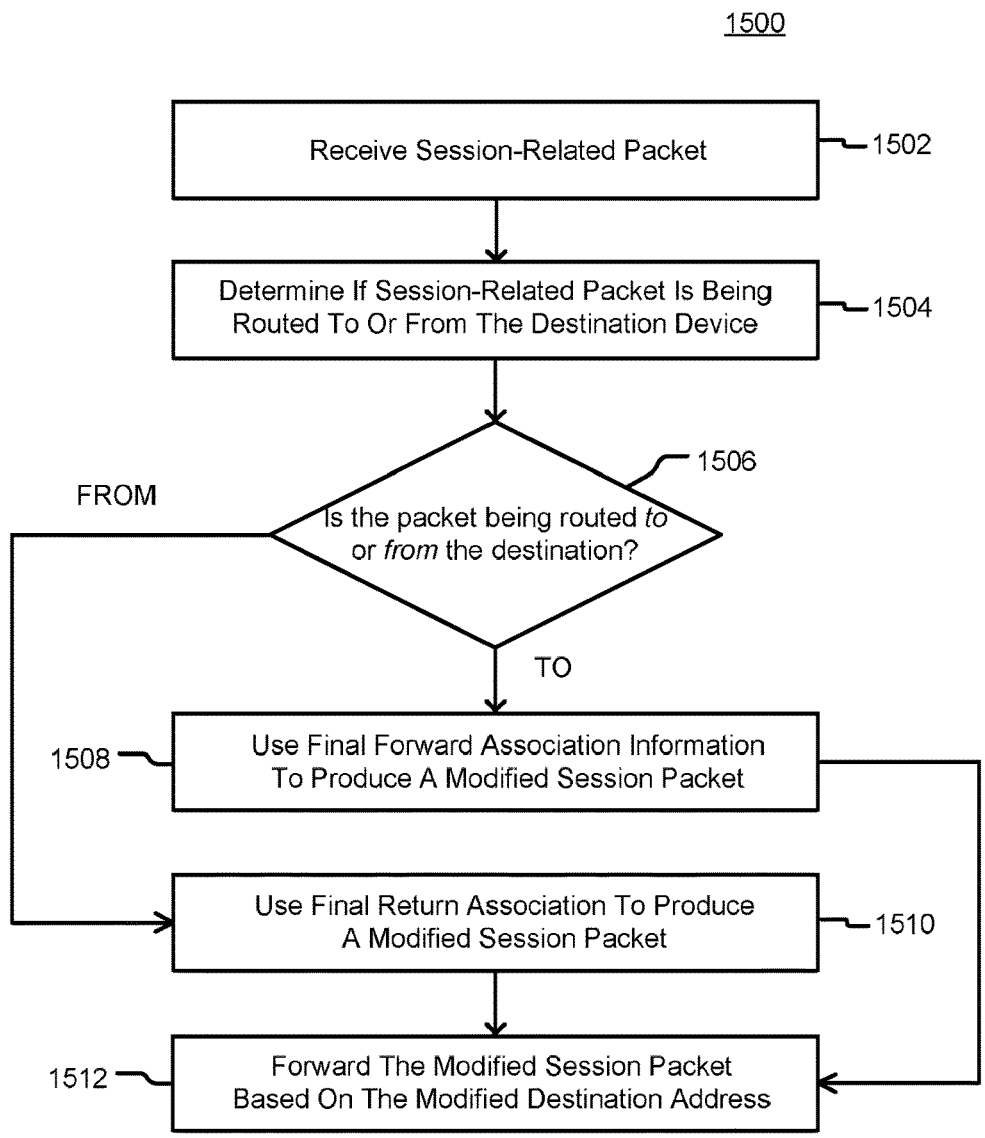
FIG. 15 is a flowchart schematically illustrating some session packet processing operations performed by an AIPR, in accordance with one exemplary embodiment.

FIG. 15 is a flowchart schematically illustrating some packet processing operations performed by an AIPR, in accordance with one exemplary embodiment. In block 1502, the AIPR receives a session-related packet. In block 1504, the AIPR determines if the session-related packet is being routed to or from the destination device. If the session-related packet is being routed to the destination device in block 1506, then the AIPR uses the Final Forward Association information to produce a modified session packet, in block 1508. If, however, the session-related packet is being routed from the destination device in block 1506, then the AIPR uses the Final Return Association information to produce a modified session packet, in block 1510. In either case, the AIPR forwards the modified session packet based on the modified destination address, in block 1512.

Stateful routing can be accomplished without presuming that each AIPR has a priori knowledge of the other AIPRs in the network in relation to the network/next hop associations contained in its routing information base. For example, a particular AIPR may not know the next waypoint AIPR (if any) to use for the destination network address. Rather, each waypoint AIPR can determine the presence or absence of a next waypoint AIPR after forwarding a modified lead packet.

By way of example with reference to FIG. 8, assuming AIPR 1 708 receives the original lead packet 801 from source client node 726, AIPR 1 708 identifies the lead packet 801 as the lead packet for a new session as discussed above, and also determines that the lead packet 801 is not a modified lead packet containing session metadata. Therefore, AIPR 1 708 determines that it is the first waypoint AIPR for the session. AIPR 1 708 stores information from the received lead packet 801, such as the source address, the source port number, the destination port number, and the protocol identifier.

Since AIPR 1 708 is the first waypoint AIPR, AIPR 1 708 is able to determine that future session-related packets received from the source client node 726 will have a source address (SA) of 1.1.1.1; a source port number of 10; a destination address of 5.5.5.5; a destination port number of 20; and a protocol identifier of 100.

To forward a modified lead packet, AIPR 1 708 does not know whether or not there is a next hop AIPR through which the modified lead packet will traverse. Therefore, rather than changing both the source address field and the destination address field in the lead packet, AIPR 1 708 may change just the source address field to be the network address of AIPR 1 708 (i.e., 2.2.2.2) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 1 708 may include the following information:

| | |
|---|---|
| SA | 2.2.2.2 |
| SP | 10 |
| DA | 5.5.5.5 |
| DP | 20 |
| PR | 100 |
| SSP | 30 (session source port number assigned by AIPR 1 708) |
| SDP | 40 (session destination port number assigned by AIPR 1 708) |

In this way, the modified lead packet transmitted by AIPR 1 708 will be routed based on the destination address of 5.5.5.5 and therefore may or may not traverse another AIPR on its way to destination service node 728. At this point, AIPR 1 708 does not know the destination address that will be used for session-related packets forwarded over an outgoing interface (since AIPR 1 708 does not determine until later whether or not it is the final waypoint AIPR between the source client node 726 and the destination service node 728).

Assume that the modified lead packet transmitted by AIPR 1 708 reaches AIPR 2 714. AIPR 2 714 identifies the modified lead packet as a lead packet for a new session as discussed above, and also determines that the modified lead packet is a modified lead packet containing session metadata. Therefore, AIPR 2 714 determines that it is not the first waypoint AIPR for the session. At this time, AIPR 2 714 is unable to determine whether or not it is the final waypoint AIPR for the session. AIPR 2 714 stores information from the received modified lead packet, such as the source address, the source port number, the destination port number, and the protocol identifier.

Since AIPR 2 714 is not the first waypoint AIPR, AIPR 2 714 is able to determine that future session-related packets received from AIPR 1 708 will have a source address (SA) of 2.2.2.2; a source port number of 30 (i.e., the SSP assigned by AIPR 1 708); destination address of 3.3.3.3; a destination port number of 40 (i.e., the SDP assigned by AIPR 1 708); and a protocol identifier of 100.

To forward a modified lead packet, AIPR 2 714 does not know whether or not there is a next hop AIPR through which the modified lead packet will traverse. Therefore, rather than changing both the source address field and the destination address field in the lead packet, AIPR 2 714 may change just the source address field to be the network address of AIPR 2 714 (i.e., 3.3.3.3) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 2 714 may include the following information:

| | |
|---|---|
| SA | 3.3.3.3 |
| SP | 10 |
| DA | 5.5.5.5 |
| DP | 20 |
| PR | 100 |
| SSP | 50 (session source port number assigned by AIPR 2 714) |
| SDP | 60 (session destination port number assigned by AIPR 2 714) |

In this way, the modified lead packet transmitted by AIPR 2 714 will be routed based on the destination address of 5.5.5.5 and therefore may or may not traverse another AIPR on its way to destination service node 728. At this point, AIPR 2 714 does not know the destination address that will be used for session-related packets forwarded over an outgoing interface (since AIPR 2 714 does not determine until later whether or not it is the final waypoint AIPR between the source client node 726 and the destination service node 728).

At some point, AIPR 2 714 identifies itself to AIPR 1 708 as a waypoint AIPR for the session (e.g., upon receipt of the modified lead packet from AIPR 1 708 or in a return packet associated with the session). This allows AIPR 1 708 to determine that it is not the final waypoint AIPR and therefore also allows AIPR 1 708 to determine the forward association parameters to use for forwarding session-related packets, i.e., AIPR 1 708 is able to determine that future session-related packets sent to AIPR 2 714 will have a source address (SA) of 2.2.2.2; a source port number of 30 (i.e., the SSP assigned by AIPR 1 708); destination address of 3.3.3.3;

a destination port number of 40 (i.e., the SDP assigned by AIPR 1 708); and a protocol identifier of 100.

Assume that the modified lead packet transmitted by AIPR 2 714 reaches AIPR 4 722. AIPR 4 722 identifies the modified lead packet as a lead packet for a new session as discussed above, and also determines that the modified lead packet is a modified lead packet containing session metadata. Therefore, AIPR 4 722 determines that it is not the first waypoint AIPR for the session. At this time, AIPR 4 722 is unable to determine whether or not it is the final waypoint AIPR for the session. AIPR 4 722 stores information from the received modified lead packet, such as the source address, the source port number, the destination port number, and the protocol identifier.

Since AIPR 4 722 is not the first waypoint AIPR, AIPR 4 722 is able to determine that future session-related packets received from AIPR 2 714 will have a source address (SA) of 3.3.3.3; a source port number of 50 (i.e., the SSP assigned by AIPR 2 714); destination address of 4.4.4.4; a destination port number of 60 (i.e., the SDP assigned by AIPR 2 714); and a protocol identifier of 100.

To forward a modified lead packet, AIPR 4 722 does not know whether or not there is a next hop AIPR through which the modified lead packet will traverse. Therefore, rather than changing both the source address field and the destination address field in the lead packet, AIPR 4 722 may change just the source address field to be the network address of AIPR 4 722 (i.e., 4.4.4.4) and may insert any assigned source and destination port numbers as metadata rather than inserting the assigned source and destination port numbers in the source and destination port number fields of the modified lead packet and carrying the original source and destination port numbers as metadata as in the exemplary embodiment discussed above. Thus, for example, the modified lead packet transmitted by AIPR 4 722 may include the following information:

| | |
|---|---|
| SA | 4.4.4.4 |
| SP | 10 |
| DA | 5.5.5.5 |
| DP | 20 |
| PR | 100 |
| SSP | 70 (session source port number assigned by AIPR 4 722) |
| SDP | 80 (session destination port number assigned by AIPR 4 722) |

In this way, the modified lead packet transmitted by AIPR 4 722 will be routed based on the destination address of 5.5.5.5 and therefore may or may not traverse another AIPR on its way to destination service node 728. At this point, AIPR 4 722 does not know the destination address that will be used for session-related packets forwarded over an outgoing interface (since AIPR 4 722 does not determine until later whether or not it is the final waypoint AIPR between the source client node 726 and the destination service node 728).

At some point, AIPR 4 722 identifies itself to AIPR 2 714 as a waypoint AIPR for the session (e.g., upon receipt of the modified lead packet from AIPR 2 714 or in a return packet associated with the session). This allows AIPR 2 714 to determine that it is not the final waypoint AIPR and therefore also allows AIPR 2 714 to determine the forward association parameters to use for forwarding session-related packets, i.e., AIPR 2 714 is able to determine that future session-related packets sent to AIPR 4 722 will have a source address (SA) of 3.3.3.3; a source port number of 50 (i.e., the SSP assigned by AIPR 2 714); destination address of 4.4.4.4;

a destination port number of 60 (i.e., the SDP assigned by AIPR 2 714); and a protocol identifier of 100.

Assume that the modified lead packet transmitted by AIPR 4 722 reaches the destination service node 728, which processes the modified lead packet without reference to the session metadata contained in the packet. Typically, this includes the destination device sending a reply packet back toward the source client node 726.

Since AIPR 4 722 receives a packet from the destination service node 728, as opposed to another waypoint AIPR, AIPR 4 722 is able to determine that it is the final waypoint AIPR and therefore also is able to determine the forward association parameters to use for forwarding session-related packets, i.e., AIPR 4 722 is able to determine that future session-related packets sent to the destination service node 728 will have a source address (SA) of 4.4.4.4; a source port number of 10 (i.e., the original SP); a destination address of 5.5.5.5; a destination port number of 20 (i.e., the original DP); and a protocol identifier of 100.

After the lead packet has been processed and the session-related information has been established by the waypoint AIPRs hop-by-hop from the source client node 726 to the destination service node 728, additional packets may be exchanged between the source client node 726 and the destination service node 728 to establish an end-to-end communication session between the source client node 726 and the destination service node 728.

Lead Packet Identification in Stateful Session

As noted above, a waypoint should be able to identify a lead packet of a session. Various techniques may be used to identify lead packets. Some of these techniques are protocol-specific. For example, a TCP session is initiated according to a well-known three-part handshake involving a SYN packet, a SYN-ACK packet and an ACK packet. By statefully following packet exchanges between pairs of nodes, a waypoint can identify a beginning of a session and, in many cases, an end of the session. For example, a TCP session may be ended by including a FIN flag in a packet and having the other node send an ACK, or by simply including an RST flag in a packet. Because each waypoint stores information about each session, such as the source/destination network address and port number pairs, the waypoint can identify the session with which each received packet is associated. The waypoint can follow the protocol state of each session by monitoring the messages and flags, such as SYN and FIN, sent by the endpoints of the session and storing state information about each session in its database.

It should be noted that a SYN packet may be re-transmitted—each SYN packet does not necessarily initiate a separate session. However, the waypoint can differentiate between SYN packets that initiate a session and re-transmitted SYN packets based on, for example, the response packets.

Where a protocol does not define a packet sequence to end a session, the waypoint may use a timer. After a predetermined amount of time, during which no packet is handled for a session, the waypoint may assume the session is ended. Such a timeout period may also be applied to sessions using protocols that define end sequences.

The following table describes exemplary techniques for identifying the beginning and end of a session, according to various protocols. Similar techniques may be developed for other protocols, based on the definitions of the protocols.

TABLE 3

| Protocol | Destination Port | Technique for Start/End Determination |
| --- | --- | --- |
| TCP | Any | Detect start on the first SYN packet from a new address/port unique within the TCP protocol's guard time between address/port reuse. Following the TCP state machine to determine an end (FIN exchange, RST, or guard timeout). |
| UDP-TFTP | 69 | Trap on the first RRQ or WRQ message to define a new session, trap on an undersized DAT packet for an end of session. |
| UDP-SNMP | 161, 162 | Trap on the message type, including GetRequest, SetRequest, GetNextRequest, GetBulkRequest, InformRequest for a start of session, and monitor the Response for end of session. For SNMP traps, port 162 is used, and the flow of data generally travels in the "reverse" direction. |
| UDP-SYSLOG | 514 | A single message protocol, thus each message is a start of session, and end of session. |
| UDP-RTP | Any | RTP has a unique header structure, which can be reviewed/analyzed to identify a start of a session. This is not always accurate, but if used in combination with a guard timer on the exact same five-tuple address, it should work well enough. The end of session is detected through a guard timer on the five-tuple session, or a major change in the RTP header. |
| UDP-RTCP | Any | RTCP also has a unique header, which can be reviewed, analyzed, and harvested for analytics. Each RTCP packet is sent periodically and can be considered a "start of session" with the corresponding RTCP response ending the session. This provides a very high quality way of getting analytics for RTCP at a network middle point, without using a Session Border Controller. |

TABLE 3-continued

| Protocol | Destination Port | Technique for Start/End Determination |
| --- | --- | --- |
| UDP-DNS (Nameserver) | 53 | Each DNS query is a single UDP message and response. By establishing a forward session (and subsequent backward session) the Augmented router gets the entire transaction. This allows analytics to be gathered and manipulations that are appropriate at the Augmented router. |
| UDP-NTP | 123 | Each DNS query/response is a full session. So, each query is a start, and each response is an end. |

Figure 16:
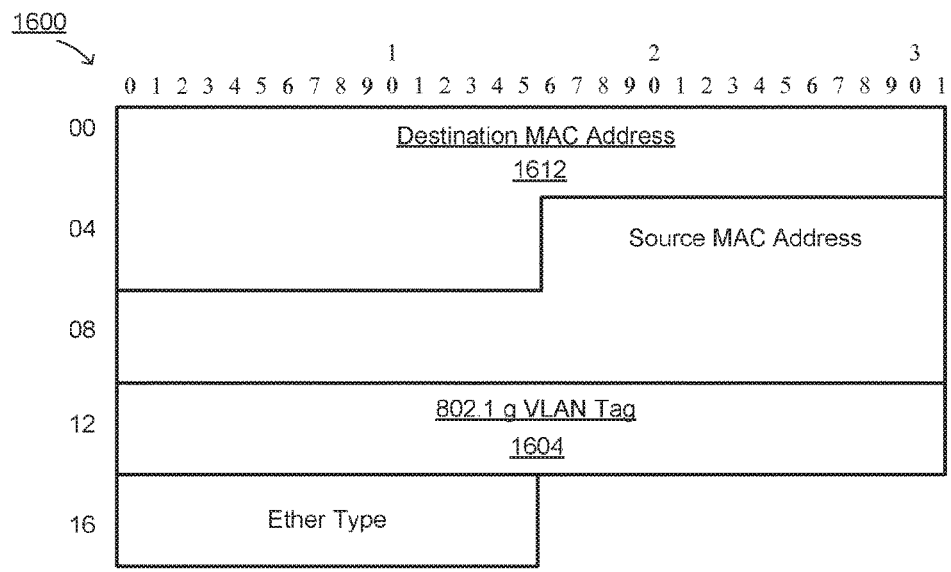
FIG. 16 schematically shows a layout of an Ethernet header, identifying fields used for identifying a beginning of a session, in accordance with one exemplary embodiment.

FIG. 16 is a schematic layout of an Ethernet header 1600, including a Destination MAC Address 1602 and an 802.1q VLAN Tag 1604.

Figure 17:
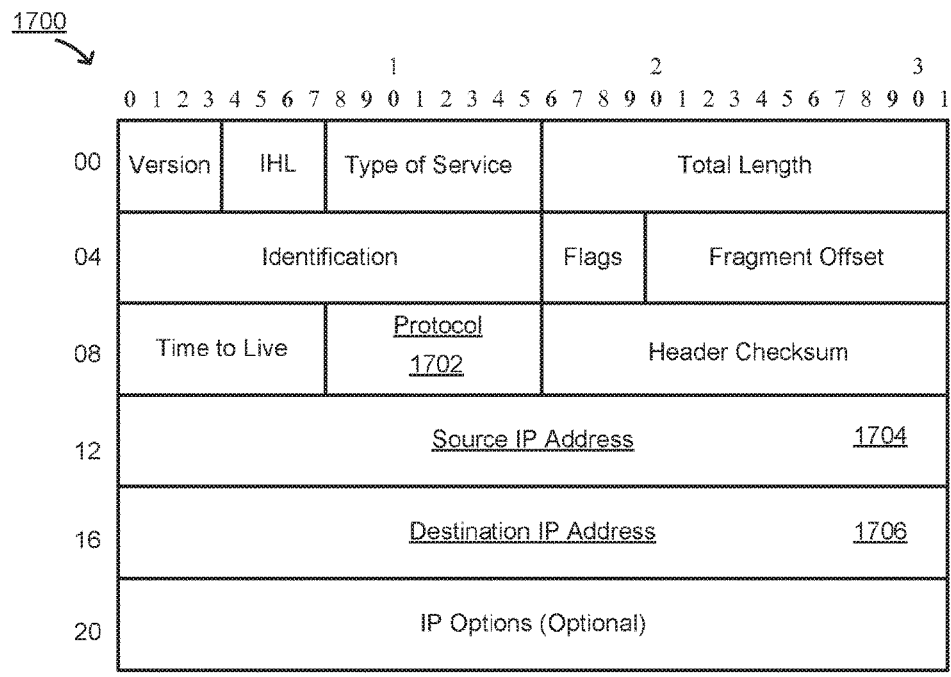
FIG. 17 schematically shows a layout of an IP header, identifying fields used for identifying a beginning of a session, in accordance with one exemplary embodiment.

FIG. 17 is a schematic layout of an IPv4 header 1700, including a Protocol field 1702, a Source IP Address 1704 and a Destination IP Address 1706. There are two commonly-used versions of IP, namely IP version 4 ("IPv4") and IP version 6 ("IPv6"). IPv4 is described in IETF RFC 791, which is hereby incorporated herein by reference in its entirety. IPv6 is described in IETF RFC 2460, which is hereby incorporated herein by reference in its entirety. The main purpose of both versions is to provide unique global computer addressing to ensure that communicating devices can identify one another. One of the main distinctions between IPv4 and IPv6 is that IPv4 uses 32-bit IP addresses, whereas IPv6 utilizes 128 bit IP addresses. In addition, IPv6 can support larger datagram sizes.

Figure 18:
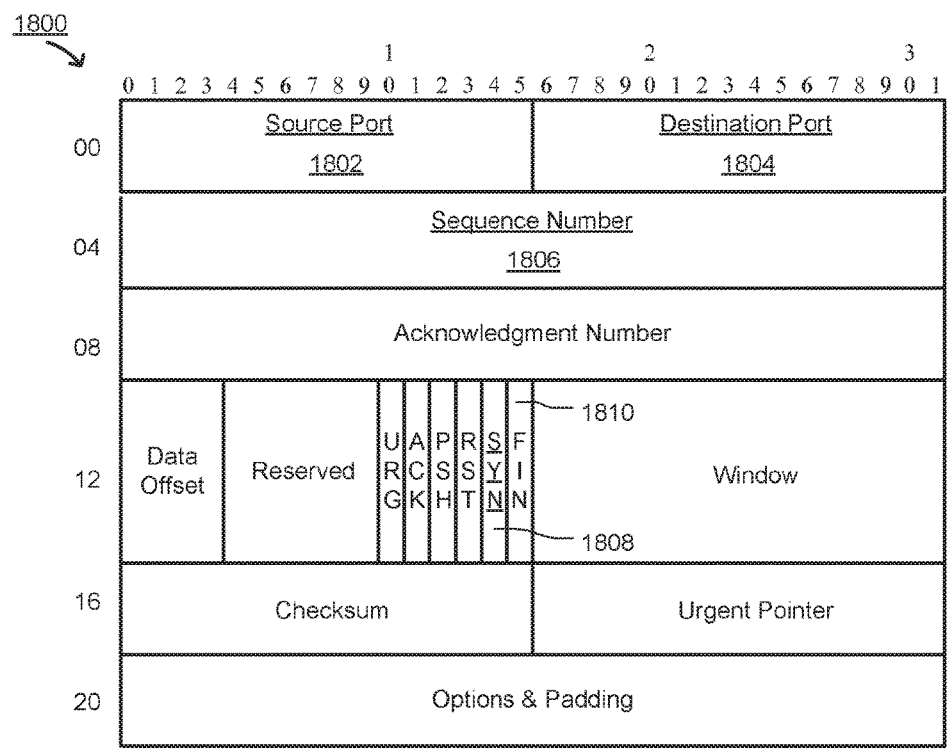
FIG. 18 schematically shows a layout of a TCP header, identifying fields used for identifying a beginning of a session, in accordance with one exemplary embodiment.

FIG. 18 is a schematic layout of a TCP header 1800, including a Source Port 1802, a Destination Port 1804, a Sequence Number 1806, a SYN flag 1808 and a FIN flag 1810. TCP is described generally in IETF RFC 793, which is hereby incorporated herein by reference in its entirety. Similar to TCP, the UDP header includes a Source Port field and a Destination Port field. UDP is described generally in IETF RFC 768, which is hereby incorporated herein by reference in its entirety.

These packets and the identified fields may be used to identify the beginning of a session, as summarized in the following table.

TABLE 4

| Data Item | Where From | Description |
| --- | --- | --- |
| Physical Interface | Ethernet Header | This is the actual port that the message was received on, which can be associated or discerned by the Destination MAC Address |
| Tenant | Ethernet Header OR Source MAD Address & Previous Advertisement | Logical association with a group of computers. |
| Protocol | IP Header | This defines the protocol in use and, for the TCP case, it must be set to a value that corresponds to TCP |
| Source IP Address | IP Header | Defines the source IP Address of the initial packet of a flow. |
| Destination IP Address | IP Header | Defines the destination IP Address of the initial packet of a flow. |
| Source Port | TCP or UDP Header | Defines the flow instance from the source. This may reflect a client, a firewall in front of the client, or a carrier grade NAT. |
| Destination Port | TCP or UDP Header | This defines the desired service requested, such as 80 for HTTP. |

TABLE 4-continued

| Data Item | Where From | Description |
| --- | --- | --- |
| Sequence Number | TCP Header | This is a random number assigned by the client. It may be updated by a firewall or carrier grade NAT. |
| SYN Bit On | TCP Header | When the SYN bit is on, and no others, this is an initial packet of a session. It may be retransmitted if there is no response to the first SYN message. |

The lead packet, and hence the session identifying information, can include information from a single field or can include information from multiple fields. In certain exemplary embodiments, sessions are based on a "5-tuple" of information including the source IP address, source port number, destination IP address, destination port number, and protocol from the IP and TCP headers.

Augmented IP Router (AIPR)

Figure 19:
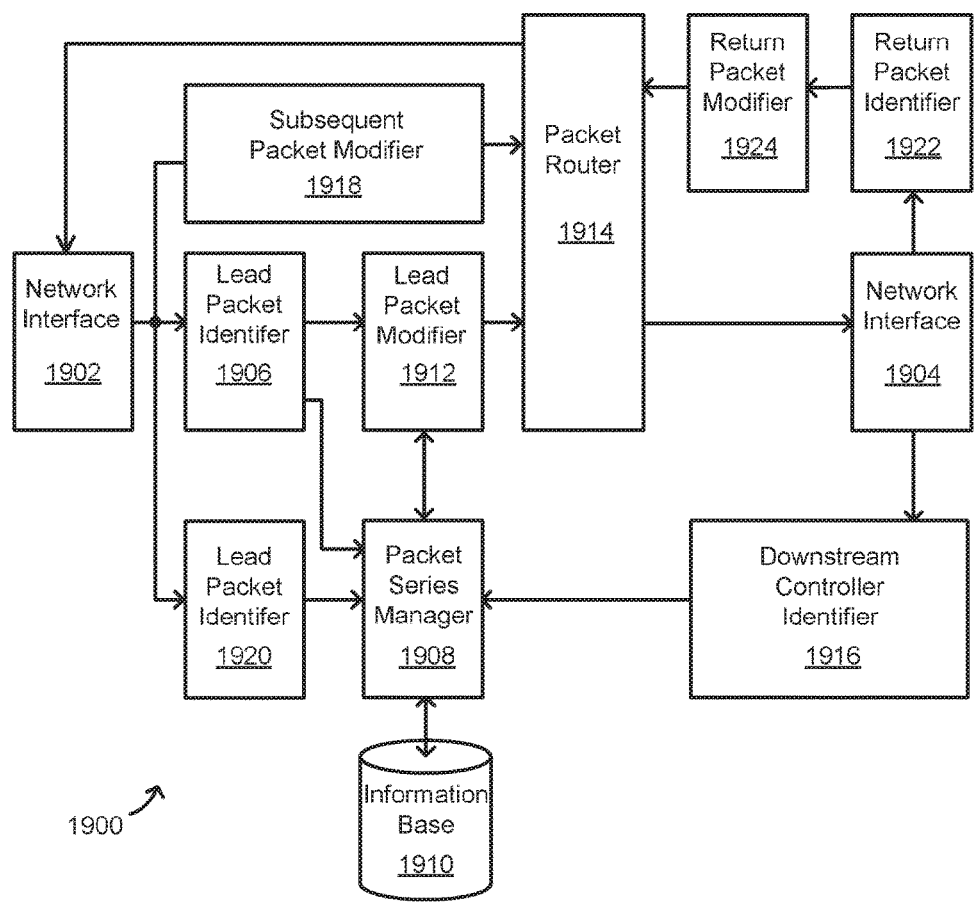
FIG. 19 schematically shows a block diagram of an AIPR of FIG. 7, in accordance with one exemplary embodiment.

FIG. 19 is a schematic block diagram of an exemplary AIPR (waypoint) 1900 configured in accordance with illustrative embodiments of the invention. The AIPR 1900 includes at least two network interfaces 1902 and 1904, through which the AIPR 1900 may be coupled to two networks. The interfaces 1902 and 1904 may be, for example, Ethernet interfaces. The AIPR 1900 may send and receive packets via the interfaces 1902 and 1904.

A lead packet identifier 1906 automatically identifies lead packets, as discussed herein. In general, the lead packet identifier 1906 identifies a lead packet when the lead packet identifier 1906 receives a packet related to a session that is not already represented in the AIPR's information base 1910, such as a packet that identifies a new source client/destination service network address/port number pair. As noted, each lead packet is an initial, non-dropped, packet of a series of packets (session). Each session includes a lead packet and at least one subsequent packet. The lead packet and all the subsequent packets are sent by the same source client toward the same destination service, for forward flow control. For forward and backward flow control, all the packets of the session are sent by either the source client or the destination service toward the other.

A session (packet series) manager 1908 is coupled to the lead packet identifier 1906. For each session, the session manager assigns a unique identifier. The unique identifier may be, for example, a combination of the network address of the AIPR 1900 or of the interface 1902, in combination with a first port number assigned by the session manager 1908 for receiving subsequent packets of this session. The unique identifier may further include the network address of the AIPR 1900 or of the other interface 1904, in combination with a second port number assigned by the session manager

1908 for transmitting the lead packet and subsequent packets. This unique identifier is associated with the session. The session manager 1908 stores information about the session in an information base 1910. This information may include the unique identifier, in association with the original source client/destination service network address/port number pairs.

Figure 20:
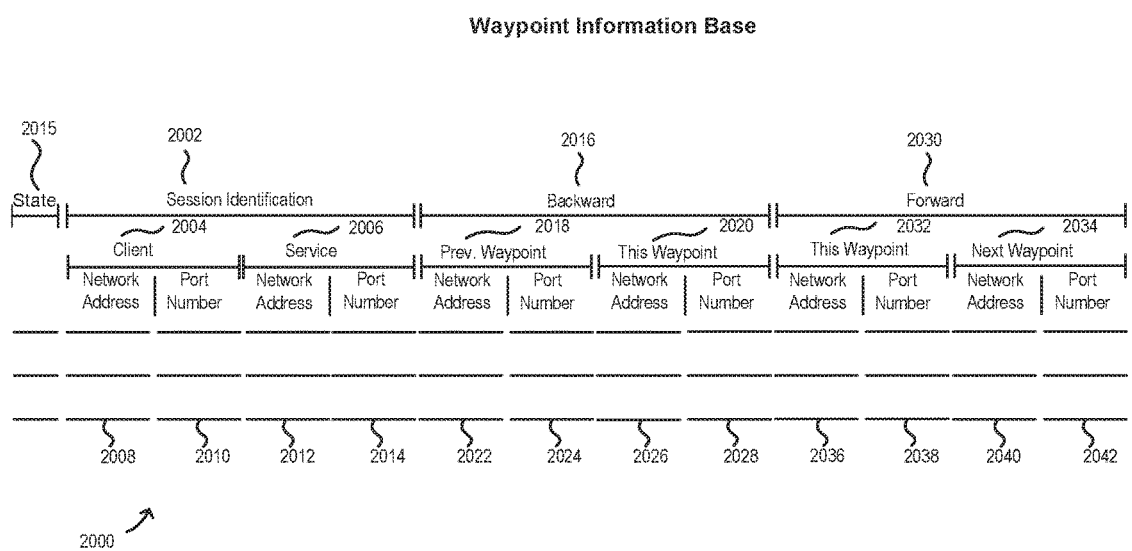
FIG. 20 shows a schematic illustration of information stored in an information base by the AIPR of FIGS. 7 and 19, in accordance with one exemplary embodiment.

FIG. 20 is a schematic layout of an exemplary waypoint information base 2000. Each row represents a session. A session identification column 2002 includes sub-columns for the source client 2004 and the destination service 2006. For each client 2004, its network address 2008 and port number 2010 are stored. For each destination service 2006, its network address 2012 and port number 2014 are stored. This information is extracted from the lead packet.

State information about the session may be stored in a state column 2015. This information may be used to statefully follow a series of packets, such as when a session is being initiated or ended.

A backward column includes sub-columns for storing information 2016 about a portion of the backward path, specifically to the previous AIPR. The backward path information 2016 includes information 2018 about the previous AIPR and information 2020 about the present AIPR 1900. The information 2018 about the previous AIPR includes the AIPR's network address 2022 and port number 2024. The session manager 1908 extracts this information from the lead packet, assuming the lead packet was forwarded by an AIPR. If, however, the present AIPR 1900 is the first AIPR to process the lead packet, the information 2018 is left blank as a flag. The information 2020 about the present AIPR 1900 includes the network address 2026 of the interface 1902 over which the lead packet was received, as well as the first port number 2028 assigned by session manager 1908.

The waypoint information base 2000 is also configured to store information 2030 about a portion of the forward path (of a session), specifically to the next AIPR. This information 2030 includes information 2032 about the present AIPR 1900 and information 2034 about the next AIPR along the path, assuming there is a next AIPR. The information 2032 includes the network address 2036 of the interface over which the present AIPR will send the lead packet and subsequent packets, as well as the second port number 2038 assigned by the session manager 1908. The information 2034 about the next AIPR along the path may not yet be available, unless the AIPR is provisioned with information about the forward path. The information 2034 about the next AIPR includes its network address 2040 and port number 2042. If the information 2034 about the next AIPR is not yet available, the information 2034 may be filled in when the AIPR 1900 processes a return packet, as described below, or as when determined using the process of FIG. 5.

Some embodiments of the waypoint information base 2000 may include the forward information 2030 without the backward information 2016. Other embodiments of the waypoint information base 2000 may include the backward information 2016 without the forward information 2030. Statistical information may be gathered and/or calculated using either or both forward and backward information 2016.

Returning to FIG. 19, a lead packet modifier 1912 is coupled to the session manager 1908. The lead packet modifier 1912 modifies the lead packet to store the unique identifier associated with the session. The original source client network address/port number pair, and the original destination service network address/port number pair, are stored in the modified lead packet, if necessary. The lead packet may be enlarged to accommodate the additional information stored therein, or existing space within the lead packet, such a vendor specific attribute field, may be used. Other techniques for transmitting additional information are protocol specific, for example with TCP, the additional information could be transmitted as a TCP Option field, or added to the SYN packet as data. In either case, the term session data block is used to refer to the information added to the modified lead packet.

Figure 21:
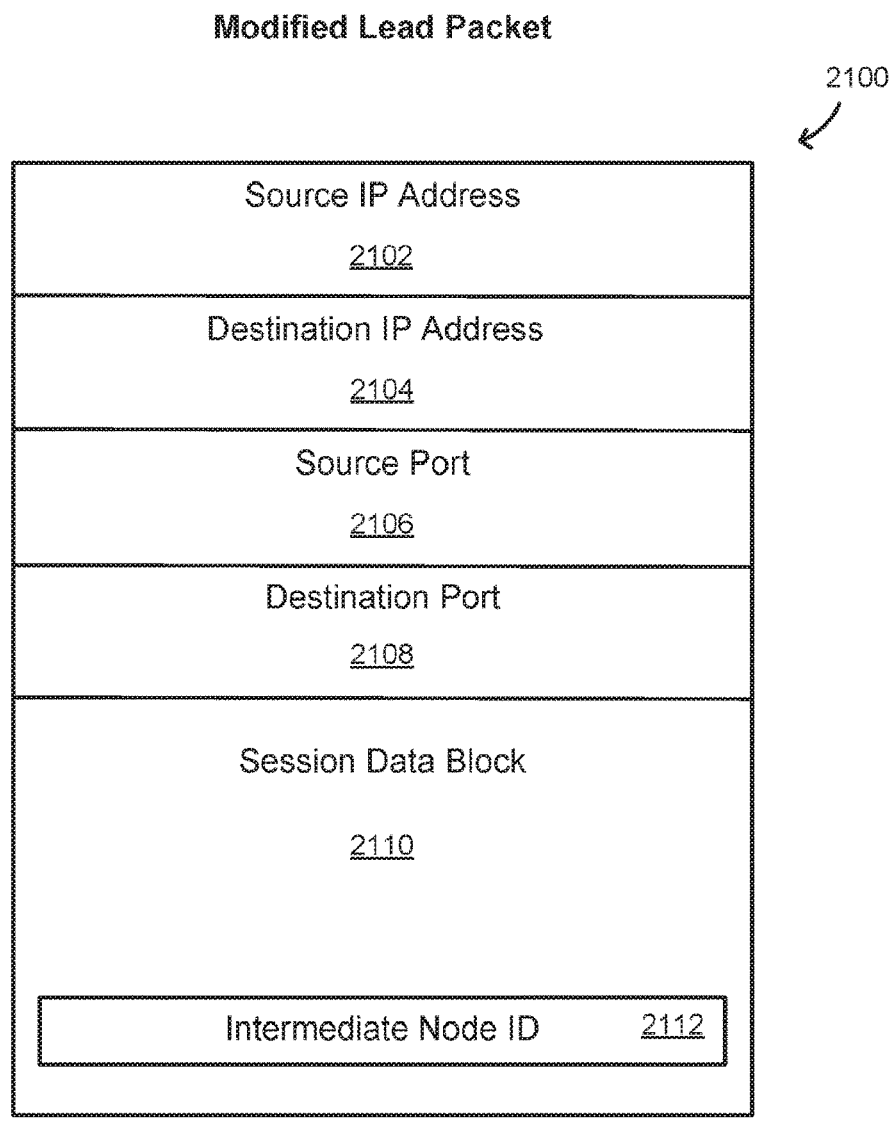
FIG. 21 schematically shows a modified lead packet produced by the AIPR of FIGS. 7 and 19, in accordance with one exemplary embodiment.

FIG. 21 is a schematic diagram of an exemplary modified lead packet 2100 showing the original source and destination IP addresses 2102 and 2104, respectively, and the original source and destination port numbers 2106 and 2108, respectively. FIG. 21 also shows a session data block 2110 in the modified lead packet 2100. Although the session data block 2110 is shown as being contiguous, it may instead have its contents distributed throughout the modified lead packet 2100. The session data block 2110 may store an identification of the sending AIPR, i.e., an intermediate node identifier 2112, such as the network address of the second network interface 2104 and the second port number.

Returning to FIG. 21, the lead packet modifier 2112 updates the packet length, if necessary, to reflect any enlargement of the packet. The lead packet modifier 2112 updates the checksum of the packet to reflect the modifications made to the packet. The modified lead packet is then transmitted by a packet router 1914, via the second network interface 1904. The modified lead packet is naturally routed, unless the AIPR 1900 has been provisioned with forward path information.

Eventually, the destination service sends a return packet. The AIPR 1900 receives the return packet via the second interface 1904. If another AIPR (downstream AIPR) between the present AIPR 1900 and the destination service handles the lead packet and the return packet, the downstream AIPR modifies the return packet to include the downstream AIPR's network address and a port number. A downstream controller 1916 identifier uses stateful inspection, as described herein, to identify the return packet. The downstream controller 1916 stores information 2034 (FIG. 20), specifically the network address and port number, about the next AIPR in the waypoint information base 2000.

The present AIPR 1900 may use this information to address subsequent packets to the next AIPR. Specifically, a subsequent packet modifier 1918 may set the destination address of the subsequent packets to the network address and port number 2040 and 2042 (FIG. 20) of the next waypoint, instead of directly to the destination service. The packet router 1914 sends the subsequent packets, according to their modified destination addresses. Thus, for each series of packets, subsequent packets flow through the same downstream packet flow controllers as the lead packet of the series of packets.

A last packet identifier 1920 statefully follows each session, so as to identify an end of each stream, as discussed above. As noted, in some cases, the end is signified by a final packet, such as a TCP packet with the RST flag set or a TCP ACK packet in return to a TCP packet with the FIN flag set. In other cases, the end may be signified by a timer expiring. When the end of a session is detected, the packet series manager 1908 disassociates the unique identifier from the session and deletes information about the session from the waypoint information base 2000.

Where the AIPR 1900 is provisioned to be a last AIPR before a destination service, the lead packet modifier 1906 restores the lead packet to the state the lead packet was in when the source client sent the lead packet, or as the lead packet was modified, such as a result of network address translation (NAT). Similarly, the subsequent packet modifier 1918 restores subsequent packets.

Similarly, if the destination address of the lead packet is the same as the network address of the AIPR 1900, or its network interface 1902 over which it receives the lead packets, the lead packet modifier 1906 and the subsequent packet modifier 1918 restore the packet and subsequent packets.

As noted, in some protocols, several packets are required to initiate a session, as with the SYN-SYN/ACK-ACK handshake of the TCP. Thus, the downstream controller identifier 1916 may wait until a second return packet is received from the destination service before considering a session as having started.

As noted, some embodiments of the waypoint 1900 also manage return packet paths. The lead packet identifier 1906 automatically ascertains whether a lead packet was forwarded to the waypoint 1900 by an upstream waypoint. If the lead packet includes a session data block, an upstream waypoint forwarded the lead packet. The packet series manager 1908 stores information about the upstream waypoint in the waypoint information base 1910. A return packet identifier 1922 receives return packets from the second network interface 1904 and automatically identifies return packets of the session. These return packets may be identified by destination address and port number being equal to the information 2032 (FIG. 20) in the waypoint information base corresponding to the session. A return packet modifier modifies the return packets to address them to the upstream waypoint for the session, as identified by the information 2018 in the waypoint information base 2000.

Figure 22:
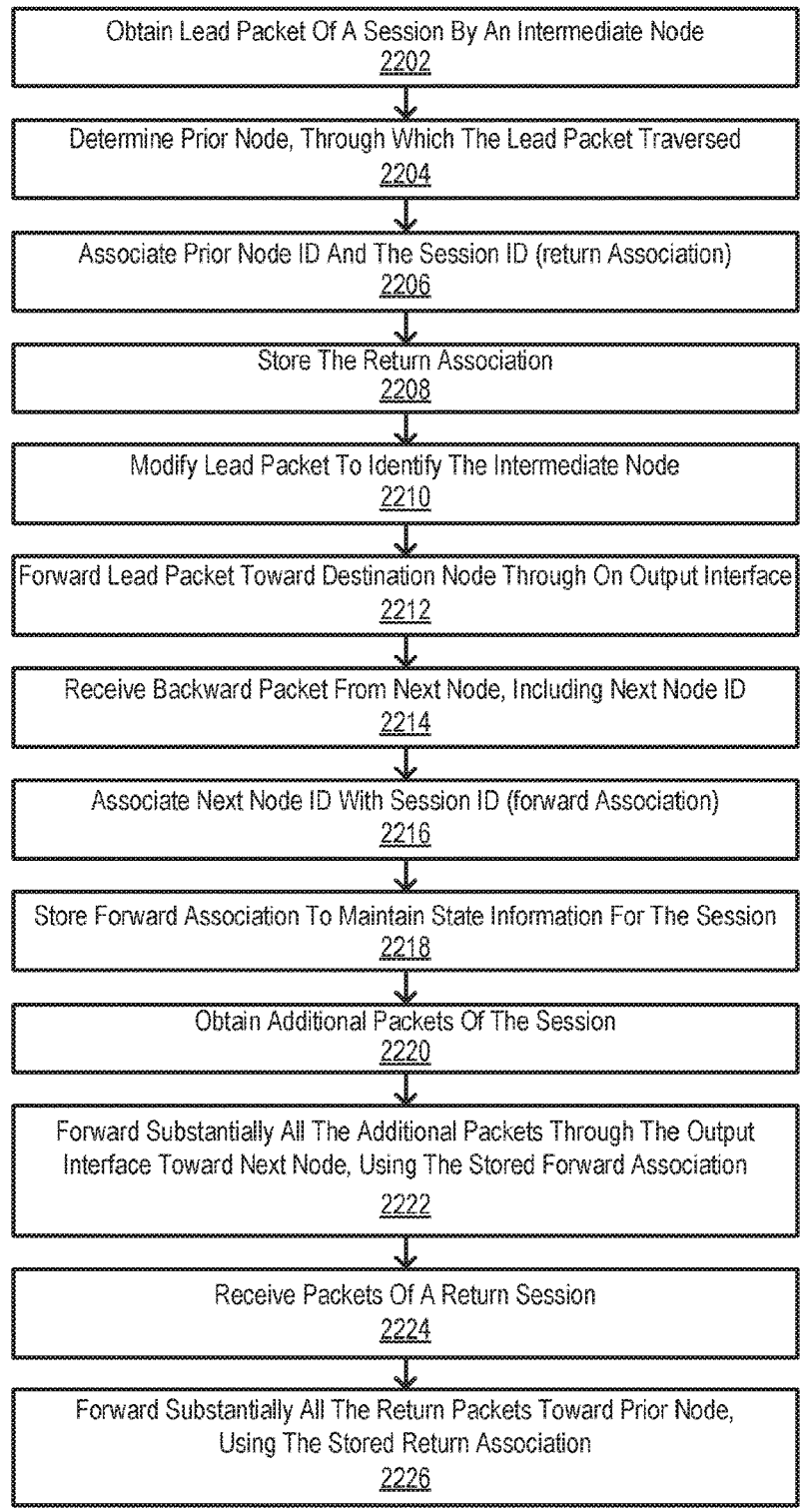
FIG. 22 is a flowchart illustrating some of the operations performed by the AIPR of FIGS. 7 and 19, in accordance with one exemplary embodiment.

FIG. 22 shows a flowchart schematically illustrating some operations performed by the AIPR 1900 (FIG. 19) in accordance with illustrative embodiments of the invention. The flowchart illustrates a packet routing method for directing packets of a session from an originating node toward a destination node in an IP network. At 2202, an intermediate node obtains a lead packet of a plurality of packets in a session. The intermediate node may include a routing device or a switching device that performs a routing function.

The packets in the session have a unique session identifier. At 2204, a prior node, through which the lead packet traversed, is determined. The prior node has a prior node identifier. At 2206, a return association is formed between the prior node identifier and the session identifier. At 2208, the return association is stored in memory to maintain state information for the session.

At 2210, the lead packet is modified to identify at least the intermediate node. At 2212, the lead packet is forwarded toward the destination node though an intermediate node electronic output interface to the IP network. The next hop node may be determined any number of ways, including using the process of FIG. 5. The electronic output interface is in communication with the IP network. At 2214, a backward message (e.g., a packet, referred to as a "backward packet") is received through an electronic input interface of the intermediate node. The backward message is received from a next node having a next node identifier. The backward message includes the next node identifier and the session identifier. The electronic input interface is in communication with the IP network.

At 2216, a forward association is formed between the next node identifier and the session identifier. At 2218, the forward association is stored in memory, to maintain state information for the session. At 2220, additional packets of the session are obtained. At 2222, substantially all of the additional packets in the session are forwarded toward the next node, using the stored forward association. The additional packets are forwarded through the electronic output interface of the intermediate node.

At 2224, a plurality of packets is received in a return session, or a return portion of the session, from the destination. The return session is addressed toward the originating node. At 2226, substantially all the packets in the return session are forwarded toward the prior node, using the stored return association. The packets are forwarded through the electronic output interface.

Figure 23:
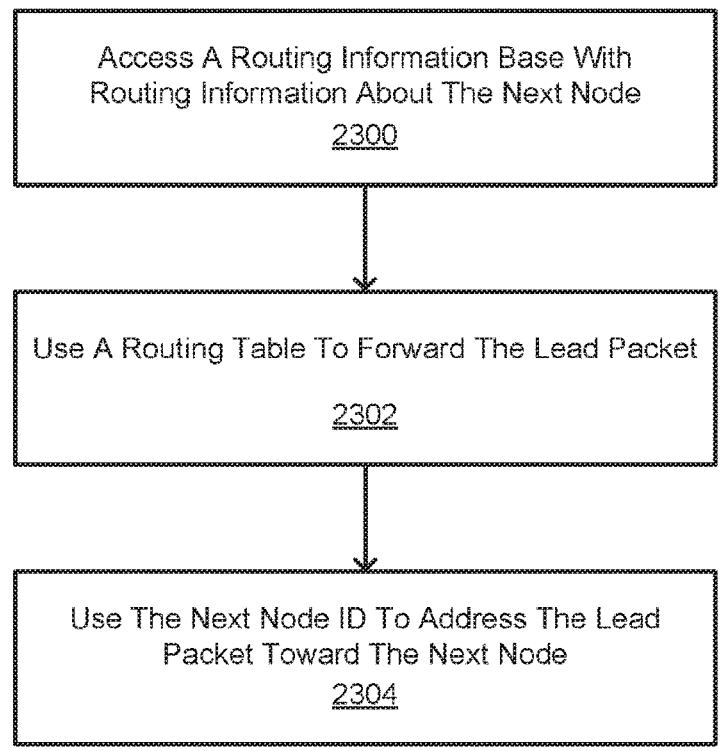
FIG. 23 is a flowchart illustrating some of the operations involved with forwarding a lead packet, in accordance with one exemplary embodiment.

FIG. 23 shows a high-level alternative process of managing the lead packet when establishing a session. As shown at 2300, forwarding the lead packet 2212 toward the destination node may include accessing a routing information base having routing information for the next hop node and other potential next nodes. As shown at 2302, the intermediate node may have a routing table, and forwarding the lead packet 2212 toward the destination node may include using the routing table to forward the lead packet toward the destination node and next hop node. As shown at 2304, forwarding the lead packet 2212 toward the destination node may include using the next node identifier to address the lead packet toward the next hop node. The lead packet may be addressed so that a plurality of network devices receives the lead packet after it is forwarded and before the next hop node receives the lead packet.

In a manner similar to other components discussed above, the AIPR 1900 and all or a portion of its components 1902-1924, as well as the resource allocator 2500, may be implemented by a processor executing instructions stored in a memory, hardware (such as combinatorial logic, Application Specific Integrated Circuits (ASICs), Field-Programmable Gate Arrays (FPGAs) or other hardware, firmware or combinations thereof.

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Furthermore, embodiments disclosed herein may be suitably practiced, absent any element that is not specifically disclosed herein. Accordingly, the invention should not be viewed as being limited to the disclosed embodiments.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Some embodiments may be implemented in a software-as-a-service ("SAAS") model or cloud computing model. Moreover, while embodiments may be described in connection with various illustrative data structures, systems may be embodied using a variety of data structures.

What is claimed is:

1. A self-protecting network router, comprising:
    a memory storing data representing: a plurality of receive queues, a plurality of transmit queues, a plurality of traffic engineering queues and at least one service queue;
    a plurality of network interfaces, each network interface of the plurality of network interfaces being: (a) associated with at least one receive queue of the plurality of receive queues and at least one transmit queue of the plurality of transmit queues and (b) configured to automatically enqueue messages received thereby from outside the self-protecting network router to the at least one receive queue associated therewith and dequeue messages from the at least one transmit queue associated therewith for transmission thereby to outside the self-protecting network router;
    a path controller configured to: (a) dequeue forwardable messages from the plurality of receive queues and enqueue the forwardable messages to the plurality of transmit queues; and (b) dequeue unforwardable messages from the plurality of receive queues and enqueue the unforwardable messages to the plurality of traffic engineering queues, wherein each traffic engineering queue of the plurality of traffic engineering queues is configured to drop, rather than accept, messages being enqueued thereto when the traffic engineering queue is full;
    a service controller configured to dequeue the unforwardable messages from the plurality of traffic engineering queues and enqueue the unforwardable messages to the at least one service queue, such that each service queue of the at least one service queue is at most a predetermined fraction, less than 100%, full;
    at least one process configured to generate internally-generated messages and enqueue the internally-generated messages to the at least one service queue, without regard to fullness of the at least one service queue; and
    at least one service process configured to dequeue and process the unforwardable messages and the internally-generated messages from the at least one service queue.

2. The self-protecting network router according to claim 1, wherein the predetermined fraction is less than 50%.

3. The self-protecting network router according to claim 1, wherein the path controller comprises a message classifier configured to analyze protocol portions of the messages received by the plurality of network interfaces and, as a result of the analysis, for messages in which the protocol portions indicate bidirectional forwarding detection (BFD), enqueue the messages to the plurality of traffic engineering queues.

4. The self-protecting network router according to claim 1, wherein the path controller comprises a message classifier configured to analyze protocol portions of the messages received by the plurality of network interfaces and, as a result of the analysis, for messages in which the protocol portions indicate address resolution protocol (ARP), bidirectional forwarding detection (BFD) or routing, enqueue the messages to the plurality of traffic engineering queues.

5. The self-protecting network router according to claim 1, wherein the path controller comprises a message classifier configured to analyze protocol portions of the messages received by the plurality of network interfaces and, as a result of the analysis, for messages in which the protocol portions indicate address resolution protocol (ARP), enqueue the messages to the plurality of traffic engineering queues.

6. The self-protecting network router according to claim 5, further comprising:
    a flow table stored in the memory; and wherein:
    the path controller is configured to compare address portions of the messages received by the plurality of network interfaces to address data stored in the flow table and, as a result of the comparison:
        for messages in which the address portions match the address data, enqueue the messages to the plurality of transmit queues; and
        for messages in which the address portions do not match the address data, enqueue the messages to the plurality of traffic engineering queues.

7. The self-protecting network router according to claim 6, wherein:
    the plurality of traffic engineering queues comprises:
        at least one ARP traffic engineering queue;
    the at least one service queue comprises:
        an ARP service queue; and
    the at least one service process comprises:
        an ARP service process.

8. The self-protecting network router according to claim 7, wherein
    the plurality of traffic engineering queues further comprises:
        at least one BFD traffic engineering queue;
        at least one flow setup traffic engineering queue; and
        at least one routing traffic engineering queue;
    the at least one service queue further comprises:
        a BFD service queue;
        a flow setup service queue; and
        a routing service queue; and
    the at least one service process further comprises:
        a BFD service process;
        a flow setup service process; and
        a routing service process.

9. The self-protecting network router according to claim 8, wherein:
    the path controller comprises a message classifier configured to analyze protocol portions of the messages received by the plurality of network interfaces and, as a result of the analysis, for messages in which the protocol portions indicate:
        resolution protocol (ARP), enqueue the messages to the at least one ARP traffic engineering queue;
        bidirectional forwarding detection (BFD) enqueue the messages to the at least one BFD traffic engineering queue;
        flow setup, enqueue the messages to the at least one flow setup traffic engineering queue; and
        routing, enqueue the messages to the at least one routing traffic engineering queue.

10. The self-protecting network router according to claim 7, further comprising:
    a plurality of P processors coupled to the memory; and wherein:

the at least one ARP traffic engineering queue comprises:
a number (P) of ARP traffic engineering queues, each ARP traffic engineering queue of the P ARP traffic engineering queues being associated with a different one of the P processors.

11. The self-protecting network router according to claim 10 wherein, for each traffic engineering queue of the plurality of traffic engineering queues, only the one processor associated with the traffic engineering queue enqueues the unforwardable messages on the traffic engineering queue.

12. The self-protecting network router according to claim 10, wherein:
the plurality of traffic engineering queues comprises:
a number (P) of BFD traffic engineering queues, each BFD traffic engineering queue of the P BFD traffic engineering queues being associated with a different one of the P processors;
a number (P) of flow setup traffic engineering queues, each flow setup traffic engineering queue of the P flow setup traffic engineering queues being associated with a different one of the P processors; and
a number (P) of routing traffic engineering queues, each routing traffic engineering queue of the P routing traffic engineering queues being associated with a different one of the P processors.

13. The self-protecting network router according to claim 12 wherein, for each traffic engineering queue of the plurality of traffic engineering queues, only the one processor associated with the traffic engineering queue enqueues the unforwardable messages on the traffic engineering queue.

14. The self-protecting network router according to claim 12, wherein:
the path controller comprises a message classifier configured to analyze protocol portions of the messages received by the plurality of network interfaces and, as a result of the analysis, for messages in which the protocol portions indicate:
resolution protocol (ARP), enqueue the messages to the P ARP traffic engineering queues;
bidirectional forwarding detection (BFD) enqueue the messages to the P BFD traffic engineering queues;
flow setup, enqueue the messages to the P flow setup traffic engineering queues; and
routing, enqueue the messages to the P routing traffic engineering queues;
the at least one service queue further comprises:
a BFD service queue;
a flow setup service queue; and
a routing service queue; and
the at least one service process further comprises:
a BFD service process;
a flow setup service process; and
a routing service process.

15. A method for automatically protecting resources within a network router from flooding by a large number of messages, the network router comprising a plurality of network interfaces, the method comprising automatically:
storing data in a memory of the network router, the data representing: a plurality of receive queues, a plurality of transmit queues, a plurality of traffic engineering queues and a plurality of service queues;
associating each network interface of the plurality of network interfaces with at least one receive queue of the plurality of receive queues and at least one transmit queue of the plurality of transmit queues;
configuring each network interface of the plurality of network interfaces to automatically enqueue messages received thereby from outside the network router to the at least one receive queue associated therewith and dequeue messages from the at least one transmit queue associated therewith for transmission thereby to outside the network router;
dequeuing forwardable messages from the plurality of receive queues and enqueuing the forwardable messages to the plurality of transmit queues;
dequeuing unforwardable messages from the plurality of receive queues and enqueuing the unforwardable messages to the plurality of traffic engineering queues, including dropping unforwardable messages when ones of the traffic engineering queues are full;
dequeuing the unforwardable messages from the plurality of traffic engineering queues and enqueuing the unforwardable messages to the plurality of service queues, such that each service queue of the plurality of service queues is at most a predetermined fraction, less than 100%, full;
generating, within the network router, internally-generated messages and enqueuing the internally-generated messages to the plurality of service queues, without regard to fullness of the service queues; and
dequeuing the unforwardable messages and the internally-generated messages from the plurality of service queues and processing the unforwardable messages and the internally-generated messages by a plurality of service processes.

16. The method according to claim 15, wherein the predetermined fraction is less than 50%.

17. The method according to claim 15, wherein dequeuing the unforwardable messages from the plurality of receive queues and enqueuing the unforwardable messages to the plurality of traffic engineering queues comprises analyzing protocol portions of the messages received by the plurality of network interfaces and, as a result of the analyzing, for messages in which the protocol portions indicate bidirectional forwarding detection (BFD), enqueuing the messages to the plurality of traffic engineering queues.

18. The method according to claim 15, wherein dequeuing the unforwardable messages from the plurality of receive queues and enqueuing the unforwardable messages to the plurality of traffic engineering queues comprises analyzing protocol portions of the messages received by the plurality of network interfaces and, as a result of the analyzing, for messages in which the protocol portions indicate address resolution protocol (ARP), bidirectional forwarding detection (BFD) or routing, enqueuing the messages to the plurality of traffic engineering queues.

19. The method according to claim 15, wherein dequeuing the unforwardable messages from the plurality of receive queues and enqueuing the unforwardable messages to the plurality of traffic engineering queues comprises analyzing protocol portions of the messages received by the plurality of network interfaces and, as a result of the analyzing, for messages in which the protocol portions indicate address resolution protocol (ARP), enqueuing the messages to the plurality of traffic engineering queues.

20. The method according to claim 19, wherein dequeuing the forwardable and unforwardable messages from the plurality of receive queues, enqueuing the forwardable messages to the plurality of transmit queues and enqueuing the unforwardable messages to the plurality of traffic engineering queues comprises:
comparing address portions of the messages received by the plurality of network interfaces to address data stored in a flow table and, as a result of the comparing:

for messages in which the address portions match the address data, enqueuing the messages to the plurality of transmit queues; and for messages in which the address portions do not match the address data, enqueuing the messages to the plurality of traffic engineering queues.

21. The method according to claim 20, wherein:
storing the data in the memory comprises storing the data in the memory such that the plurality of traffic engineering queues comprises:
at least one address resolution protocol (ARP) traffic engineering queue;
and such that the plurality of service queues comprises:
an ARP service queue; and
processing the unforwardable messages and the internally-generated messages by the plurality of service processes comprises:
processing unforwardable messages dequeued from the ARP service queue by an ARP service process.

22. The method according to claim 21, wherein:
storing the data in the memory comprises storing the data in the memory such that the plurality of traffic engineering queues comprises:
at least one bidirectional forwarding detection (BFD) traffic engineering queue;
at least one flow setup traffic engineering queue; and
at least one routing traffic engineering queue;
and such that the plurality of service queues further comprises:
a BFD service queue;
a flow setup service queue; and
a routing service queue; and
processing the unforwardable messages and the internally-generated messages by the plurality of service processes further comprises:
processing unforwardable messages dequeued from the BFD service queue by a BFD service process;
processing unforwardable messages dequeued from the flow setup service queue by a flow setup service process; and
processing unforwardable messages dequeued from the routing service queue by a routing service process.

23. The method according to claim 21, wherein:
the network router comprises a plurality of P processors coupled to the memory; and
storing the data in the memory comprises storing the data in the memory such that the plurality of traffic engineering queues comprises:
a number (P) of ARP traffic engineering queues; the method further comprising:
associating each ARP traffic engineering queue of the P ARP traffic engineering queues with a different one of the P processors.

24. The method according to claim 23, wherein, for each traffic engineering queue of the plurality of traffic engineering queues, dequeuing the unforwardable messages from the plurality of receive queues and enqueuing the unforwardable messages to the traffic engineering queue comprises dequeuing the unforwardable messages and enqueuing the unforwardable messages by only the one processor associated with the traffic engineering queue.

25. The method according to claim 21, wherein:
the network router comprises a plurality of P processors coupled to the memory; and
storing the data in the memory comprises storing the data in the memory such that the plurality of traffic engineering queues comprises:
a number (P) of ARP traffic engineering queues;
a number (P) of BFD traffic engineering queues;
a number (P) of flow setup traffic engineering queues; and
a number (P) of routing traffic engineering queues; the method further comprising:
associating each ARP traffic engineering queue of the P ARP traffic engineering queues with a different one of the P processors;
associating each BFD traffic engineering queue of the P ARP traffic engineering queues with a different one of the P processors;
associating each flow setup traffic engineering queue of the P ARP traffic engineering queues with a different one of the P processors; and
associating each routing traffic engineering queue of the P ARP traffic engineering queues with a different one of the P processors.

26. The method according to claim 25, wherein, for each traffic engineering queue of the plurality of traffic engineering queues, dequeuing the unforwardable messages from the plurality of receive queues and enqueuing the unforwardable messages to the traffic engineering queue comprises dequeuing the unforwardable messages and enqueuing the unforwardable messages by only the one processor associated with the traffic engineering queue.

27. A non-transitory computer-readable medium encoded with instructions that, when executed by a processor, establish processes for performing a computer-implemented method of automatically protecting resources within a network router from flooding by large number of messages, the network router comprising a plurality of network interfaces, the processes comprising:
a process storing data in a memory of the network router, the data representing: a plurality of receive queues, a plurality of transmit queues, a plurality of traffic engineering queues and a plurality of service queues;
a process associating each network interface of the plurality of network interfaces with at least one receive queue of the plurality of receive queues and at least one transmit queue of the plurality of transmit queues;
a process configuring each network interface of the plurality of network interfaces to automatically enqueue messages received thereby from outside the network router to the at least one receive queue associated therewith and dequeue messages from the at least one transmit queue associated therewith for transmission thereby to outside the network router;
a process dequeuing forwardable messages from the plurality of receive queues and enqueuing the forwardable messages to the plurality of transmit queues;
a process dequeuing unforwardable messages from the plurality of receive queues and enqueuing the unforwardable messages to the plurality of traffic engineering queues, including dropping unforwardable messages when ones of the traffic engineering queues are full;
a process dequeuing the unforwardable messages from the plurality of traffic engineering queues and enqueuing the unforwardable messages to the plurality of service queues, such that each service queue of the plurality of service queues is at most a predetermined fraction, less than 100%, full;
a process generating, within the network router, internally-generated messages and enqueuing the internally-generated messages to the plurality of service queues, without regard to fullness of the service queues; and a process dequeuing the unforwardable messages and the internally-generated messages from the plurality of service queues and processing the unforwardable messages and the internally-generated messages by a plurality of service processes.

* * * * *